United States Patent [19]

Yamagata et al.

[11] 4,259,008

[45] Mar. 31, 1981

[54] ELECTROSTATIC COPYING APPARATUS

[75] Inventors: Ryutaro Yamagata, Nishinomiya; Sohei Matsuo, Osaka; Shigeo Koyama, Toyonaka; Nobuhiko Kozuka, Suita; Yasusuke Tohi, Sakai; Tatsuo Aizawa, Osaka, all of Japan

[73] Assignee: Mita Industrial Company, Ltd., Osaka, Japan

[21] Appl. No.: 28,791

[22] Filed: Apr. 10, 1979

[30] Foreign Application Priority Data

Apr. 14, 1978 [JP] Japan ................................ 53-43254
Jan. 16, 1979 [JP] Japan ................................ 54-2161

[51] Int. Cl.[3] ..................... G03G 15/00; G03B 29/00; G03B 27/50

[52] U.S. Cl. .................................. 355/29; 355/3 SH; 355/13; 355/51

[58] Field of Search ................ 355/3 R, 3 SH, 16, 72, 355/75, 66, 47, 48, 49, 11, 8, 50, 51, 27-29

[56] References Cited

U.S. PATENT DOCUMENTS

| | | | |
|---|---|---|---|
| 3,463,584 | 8/1969 | Trombetta | 355/3 SH |
| 3,614,220 | 10/1971 | Komori et al. | 355/3 SH |
| 3,704,944 | 12/1972 | Komori et al. | 355/27 X |
| 3,960,446 | 6/1976 | Ogawa et al. | 355/3 R X |
| 4,046,469 | 9/1977 | Frank et al. | 355/51 X |

FOREIGN PATENT DOCUMENTS

| | | | |
|---|---|---|---|
| 47-36041 | 12/1972 | Japan | 355/50 |
| 48-11306 | 3/1973 | Japan | 355/50 |
| 49-28346 | 3/1974 | Japan | 355/51 |
| 50-2836 | 1/1975 | Japan | 355/50 |

*Primary Examiner*—Donald A. Griffin
*Attorney, Agent, or Firm*—Wenderoth, Lind & Ponack

[57] ABSTRACT

Improvements are provided in and relating to an electrostatic copying apparatus including a housing, a support for supporting an original to be copied, the support being mounted on the housing and having a transparent plate for supporting the original thereon and a holding member for covering the original on the transparent plate, a system for forming a copied image disposed within the housing and having an optical system for projecting the image of the original on the transparent plate, and a system for transferring a copying paper synchronously with the scanning of the original which is effected by the relative movement of the original holder and the optical system. The improvements include an improvement in the control of the cutting of the copying paper where the copying paper-transferring system includes a system for supplying a roll of copying paper; an improvement in a device for starting the supply of copying paper synchronously with the scanning of the image of the original; an improvement in a device for supplying the roll of copying paper in the copying paper-transferring system; and an improvement in a device for supplying a copying paper in sheet form in the copying paper-transferring system.

33 Claims, 32 Drawing Figures

Fig. 13-B
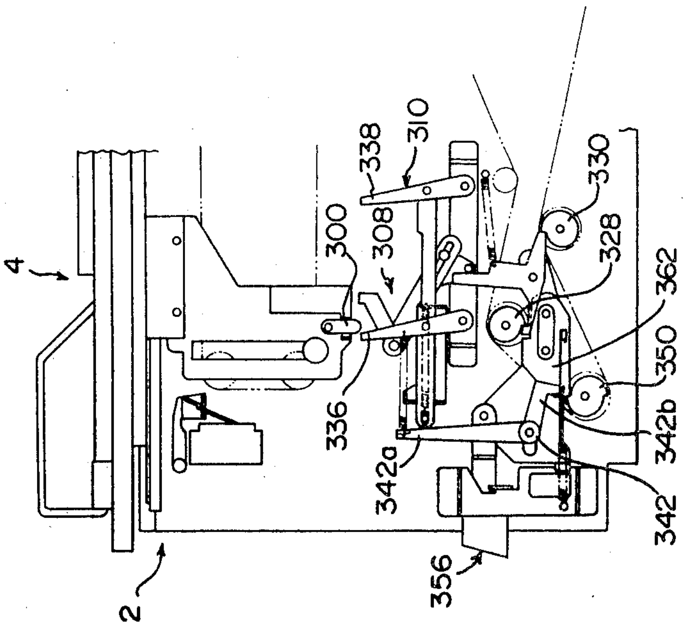
Fig. 13-A
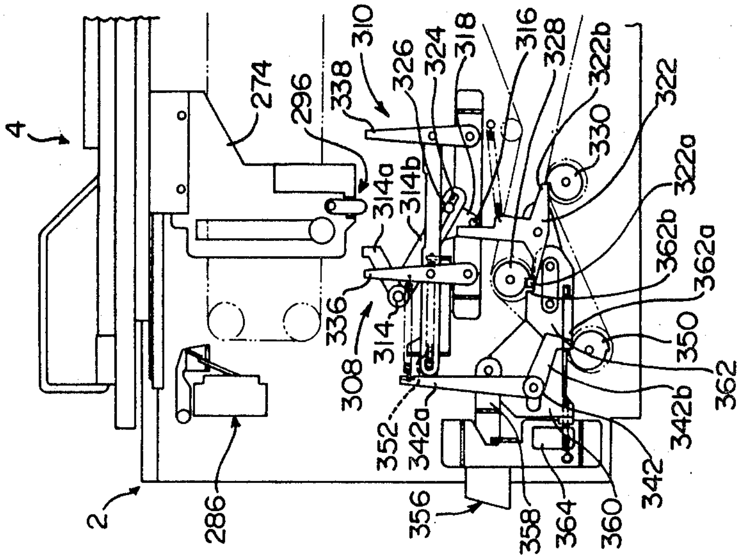

Fig. 13-D
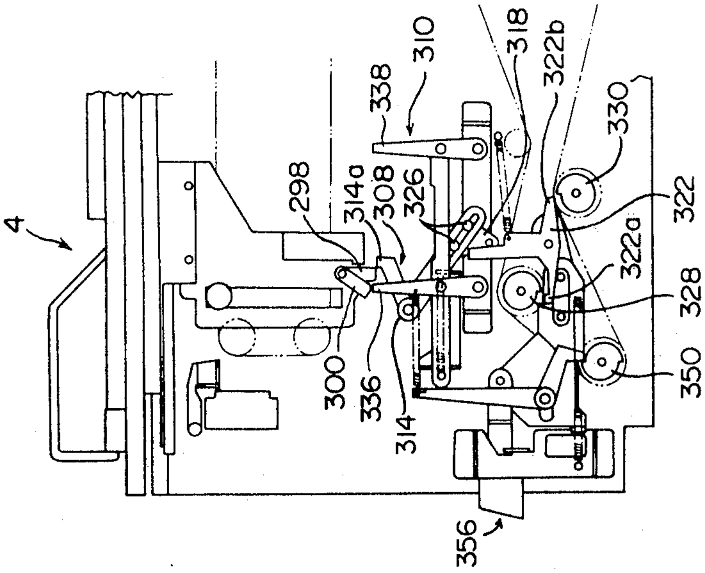
Fig. 13-C
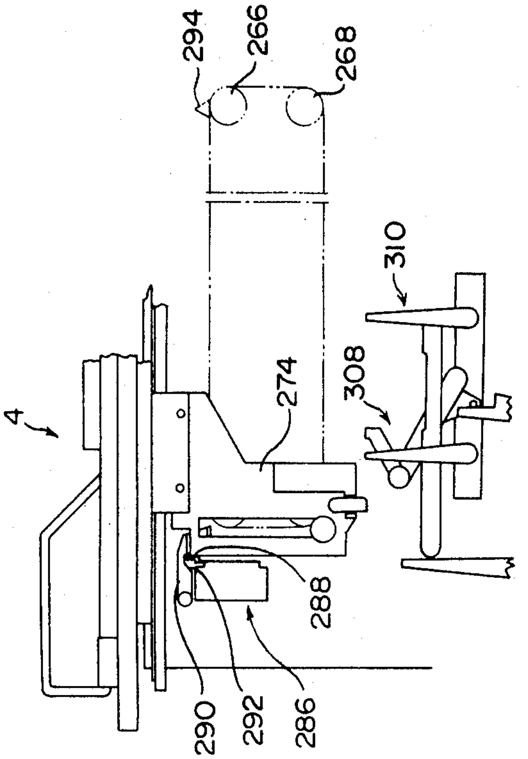

Fig. 13-F
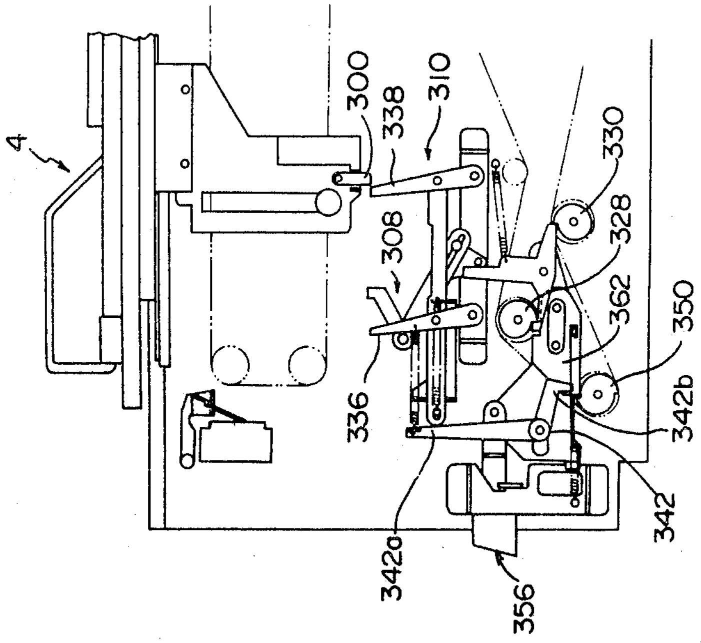
Fig. 13-E
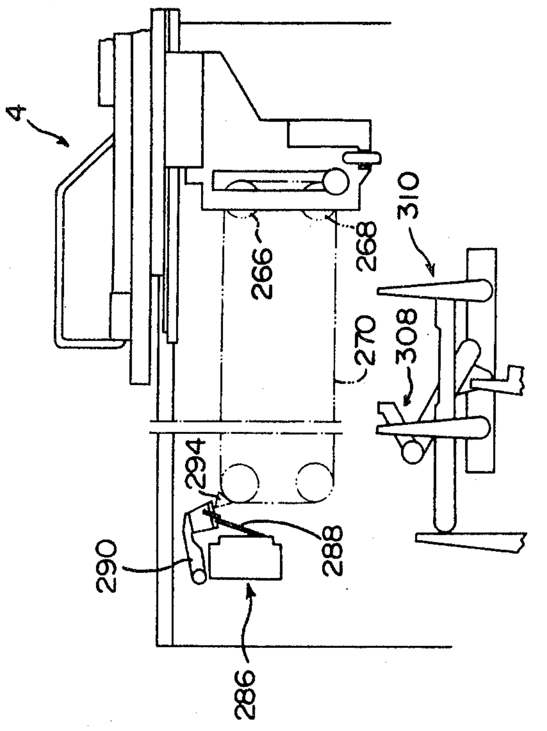

Fig. 14-A
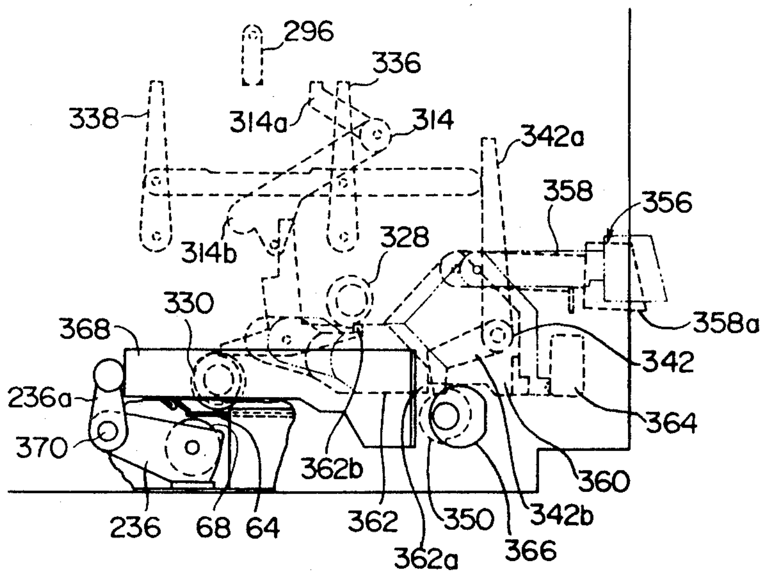
Fig. 14-B
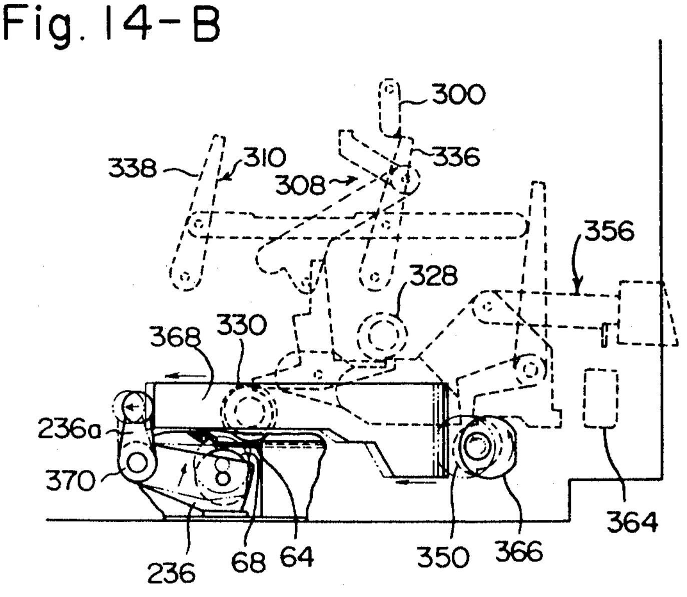

Fig. 14-C
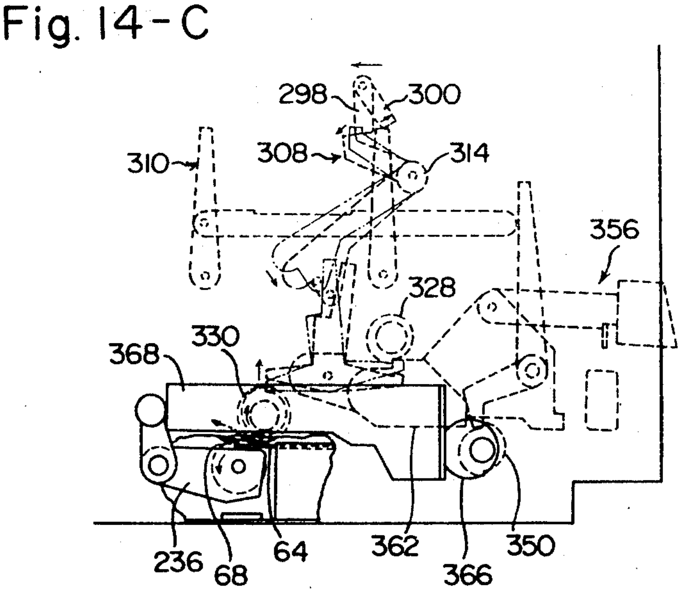
Fig. 14-D
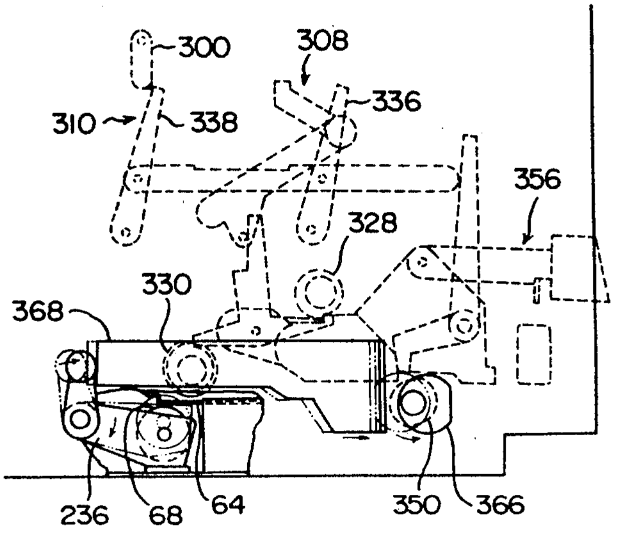

ELECTROSTATIC COPYING APPARATUS

FIELD OF THE INVENTION

This invention relates to an electrostatic copying apparatus, and more specifically, to an electrostatic copying apparatus of the type in which a copying paper is transferred synchronously with the scanning of the image of an original which is effected by the relative movement of means for supporting an original to be copied and an optical system for projecting the image of the original.

DESCRIPTION OF THE PRIOR ART

Conventional apparatuses for electrostatic copying include an apparatus adapted for operation by a so-called toner image transfer method which comprises forming a latent electrostatic image corresponding to the image of an original on a photosensitive member having a photoconductive layer, applying a toner to the latent electrostatic image to form a toner image, and transferring the toner image to a copying paper thereby to form a copy having a copied image corresponding to the image of the original; an apparatus adapted for operation by a so-called electrostatic image transfer method which comprises forming a latent electrostatic image corresponding to the image of an original on a photosensitive member having a photoconductive layer, transferring the latent electrostatic image to a copying paper, applying a toner to the latent image on the copying paper to form a toner image thereby to form a copy having a copied image corresponding to the image of the original; and an apparatus adapted for operation by a so-called direct method which comprises forming a latent electrostatic image corresponding to the image of an original directly on a copying paper having a photoconductive layer, and then applying a toner to the latent image to form a toner image and thereby to form a copy having a copied image corresponding to the image of the original.

In these types of electrostatic copying apparatuses, the image of the original is scanned by moving a means for supporting the original relative to an optical system (the original moving method), or moving the optical system relative to the original-supporting means (the optical system moving method including an embodiment in which all of the constituent elements of the optical system are moved, and an embodiment in which some of the constituent elements of the optical system are moved), and as a result, the image is projected on the photosensitive member having a photoconductive layer or the copying paper having a photoconductive layer. Synchronously with the scanning of the image of the original, the copying paper on which the copied image is to formed is transferred. The copying paper-transferring system includes a copying paper roll-supplying means for unwinding a continuous roll of copying paper, or a copying paper supplying means for supplying a sheet of copying paper cut to a predetermined length. When the copying paper transferring system includes the means for supplying a roll of copying paper, a cutter means is provided for cutting the unwound copying paper to the desired length.

In regard to the aforesaid type of electrostatic copying apparatuses, research and development have been undertaken relating to various points and various improvements have been suggested to date. However, none of them are entirely satisfactory, and some problems still remain unsolved.

Firstly, when the copying paper-transferring system includes means for suppying a roll of copying paper, it is necessary to actuate a cutter means when the roll has been unwound to a predetermined length, thereby cutting the copying paper to a length corresponding to the length of the original (so-called random cutting) or to a length of a predetermined specification. In a conventional apparatus, a limit switch is adjustably mounted which is to be actuated by an actuator rotated in relation to the rotation of a rotary drum having a photosensitive member on its surface, and the position of the limit switch is adjusted according to the desired cut length of the copying paper (see Japanese Laid-Open Patent Publication No. 53838/74). However, in such a construction, the mechanisms for mounting the limit switch and for adjusting its position are relatively complex and expensive. Moreover, when it is desired to cut the copying paper according to the length of the original, it is absolutely necessary to adjust the position of the limit switch according to the length of the original.

Secondly, it is necessary to start the supplying of copying paper synchronously with the starting of the scanning of the image of the original. In a conventional electrostatic copying apparatus, the movement of the original-supporting means or the optical system is detected by a plurality of electrical switches provided in the path of movement the original-support means (in the case of moving the original) or the optical system (in the case of moving the optical system), and the starting of supplying of the copying paper is controlled on the basis of the detected movement. However, in such an electrical control method, an electrical circuit containing the electrical switches and related electrical elements is complex and expensive. Furthermore, to adjust the time of starting the supply of copying paper, the resistance, capacitance, etc. must be adjusted in consideration of the electrical characteristics of the electrical elements themselves, and therefore, the adjustment is relatively difficult.

Thirdly, when the copying paper transferring system includes means for supplying a roll of copying paper, it is generally necessary to unwind a roll of copying paper which has been loaded into the machine and fix its forward end at the cutting position of the copying paper cutting means in order to move the forward end of the copying paper according to the scanning of the forward end of the original (namely, in order to form a toner image on the copying paper while the forward end of the image of the original substantially registers with the forward end of the copying paper). In a conventional electrostatic copying apparatus, the operation of positioning the forward end of some copying paper is troublesome, and the copying paper is wasted. Since on the upstream side of the copying paper cutting mechanism are located a pair of feed rolls for a roll of copying paper, etc. which block the view of the cutting position of the copying paper cutting mechanism, it is impossible or extremely difficult, in practice, to accurately fix the forward end of the mounted copying paper exactly at the cutting position of the copying paper cutting means by a manual operation. Thus, in the conventional electrostatic copying apparatus, it has been the practice to fix the unwound copying paper at the nip position of a pair of feed rolls for a roll of copying paper, then manually rotate the pair of feed rolls to unwind the copying paper until its forward end goes beyond the cutting position of the copying paper cutting mechanism to cut the forward end of the copying paper to some extent, and remove the cut-off portion by hand. Such an operation is very troublesome, and results in some wasting of the copying paper. Instead of the above operation, the practice has also been prevalent to fix the unwound copying paper at the nip position of a pair of feed rolls for a roll of copying paper, and operate the apparatus through one cycle with no load, thus wasting approximately one sheet of copying paper. Such an operation is somewhat troublesome, and approximately one sheet of copying paper is wasted.

In the fourth place, when the copying paper transfer system includes a feed means for supplying separate sheets of copying paper, it has often been the practice to produce an offset master by feeding a master paper for offset printing as the copying paper. In a conventional electrostatic copying apparatus, it is difficult to insert the master paper into the copying paper supply means and fix it in an appropriate position. When ordinary copying paper in separate sheets is to be supplied, it is desired to feed the copying paper in such a manner as to form a toner image on the copying paper while the forward end of the image of the original substantially registers with the forward end of the copying paper. When an offset master is set in an offset printing press, it is necessary to have the forward end of the offset master held by the machine. Accordingly, it is desired to supply the master paper such that a toner image is formed on the master paper leaving its forward end portion intact for holding by the machine. Accordingly, in the insertion of the master paper into the means for supplying the copying paper in separate sheets, it is desired to fix the forward end portion of the master paper at a position ahead of that for the insertion of an orginary sheet of copying paper by a length corresponding to the holding width mentioned above. However, the conventional electrostatic copying apparatus does not include means for accurately positioning the master paper although having means for accurately positioning an ordinary sheet of copying paper. Hence, it is difficult to insert the master paper into the means for supplying the separate sheets of copying paper and fix it at a suitable position.

SUMMARY OF THE INVENTION

A first object of this invention is to provide a novel and excellent electrostatic copying apparatus comprising a system for transferring a copying paper equipped with a device for supplying a roll of copying paper, which can effect the cutting of the copying paper to the desired length without requiring a complicated and expensive mechanism and without requiring a troublesome operation.

A second object of this invention is to provide a novel and excellent electrostatic copying apparatus including an easily adjustable mechanism for starting the supply of a copying paper synchronously with the starting of scanning of the image of an original without requiring a complicated and expensive electrical circuit.

A third object of this invention is to provide a novel and excellent electrostatic copying apparatus comprising a system for transferring a copying paper equipped with a device for supplying a roll of copying paper, which can fix the foward end of the roll of copying paper at the cutting position of a cutter means for the copying paper at the time of loading the roll of copying paper without requiring a complicated troublesome operation and without wasting the copying paper.

A fourth object of this invention is to provide a novel and excellent electrostatic copying apparatus comprising a system for transferring a copying paper equipped with means for supplying separate sheets of copying paper, which can easily and accurately effect the positioning of an ordinary copying paper in the form of separate sheets and the positioning of a master paper for offset printing which needs to be positioned at a different position than in the case of ordinary copying paper in the form of separate sheets.

In connection with the first object, the present invention provides an electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and comprising an optical system for projecting the image of the original on the transparent plate, and a system for transferring a copying paper synchronously with the scanning of the image of the original which is effected by the relative movement of the original-support means and the optical system, said transfer system including a supply means for unwinding a roll of copying paper and a cutter means for cutting the roll of copying paper. The apparatus has one of the following essential features (i) to (iii).

(i) That portion of the inside surface of the original-holding member which has a predetermined width corresponding at least to the side portion of the transparent plate has dark color characteristics, and the housing has provided therein a light detector which receives the reflected light at the side edge portion of the transparent plate and detects a change in reflectance when the image of the original is scanned; and when the light detector detects the change in reflectance, the copying paper cutter means is actuated according to the detected change;

(ii) That portion of the inside surface of the original-holding member which has a predetermined width corresponding at least to the side edge portion of the transparent plate has bright color characteristics; adjacent the transparent plate, a copying paper cutting length indicating member is provided which has a predetermined width and extends along the side edge of the transparent plate at least from the forward end of the transparent plate to its rear end, said indicating member having an inside surface of a dark color and being adapted to permit adjustment of the length from the forward end of the transparent plate to the rear end of the indicating member; the housing includes therein a light detector which receives the reflected light at the side edge of the transparent plate during the scanning of the image of the original, and detects a change in reflectance between the reflected light from the inside surface of the indicating member and the reflected light from the inside surface of the original-holding member, the copying paper cutter means being actuated according to the detection of the change of reflectance of the reflected lights by said light detector; and (iii) Adjacent the transparent plate, a copying paper cutting length indicating member having a predetermined width extends along the side edge of the transparent plate from the forward end toward its rear end and permitting adjustment of the length from the forward end of the transparent plate and an auxiliary member having a predetermined width extends along the side edge of the transparent plate and is capable of being positioned at the rear end of the length indicating member, the inside surface of said length indicating member having either bright color or dark color characteristics and the inside surface of said auxiliary member having either dark color or bright color characteristics opposite to the characteristics of said length indicating member; and said housing includes therein a light detector which receives the reflected light at the side edge of the transparent plate during the scanning of the image of the original and detects the change of the reflectance, said copying paper cutter means being actuated upon the detection of the change of the reflectance by the light detector.

With regard to the second object, the present invention also provides an electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and comprising an optical system for projecting the image of the original on the transparent plate, and a system for transferring a copying paper synchronously with the scanning of the image of the original which is effected by the relative movement of the original-support means and the optical system, said transfer system including a feed roller to be connected to a drive power source by the actuation of a clutch mechanism to start the supplying of the copying paper; said apparatus further comprising an actuator secured to one of said original-support means and said optical system so as to move together with it and a follower lever mechanism mounted such that it can pivot between an engaging position at which it comes into engagement with said clutch mechanism for connecting said paper feed roller of said copying paper transfer system to the drive power source to maintain it in the inoperative state and a non-engaging position at which it is detached from the clutch mechanism to maintain the latter in the operative state, said follower lever mechanism being urged to the engaging position by means of a spring, said actuator abutting said follower lever mechanism upon the starting of scanning movement of either one of said original-support means and said optical system and the consequent starting of the scanning of the image of the original, thereby to bring the follower lever mechanism to the non-engaging position against the urging action of the spring, as a result of which the rotation of the feed roll is started synchronously with the starting of the scanning of the image of the original to feed the copying paper, and when the actuator separates from the follower lever mechanism by the continuance of the scanning movement, the follower lever mechanism is returned to the engaging position by the urging action of the spring, whereby the copying paper feed roll is stopped after rotation by a predetermined amount.

With regard to the third object, the present invention further provides an electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and comprising an optical system for projecting the image of the original on the transparent plate, and a system for transferring a copying paper synchronously with the scanning of the image of the original which is effected by the relative movement of the original-support means and the optical system, said transfer system including a supply means for unwinding a roll of copying paper and a cutter means for cutting the roll of copying paper; said paper roll feed means including a support frame for rotatably supporting the core of a roll of copying paper, said frame being mounted such that it can pivot between a paper roll loading position and a paper roll unwinding position, a rotatable feed roller unit for feeding the unwound paper roll, and an early stage feed means for rotating the copying paper feed roller unit by a predetermined amount in the paper feeding direction at the time of loading the roll of copying paper; said paper roll feed means being constructed such that when the feed roller unit is rotated by a predetermined amount in the feeding direction by means of said feed means after loading the paper roll rotatably on the support frame, unwinding its forward end and positioning it at the nip position of the feed roller unit, the forward end of the unwound copying paper is delivered to the cutting position of said cutter means.

With regard to the fourth object, this invention also provides an electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and comprising an optical system for projecting the image of the original on the transparent plate, and a system for transferring a copying paper synchronously with the scanning of the image of the original which is effected by the relative movement of the original-support means and the optical system, said transfer system including means for feeding a sheet of copying paper; said sheet feeding means having an opening formed in the housing for insertion of a sheet of copying paper, a sheet receiving plate for receiving the sheet of copying paper inserted through said opening and having at its forward end a sheet end positioning surface, said positioning surface extending to a predetermined height in a direction approximately at right angles to the sheet inserting direction and permitting the abutment of the forward end of the inserted sheet of copying paper therewith, a copying paper feed roller rotatably mounted above said receiving plate at a predetermined interval and capable of being rotated upon selective connection to a drive power source by the actuation of a clutch mechanism, and a copying paper feed auxiliary member capable of being selectively positioned either at an inoperative position below said receiving plate or at an operative position at which a part of the auxiliary member projects upwardly from the receiving plate through the opening formed in said receiving plate to press the sheet of copying paper fed onto the receiving plate against the paper feed roller, said receiving plate is mounted slidably in the paper feeding direction and being urged by means of a spring against a first position at which a part of the receiving plate contacts a stopping member, said sheet feeding means further comprising a receiving plate advancing means for moving the receiving plate forward against the urging force of the spring to a second position spaced from the first position a predetermined distance in the paper feeding direction, and maintaining it at the second position.

Other objects and features of the present invention will become apparent from the following description.

BRIEF DESCRIPTION OF THE DRAWINGS

FIGS. 13-A to 13-F and FIGS. 14-A to 14-D are simplified view for illustrating the operations of the control means and the lever means shown in FIG. 12;

DETAILED DESCRIPTION OF PREFERRED EMBODIMENTS

This invention is described in detail below with reference to the accompanying drawings which show preferred embodiments of the electrostatic copying apparatus of this invention. In the following, the present invention is described with reference to a toner image-transfer type electrostatic copier machine. It should be understood however that the invention is not limited to such a type of copier alone, but can be equally well applied to electrostatic copiers of the latent electrostatic image transfer type or the direct image-forming type.

Outline of the general construction

Figure 1:
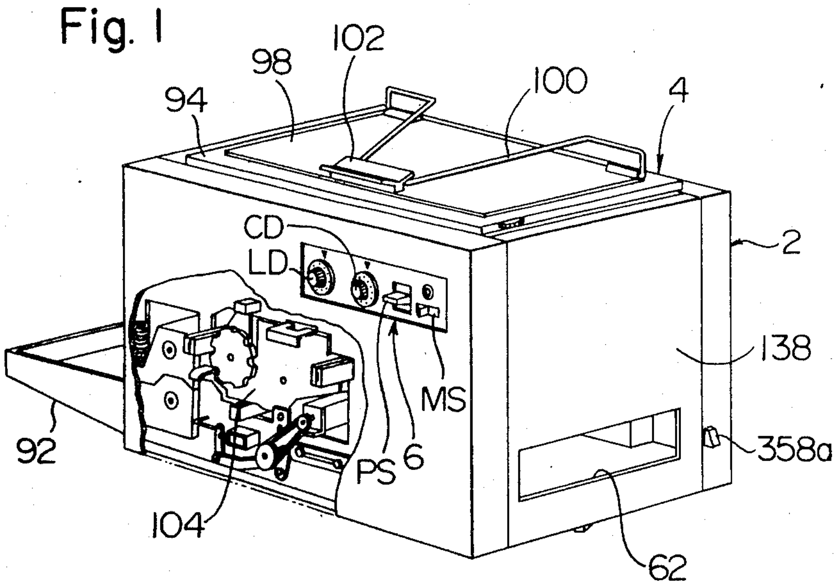
FIG. 1 is a perspective view, partly broken away, of a preferred embodiment of the electrostatic copying apparatus of this invention.
Figure 2:
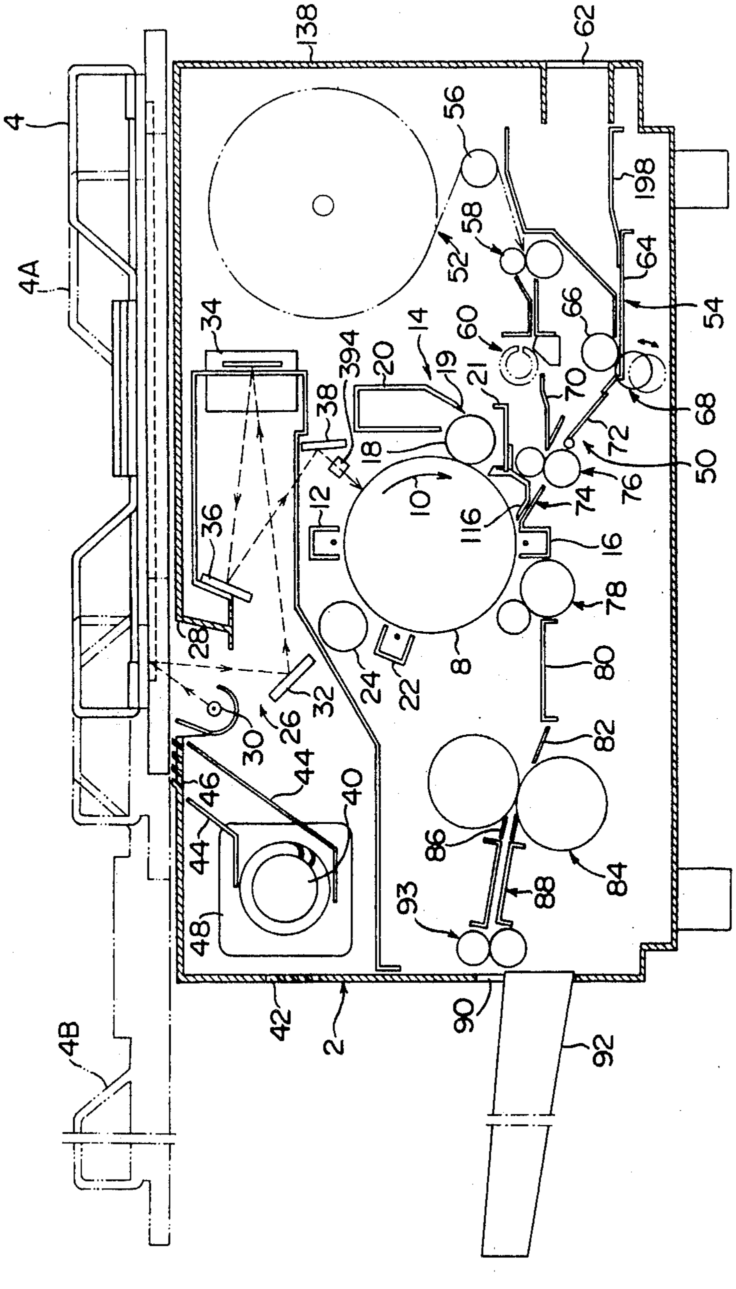
FIG. 2 is a simplified cross-sectional view of the electrostatic copying apparatus shown in FIG. 1.

The general construction of the toner image transfer-type electrostatic copying apparatus is described mainly with reference to FIGS. 1 and 2.

The electrostatic copying apparatus shown has a substantially rectangular parallelpipedal housing generally shown at 2. An original-support means 4 for supporting an original to be copied is mounted on the top surface of housing 2 such that it is slidable in a manner known per se in the direction of scanning the original (in the horizontal direction in FIGS. 1 and 2). Preferably, as will be described in detail hereinbelow, the original-support means 4 is located at a stop position shown by solid lines in FIG. 1 and two-dot chain lines 4A in FIG. 2 when the electrostatic copying apparatus is in the inoperative state, but when the electrostatic copying apparatus starts and performs a copying process, the original-support means 4 makes a preparatory movement from the stop position toward the right in FIG. 2 up to a position of starting scanning as shown by solid lines, then moves in the left direction from this scanning start position to a position of termination of movement shown by two-dot chain lines 4B in FIG. 2, and then returns in the right to the original stop position in FIG. 2. On the front surface portion of housing 2 is provided a control panel 6 including a control switch and other devices as will be described in hereinbelow.

As illustrated in a simplified form in FIG. 2, a cylindrical rotary drum 8 having a photosensitive member on at least a part of its peripherl surface is mounted substantially centrally within housing 2. Instead of the cylindrical rotary drum 8, an endless belt element known to those skilled in the art which has a photosensitive member on at least a part of its outside surface may be used. In the present specification and the appended claims, the term "rotary drum" is used to embrace such an endless belt element. Around rotary drum rotating in the direction of arrow 10 are disposed successively in the direction of its rotation a corona charger 12 for charging which constitutes a photoelectric means for electrically charging the photosensitive member, a developing and cleaning station 14 which at the same time constitutes a developing means for applying a toner to a latent electrostatic image formed on the photosensitive member to form a toner image and a cleaning means for removing the residual toner on the photosensitive member after a transfer step in the specific embodiment shown in the drawing, and a corona charger 16 for transfer which constitutes a transfer means for transferring the toner image formed on the photosensitive member to a receptor sheet. Preferably, the developing and cleaning station 14 includes a cylindrical sleeve 18 known per se, a toner supplier 20 for supplying a toner to the cylindrical sleeve 18, and a receiver tray 21 for receiving the toner which drops from the surface of sleeve 18. On the downstream side of the corona charger 16 viewed in the rotating direction of rotary drum 8 are preferably provided a corona charger 22 for charge elimination and a lamp 24 for charge elimination, which remove the residual charge on the photosensitive member after the transfer step.

Above rotary drum 8 is provided an optical system 26 for projecting the image of an original supported on support means 4 onto the photosensitive member. The optical system 26 includes an illuminating lamp 30 for illuminating the original through an exposure opening 28 provided on the top surface of housing 2, a first reflecting mirror for projecting the light reflected from the original onto the photosensitive member, an in-mirror lens 34, a second reflecting mirror 36 and a third reflecting mirror 38. As shown by an arrow in broken lines in FIG. 2, the optical system 26 projects the image of the original supported on the original-support means 4 onto the photosensitive member at a position immediately downstream of the corona discharger 12 for charging as viewed in the rotating direction of rotary drum 8. A cooling fan 40 is provided on the left of optical system 26 at a position near the left end side of the top of housing 2. The cooling fan 40 sucks air from a suction opening 42 formed in the top portion of the left side wall of housing 2, sends it along a guide plate 44, delivers it through an air blow opening 46 formed adjacent the exposure opening 28 on the top surface of housing 2, and thus cools the transparent plate (to be described in detail hereinbelow) during the scanning movement of the original-support means 4. Rearwardly of the side portion of fan 40 (in FIG. 2, rearwardly of fan 40 in a direction perpendicular to the sheet surface) is disposed an electric motor 48 which constitutes a drive power source for fan 40 and also serves as a drive power source for various constituent elements of the electrostatic copying apparatus, as will be described in detail hereinbelow.

A copying paper transfer system shown generally at 50 is further provided in the electrostatic copying apparatus shown in the drawings. The transfer system 50 includes a feed means for unwinding a roll of copying paper, and a feed means for feeding a copying paper in sheet form. The copying paper roll feed means 52 has a curl removing roller 56 for guiding the unwound paper roll and correcting its curling, and a pair of feed rolls for unwinding a roll of copying paper, and downstream of the feed rollers 58 is provided a cutter means 60 for cutting the unwound paper roll. The sheet feed means 54 includes an opening 62 for insertion of a copying paper in sheet form formed on the right-hand wall of housing 2, a receiving plate 64 for receiving a copying paper sheet which has been inserted through the insertion opening 62, and a feed roll 66 for delivering the copying paper sheet on the receiving plate 64, and an auxiliary supply member for pressing the copying paper sheet on the receiving plate 64 against the feed roller 66. The details of the constructions of the paper roll feed means 52 and the paper sheet feed means 54 will be described hereinbelow. The copying paper transfer system 50 further includes a pair of transfer rolls for passing the copying paper (which has been delivered over a guide plate 70 from the paper roll feed means 52, or over a guide plate 72 from the copying paper sheet feed means 54) between a pair of guide plates, and transferring it into a transfer zone in which corona charger 16 for transfer is provided, a pair of separating rolls 78 for separating the copying paper adhering intimately to the rotary drum 8 in the transfer zone from the rotary drum 8 and carrying it away from the transfer zone, a pair of press rollers 84 for pressing the copying paper sent via guide plates 80 and 82 and fixing under pressure a toner image transferred to the copying paper, and transfer rollers 93 for delivering the copying paper, which has been sent from the press rollers 84 through a pair of guide plates 88, to a receiver tray 92 through a transfer opening 90 formed on the left end wall of housing 2. The upstream ends 86 of the guide plates 88 have the function of separating the copying paper adhering intimately to the press rollers 84 therefrom.

The individual constituent elements are described in more detail below.

Original-support means

Figure 3:
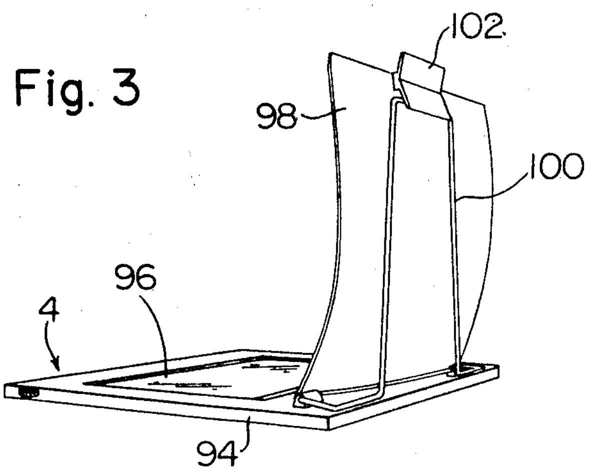
FIG. 3 is a perspective view showing the original-supporting mechanism of the electrostatic copying apparatus shown in FIG. 1.

The support means 4 for supporting an original to be copied is described with reference to FIGS. 1 and 3. The original-support means 4 has a support frame 94 mounted on the top surface of housing 2 in a manner known per se so that it is slidable in the direction of scanning the original (in the transverse direction in FIG. 1). A transparent plate 96 for supporting an original to be copied is fixed to the support frame 94. On the top surface of support frame 94 are provided an original-holding member 98 made, preferably, of a flexible material and a support stand 100 for the press member 98. One side edge portion of the original-holding member 98 is mounted pivotably on support frame 94 at a position adjacent one side edge of transparent plate 96, and is adapted to be located at a position covering the transparent plate 96 shown in FIG. 1, and a lifted position shown in FIG. 3. Furthermore, one side edge of support stand 100 is mounted pivotably on support frame 94, and is adapted to be located at the inclined position shown in FIG. 1 and the erect position shown in FIG. 3. A grip 102 is provided near the free edge of the outside surface (i.e., the top surface in the state shown in FIG. 1) of the original-holding member 98. As shown in FIG. 3, the grip 102 can be engaged at one edge portion with the free edge of support stand 100, and can be removed from the free end of support stand 100 by turning it somewhat counterclockwise in FIG. 3 by utilizing the flexibility of the original-holding member 98 and/or the flexibility of the grip 102. Hence, in the state shown in FIG. 3 in which support stand 100 stands erect nearly perpendicularly on support frame 94 and the original-holding member 98 is in the lifted position supported by the support frame 94, the original-holding member 98 and the support stand 100 can be simultaneously turned counterclockwise in FIG. 3 so that the original-holding member 98 will cover the transparent plate 96 and the original placed on it. It is also possible to turn the grip 102 counterclockwise somewhat and remove it from the free edge of support stand 100, and then turn only the original-holding member 98 counterclockwise in FIG. 3 to cover the transparent plate 96 and the original placed thereon, while leaving the support stand 100 in the erect state.

The original-support means 4 further includes a drive mechanism for driving the support means in the direction of scanning the original, and various means for controlling the operation of the copying paper roll cutter means 60 so as to cut the copying paper unwound from the copying paper roll feed means 52 to the desired length according to the length of the original placed on the transparent plate 96. These members will be described in detail hereinbelow.

Method of mounting the rotary drum and the developing and cleaning station

Figure 4:
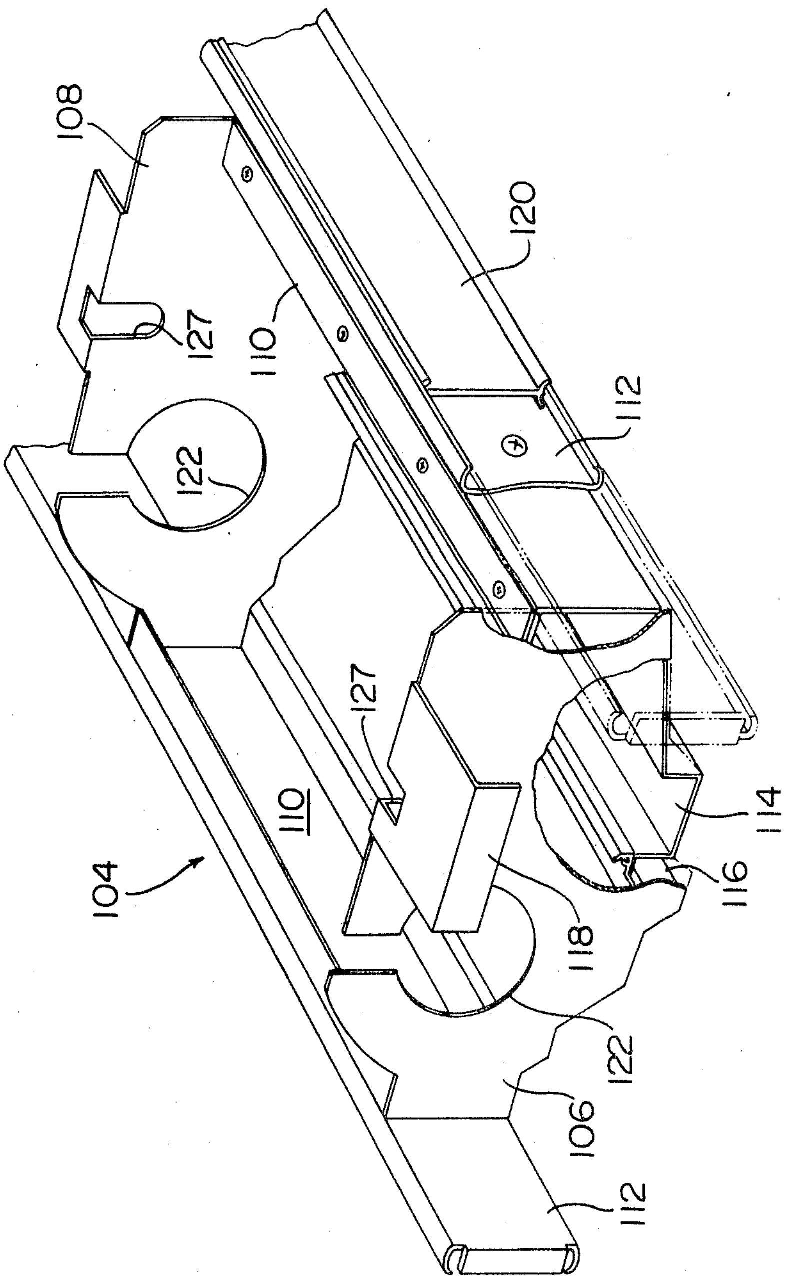
FIG. 4 is a perspective view, partly broken away, of a support for a rotary drum and related parts in the electrostatic copying apparatus shown in FIG. 1.
Figure 5:
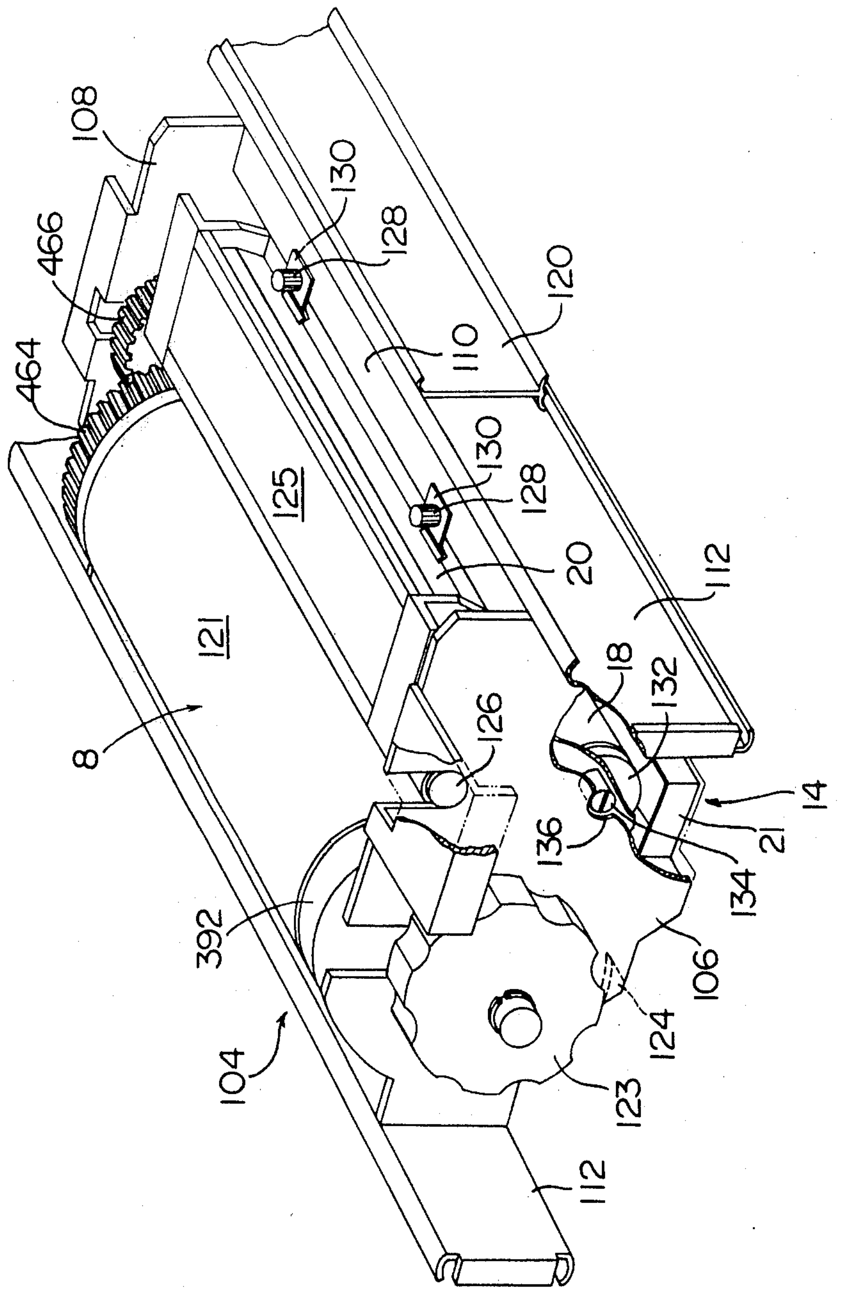
FIG. 5 is a perspective view, partly broken away, of a support, a rotary drum mounted thereon, a developing station and a cleaning station in the electrostatic copying apparatus shown in FIG. 1.

Referring to FIGS. 4 and 5 together with FIG. 1, a support 104 is mounted on housing 2 such that it is slidable in the forward and backward direction (i.e., the direction at right angles to the sheet surface of FIG. 2). Rotary drum 8 and developing and cleaning station 14 are mounted on support 104. The support 104 illustrated in FIG. 4 includes a vertical front plate 106 and a vertical rear plate 108 spaced apart a predetermined distance from each other substantially parallel to each other, a pair of side plates 110 extending between both ends of vertical front plate 106 and both ends of vertical rear plate 108, and a pair of guide rails 112 fixed to said side plates 110 and extending beyond the vertical front plate 106 and the vertical rear plate 108. A member 114 having a channel-like cross-section for holding a receiving tray 21 is fixed to the right-hand lower portion of support 104 in FIG. 4, and adjacent the channel-like member 114 is fixed an upper guide plate 116 of a pair of guide plates 74 (FIG. 2). Furthermore, to the upper edge portion of vertical front plate 106 is fixed a grip 118 which can be grasped when sliding the support 104 in the forward and backward directions. The support 104 can be mounted on housing 2 so as to be slidable in the forward and backward directions by mounting a pair of slide guide rails 120 (only one of the rails is shown in the drawings) on a pair of stationary guide rails (not shown) fixed to housing 2 such that they can slide in the forward and backward directions, and by slidably mounting the guide rails 112 fixed to the support 104 on guide rails 120. Hence, the support 104 can be made to slide as desired between the predetermined position shown in FIG. 1 (at this position, the support 104 can be locked by various locking means known per se) and the position shown in FIG. 5 pulled out forward by grasping the grip 118 (at this position, the further forward movement of support 104 can be prevented by using a suitable stop device).

Rotary drum 8 and developing and cleaning station 14 are detachably mounted on support 104. The rotary drum 8 having on its periphery a photosensitive member 121 having a photoconductive layer can be rotatably and detachably mounted on support 104 by mounting its support shaft in openings of vertical front plate 106 and vertical rear plate 108 of support 104 in suitable bearings, and then fitting known stop rings onto the support shaft on both sides of the bearings. At the forward end of the rotary drum 8 is provided a grip 123 which can be grasped at the time of mounting the rotary drum 8 and manually rotating rotary drum 8 at the time of feeding a toner. To the inside surface of vertical front plate 106 of support 104 is fixed a peeling member 124 which is located in proximity to the surface of that portion of the forward end of the peripheral surface of the rotary drum at which the photosensitive member 121 is not present. The peeling member 124 has the function of peeling the closely adhering copying paper from the surface of rotary drum in the transfer zone from the surface of the rotary drum.

The toner supplier 20, cylindrical sleeve 18 and receiving tray 21 of the developing and cleaning station 14 are mounted detachably on support 104 in the following manner. Pins 126 projecting from both ends of the toner supplier 20 having a cover member 125 mounted detachably on its top surface are inserted into cuts 127 in vertical front plate 106 and vertical rear plate 108, and at the same time, a downwardly directed urging force is exerted on the right side edge portion of the toner supplier 20 in FIG. 5 by a pair of elastic pressing members 130 mounted on the top surface of the side plate 110 of support 104 by means of screws 128, whereby the toner supplier 20 is mounted detachably on the support 104. The cylindrical sleeve 18 is mounted rotatably on both end walls of the toner supplier 20, and therefore, mounted detachably on support 104 through toner supplier 20. On both ends of cylindrical sleeve 18 is rotatably mounted a known collar member 132 which is adapted to make contact with that portion of each end of rotary drum 8 at which the photosensitive member 121 is not present, thereby maintaining the distance between the surface of rotary drum 8 and the surface of cylindrical sleeve 18 at a predetermined value. These collar members 132 are contacted with the surface of the rotary drum 8 as a result of the toner supplier 20 being elastically urged clockwise in FIG. 5 about a pin 126 as a center by the urging force which is exerted on the right side edge portion of the toner supplier 20 by the elastic pressing members 130. Within cylindrical sleeve 18 is mounted a known stationary permanent magnet (not shown) having a plurality of magnetic poles spaced at regular intervals in the circumferential direction. Formed integrally with the permanent magnet is a shaft member 132 the forward end of which extends forward beyond the front end wall of the toner supplier 20 and the front end surface of which has a groove therein. The angular position of the stationary permanent magnet within cylindrical sleeve 18 can be properly adjusted by operating the shaft member 134 through a circular opening 136 formed in the vertical front plate 106 of the support 104 (for example, by engaging a screw driver with the groove of the shaft member 134). The receiving tray 21, substantially regular rectangular parallelepipedal, with an open top is mounted detachably on support 104 by merely inserting it in the channel-like member 114 provided in the lower part of the right side of the support 104.

Generally, in the electrostatic copying apparatus, the toner contained in the toner supplier 20 is consumed by performing the developing step. It is necessary therefore to supply a toner to the toner supplier occasionally. The toner which has dropped from the surface of cylindrical sleeve 18 is accumulated in the receiving tray 21 of the developing and cleaning station 14, and therefore, the toner must be recovered occasionally from the receiving tray 21. On the other hand, in order to perform good developing and cleaning, the distance between the surface of cylindrical sleeve 18 of developing and cleaning station 14 and the surface of rotary drum 8, or the distance between the surface of cylindrical sleeve 18 and the forward end of a brush length-adjusting portion formed of the lower end edge 19 (FIG. 2) of the toner supplier 20 must be maintained at a suitable value.

In the electrostatic copying apparatus shown in the drawings, the developing and cleaning station 14 is mounted together with rotary drum 8 on support 104 which is mounted slidably on housing 2. Thus, the supply of fresh toner can be effected by pulling out the support 104 forward, removing the cover member 125 from the top surface of the toner supplier and feeding a fresh toner into the toner supplier receptacle 20. Hence, for supplying toner particles, there is no need to design the apparatus such that the entire developing and cleaning station 14 is caused to slide forward and be pulled out with regard to rotating drum 8, or the toner supplier 20 is caused to slide forward and pulled out with regard to the cylindrical sleeve 18 of the developing and cleaning station 14. With a conventional electrostatic copying apparatus which is designed such that the entire developing and cleaning station 14 is caused to slide forward and be pulled out with regard to rotating drum 8, or the toner supplier 20 is caused to slide forward and be pulled out with regard to the cylindrical sleeve 18 of the developing and cleaning station 14, it is quite difficult, if not impossible, to maintain the aforesaid spaces accurately at predetermined values. Moreover, the aforesaid spaces are likely to change as a result of the forward and backward sliding of the entire developing and cleaning station 14 or the toner supplier 20.

In the electrostatic copying apparatus shown in the drawings, only the receiving tray 21 of the developing and cleaning station 14 is adapted to be moved forward with regard to the support 104. Accordingly, the toner which builds up in the receiving tray 21 can be recovered rapidly and easily by pulling out only the receiving tray 21 forward without any influence on the aforesaid spaces.

Furthermore, it will be readily appreciated from FIGS. 1 and 2 that in the electrostatic copying apparatus shown, when the support 104 slides forward, that portion of the copying paper transfer passage which is in and near the transfer zone where corona charger 16 for transfer is provided is exposed directly, and should paper jamming occur at this part, it can be removed easily.

Copying paper roll feed means of the copying paper transfer system

With reference to FIGS. 6 to 9 together with FIGS. 1 and 2, the copying paper roll feed means 52 of the copying paper transfer system 50 is described below in more detail.

Figure 6:
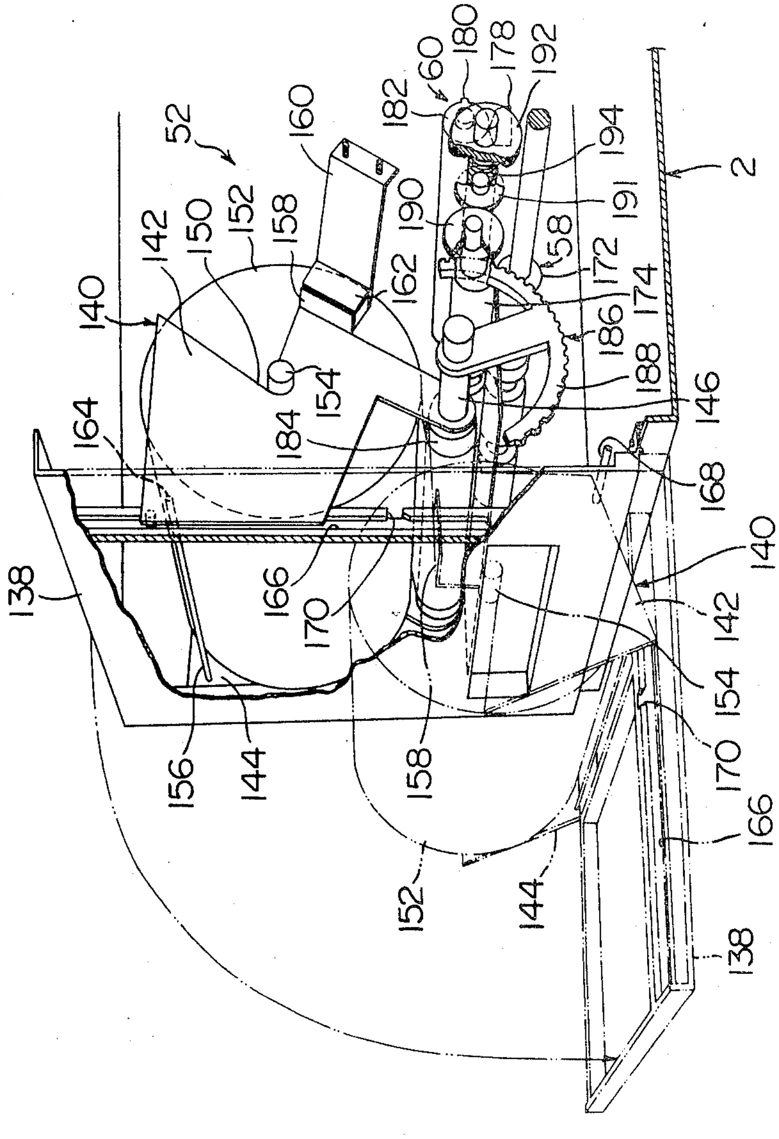
FIG. 6 is a perspective view, partly broken away, of a feed means for feeding a roll of copying paper in the electrostatic copying apparatus shown in FIG. 1.

In the electrostatic copying apparatus shown in the drawings, the main portion 138 of the right-hand end wall (excepting both side edge portions) of housing 2 is mounted pivotably at its lower end portion, and is adapted to pivot between the closed position shown by solid lines in FIG. 6 and the open position shown by two-dot chain lines shown in FIG. 6. Immediately inwardly of the main portion 138 of the right end wall (i.e., at a position which can be easily reached upon opening the main portion 138 of the right end wall), the copying paper roll feed means 52 of the copying paper transfer system 50 is mounted.

Figure 7:
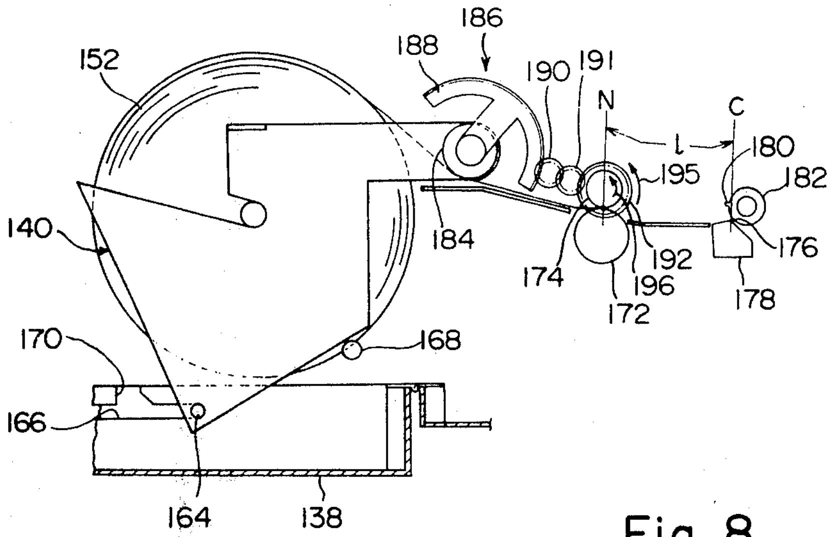
FIGS. 7 and 8 are simplified cross-sectional views showing the copying paper roll feed means shown in FIG. 6.
Figure 8:
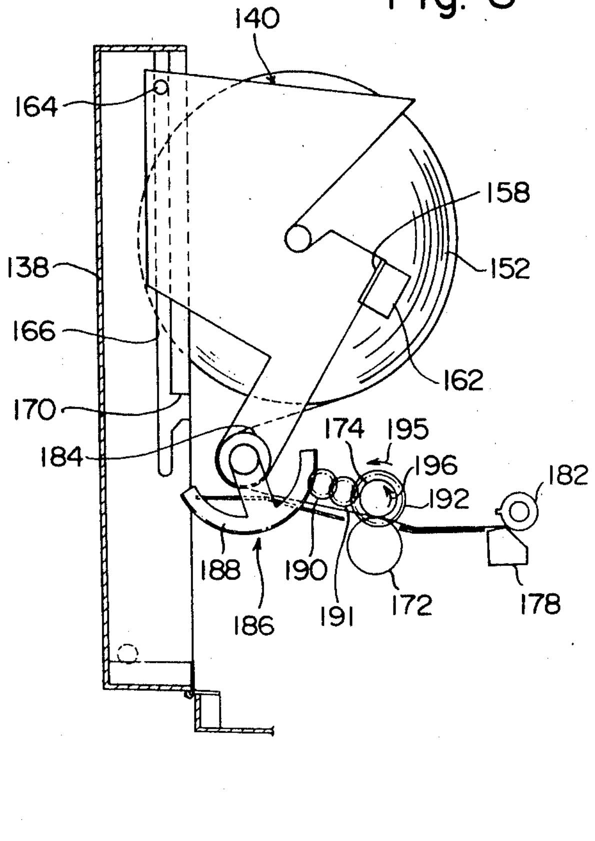

With reference mainly to FIGS. 6 to 8, the feed means 52 includes a support frame 140 for a roll of copying paper consisting of a pair of support plates 142 and 144 which are spaced from each other a predetermined distance in the forward and backward direction (i.e., the direction perpendicular to the sheet surface in FIG. 2). One end portions (the lower end portions at the position shown by the solid lines in FIG. 6) of the support plates 142 and 144 are fixed to a support shaft 146 rotatably supported within housing 2 and extending substantially horizontally. Hence, the support frame 140 composed of a pair of the support plates 142 and 144 are mounted pivotably about the longitudinal axis of the support shaft 146 together with the support shaft 146. A cut 150 of any desired shape is provided in each of the support plates 142 and 144, and a roll 152 of copying paper can be rotatably mounted on the support frame 140 by bringing core 154 of the paper roll 152 into engagement with these cuts 150. Between edges of the free ends of the support plates 142 and 144 is fixed a reinforcing stay 156. A stop plate 158 is fixed to each of the support plates 142 and 144 (in FIG. 6, only stop plate 158 fixed to support plate 142 is shown). When the support frame 140 is brought to the operating position shown by solid lines in FIG. 6 at which the paper roll is to be unwound, pair of the stop plates 158 abut a pair of permanent magnet pieces 162 secured to a pair of supporting brackets fixed to housing 2 (in FIG. 6, only one of the support brackets 160 and one of the permanent magnet pieces 162 are shown) and are held by the magnet pieces. As a result, the support frame 140 is accurately positioned at the position for unwinding the paper roll, and by the action of the permanent magnet pieces 162, is held at the paper roll unwinding position. Furthermore, in the embodiment shown, an engaging pin 164 is secured to the support plates 142 and 144, and engaged with an elongated slot 166 provided at both side edge portions of the main portion 138 of the right end wall of housing 2 (see FIGS. 7 and 8). Thus, the main portion 138 of the right end wall of housing 2 and the support frame 140 operate interlockingly by the cooperative operation of the engaging pin 164 and the slot 166. When the main portion 138 of the right end wall of housing 2 is turned counterclockwise in FIG. 6 from the closed position shown by solid lines in FIGS. 6 and 8 to the open position shown by two-dot chain lines in FIG. 6 and by solid lines in FIG. 7, the support frame 140 follows the turning of the main portion 138 and is turned counterclockwise in FIG. 6 from the paper roll unwinding position shown by solid lines in FIGS. 6 and 8 to the paper roll loading position shown by solid lines in FIG. 7 and by two-dot chain lines in FIG. 6. Conversely, when the main portion 138 of the right end wall is turned clockwise in FIG. 6 from the open position to the closed position, the support frame 140 follows this turning movement of the main portion 138, and is turned clockwise in FIG. 6 from the paper roll loading position to the paper roll unwinding position. When the support frame 140 is brought to the paper roll loading position, one side edge portion of the support frame abuts a stopper pin 168 fixed at a suitable position within the housing 2 whereby the main portion 138 of the right end wall is held at the open position and the support frame 140 at the paper roll loading position. As will be readily appreciated from FIGS. 7 and 8, when the main portion 138 of the right end wall and the support frame 140 operate interlockingly the engaging pin 164 moves relative to the slot 166 in the longitudinal direction of the slot 166. Slot 166 has an opening 170 for disengaging the pin 164. The interlocking of the main portion 138 of the right end wall with the support frame 140 may be released by disengaging the engaging pin 164 from slot 166 through opening 170.

The paper roll feed means 52 further includes a roller pair 58 for feeding a roll of copying paper which consists of a pair of rollers 172 and 174 mounted rotatably at a position spaced a suitable distance from the support shaft 146 and substantially parallel to the support shaft 146. As will be described in greater detail below, at least one of the rollers 172 and 174 is rotated by the selective connection to drive source by the operation of a clutch mechanism, and thus unwinds the paper roll and delivers it through a cutter means 60 for cutting the paper roll. The cutter means 60 has a stationary member 178 having a blade 176 at its upper edge and a rotary member 182 having a blade 180 cooperating with the blade 176. By selectively rotating the rotary member 182, the blade 176 of the stationary member 178 and the blade 180 of the rotary member 182 cooperate and cut the paper roll at the cooperating position. A drive power mechanism and the control of its operation will be described in detail hereinbelow.

Mounted rotatably on the support shaft 146 for support frame 140 is a curl-removing roller 184 of a known structure for guiding the copying paper unwound from the roll so as to bend it in a direction opposite to the wound direction of the paper roll and correcting the curling of the copying paper.

The paper roll feed means 52 further includes an initial paper feed means 186 for a copying paper which constitutes one important feature of the electrostatic copying apparatus of this invention. In the embodiment shown in FIG. 6, the initial paper feed means 186 has an input member constructed of a gear unit 188 secured to one end (the forward end in FIG. 6) of the support shaft 146 for the support frame 140 so that it revolves together with the support shaft 146. The gear unit 188 is drivingly connected to the shaft of the roller 174 of the paper roll feed roller unit 58 through gears 190, 191 and 192 and a one-way clutch 194. The one-way clutch 194 is known per se, and transmits the rotation of the gear 192 in the direction of arrow 195 (FIG. 7) to the roller 174 and causes the roller 174 to rotate in the direction of arrow 196 (FIG. 7). The rotation of the roller 174 in the direction of arrow 196 is not transmitted to the gear 192.

Loading of a roll of copying paper is effected in the following manner in the paper roll feed means 52 having the initial paper feed mechanism 186 described above. First of all, the main portion 138 of the right end wall of housing 2 is turned from the closed position shown by solid lines in FIG. 6 to the open position shown by two dot chain lines and by solid lines in FIG. 7 against the action of the permanent magnet unit 162. As a result, the support frame 140 is moved interlockingly by the turning of the main portion 138 of the right end wall, and is turned from the paper roll unwinding position shown by solid lines in FIG. 6 to the paper roll loading position shown by solid lines in FIG. 7. Then, the core 154 of paper roll 152 is engaged with the cut 150 of support frame 140 to mount the paper roll 152 rotatably on the support frame 140. The paper roll 152 is unwound manually until its tip is positioned at the nip position N of the paper roll feed roller unit 58. Then, the main portion 138 of the right end wall is turned from the aforesaid open position to the closed position shown by solid lines in FIGS. 6 and 8. As a result, the support frame 140 moves interlockingly by the turning of the main portion 138, and is turned from the paper roll loading position to the paper roll unwinding position shown by solid lines in FIGS. 6 and 8. When the support frame 140 is held in the paper roll unwinding position, the stop plate 158 of support frame 140 abuts permanent magnet unit 162 and adheres thereto, whereupon the support frame 140 and the main portion 138 of the right end wall are maintained at the paper roll unwinding position and the aforesaid closed position, respectively. When the support frame 140 is turned from the paper roll loading position to the paper roll unwinding position, the gear unit 188 connected to support frame 140 through the support shaft 146 is turned clockwise from the position shown in FIG. 7 to the position shown in FIG. 8. This turning movement of the gear unit 188 which constitutes the input member of the initial paper feed means 186 is transmitted to the roller 174 of the paper roll feed roller unit 58 by a transmitting means consisting of the gears 190, 191 and 192 and the one-way clutch 194 thereby to rotate the rollers 172 and 174 a predetermined amount in the direction of feeding copying paper. This results in the unwinding of a predetermined length of the copying paper, and the forward end of the copying paper is moved from the nip position N of the paper roll feed roller unit 58 to the cutting position C (FIGS. 7 and 8) of the paper cutter means 60. It is important that the gear ratio between the gear unit 188 constituting the input member and the gear 192 constituting a part of the power transmitting means be such that when the gear piece 188 is rotated clockwise from the position shown in FIG. 7 to the position shown in FIG. 8, the roller 174 of the paper roll feed roller unit 58 is rotated in the direction shown by arrow 196 in FIG. 7, and its peripheral surface is moved a paper transfer distance l (FIG. 7) between the nip position N and the cutting position C.

Figure 9:
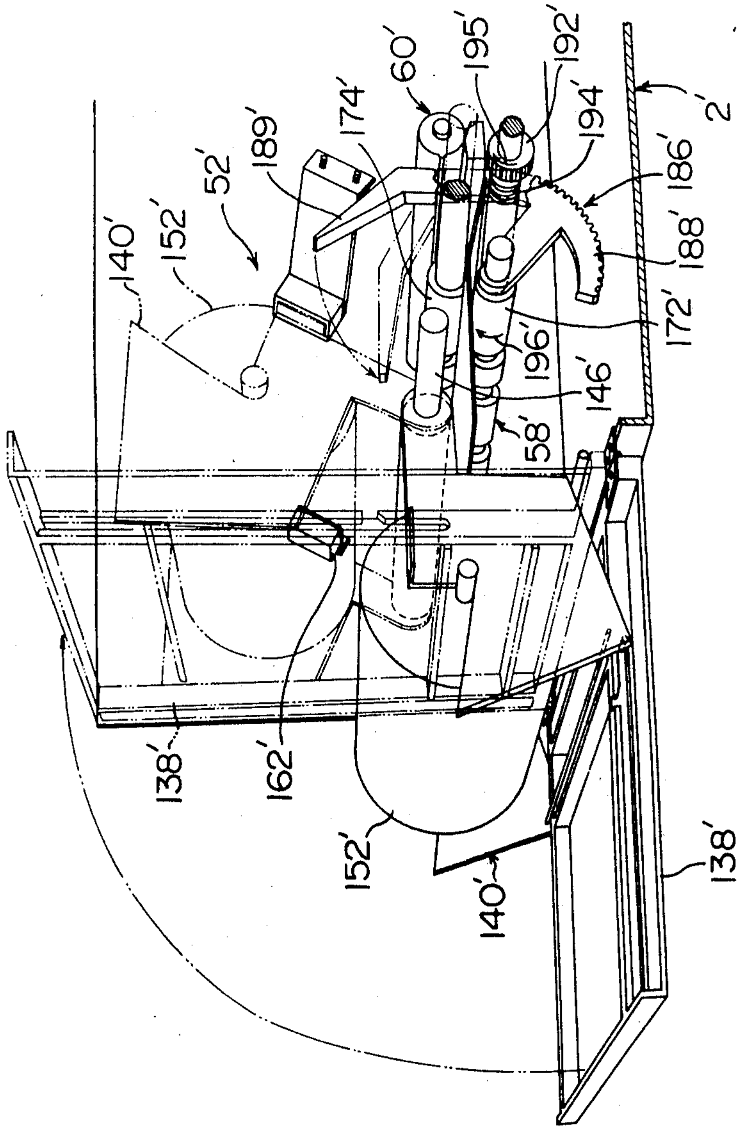
FIG. 9 is a perspective view, partly broken away, of a modification of the copying paper roll feed means.

FIG. 9 shows a modification of the paper roll feed mechanism 52 shown in FIGS. 6 to 8. The paper roll feed means 52' shown in FIG. 9 is substantially the same as the roll paper roll feed means 52 shown in FIGS. 6 to 8 except that the initial paper feed mechanism 186 is changed to means 186' shown in FIG. 9.

In FIG. 9, the open position of the main portion 138' of the right end wall of housing 2' is shown by solid lines and its closed position, by two-dot chain lines. The paper roll loading position of support frame 140' is shown by solid lines, and its paper roll unwinding position, by two-dot chain lines, contrary to FIG. 6. The modified initial paper feed means 186' shown in FIG. 9 includes an input member made up of a gear piece 188' mounted rotatably at a suitable position within housing 2' independently from the support frame 140' and the support shaft 146'. The gear piece 188' has a manually operable lever 189' connected thereto integrally, and by operating the lever 189', the gear piece 188' is turned between a first angular position shown by solid lines in FIG. 9 and a second angular position shown by two-dot chain lines in FIG. 9. The first and second angular positions of the gear piece 188' can be defined by fixing at a predetermined position within housing 2' a suitable stop member (not shown) which is to abut the gear piece 188' or the manually operable lever 189'. The gear piece 188' is drivingly connected to the shaft of roller 172' of the paper roll feed roller unit 58' through a gear 192' and a one-way clutch 194'. The one-way clutch 194' is known per se, and transmits the rotation of the gear 192' in the direction of arrow 195' to the roller 172' to rotate it in the direction of arrow 196'. The rotation of the roller 172' in the direction of arrow 196' is not transmitted to the gear 192'.

In loading a roll of copying paper 152' in the paper roll feed means 52' having the initial paper feed means 186', the main portion 138' of the right end wall of housing 2' is held in the open position and the support frame 140' in the paper roll loading position, in the same way as in the case of the paper roll feed means 52 shown in FIGS. 6 to 8. Then, the paper roll 152' is mounted rotatably on the support frame 140', and then the paper roll 152' is unwound by a manual operation, followed by positioning the forward end of the unwound paper at the nip position of the paper roll feed roller unit 58'. Then, by operating the manually operable lever 189', the gear piece 188' is turned counterclockwise from the first angular position shown by a solid line in FIG. 9 to the second angular position shown by a two-dot chain line in FIG. 9. As a result, the rotation of the gear piece 188' is transmitted to the roller 172' of the paper roll feed roller unit 58' by transmitting means consisting of the gear 192' and the one-way clutch 194', thereby to rotate the rollers 172 and the roller 174' in the direction of feeding copying paper by a predetermined amount. This results in the unwinding of predetermined length of the copying paper, and the forward end of the copying paper located at the nip position of the paper roll feed roller unit 58' is delivered to the cutting position of the paper roll cutter means 60'.

Generally, in an electrostatic copying apparatus including a feed means for feeding a roll of copying paper, the forward end of the copying paper cut in the preceding copying cycle is at the cutting position of the paper roll cutter means, and in the next cycle of copying, the copying paper is fed synchronously with the starting of scanning of the image of an original, whereby the forward end of the copying paper is delivered corresponding to the forward end of the image of the original and a toner image is formed on the copying paper in such a condition that the forward end of the image of the original substantially registers with the forward end of the copying paper. It is important therefore that when loading a new roll of copying paper in the paper roll feed a length of the paper roll should be unwound, and its forward end should be positioned at the cutting position of the paper roll cutter means. However, as already stated at the outset of the present specification, in the known electrostatic copying apparatus, part of the forward end portion of the copying paper is usually cut off and thus wasted, and a very complex operation must be performed in order to bring the forward end of the paper roll exactly to the cutting position of the paper roll cutter means.

In contrast, in the electrostatic copying apparatus of this invention which is provided with the paper roll feed means 52 or 52', the provision of the initial paper feed means 186 or 186', in the feed means 52 or 52' makes it possible to bring the forward end of the paper roll to the cutting position of the paper roll cutter means 60 or 60' by a very simple operation without wasting copying paper at the time of loading a new roll of copying paper 152 or 152'. Specifically, with the paper roll feed means 52, the only operation required is to mount the paper roll 162 on the support frame 140 held in the paper roll loading position, fix its forward end at the nip position of the paper roll feed roller unit 58, and then to pivot the support frame 140 to the paper roll unwinding position (by closing the main portion 138 of the right end wall of housing 2). As a result, by the action of the initial paper feed means actuated by the turning of the support frame 140, the forward end of the copying paper is automatically positioned at the cutting position of the paper roll cutter means 60. With the paper roll feed means 52', the only operation required is to load the paper roll 152' on the support frame 149' held in the paper roll loading position, fix its forward end at the nip position of the paper roll feed roller unit 58', and then to operate the manually operable lever 189' thereby turning the gear piece 188' of the initial paper feed means 186' from the first angular position to the second angular position. As a result, by the action of the initial paper feed means 186', the forward end of the copying paper is automatically positioned at the cutting position of the paper roll cutter means 60'.

Means for feeding a copying paper sheet in the paper transfer system

A paper sheet feeding means 54 of the copying paper transfer system 50 is described below in detail with reference to FIGS. 10 and 11 together with FIGS. 1 and 2.

As is seen from FIG. 2, in the electrostatic copying apparatus shown in the drawings, the paper sheet feed means 54 is provided immediately below the paper roll feed means 52. The sheet feed means 54 includes an opening 62 (see FIGS. 1 and 2) for insertion of copying paper in sheet form provided at the lower part of main portion 138 of the right end wall of housing 2, a paper sheet guide plate 198 fixed inwardly of, and adjacent, the opening 62, and a paper sheet receiving plate 64 for receiving a copying paper sheet inserted from the insertion opening 62 via a guide plate 198.

Figure 10:
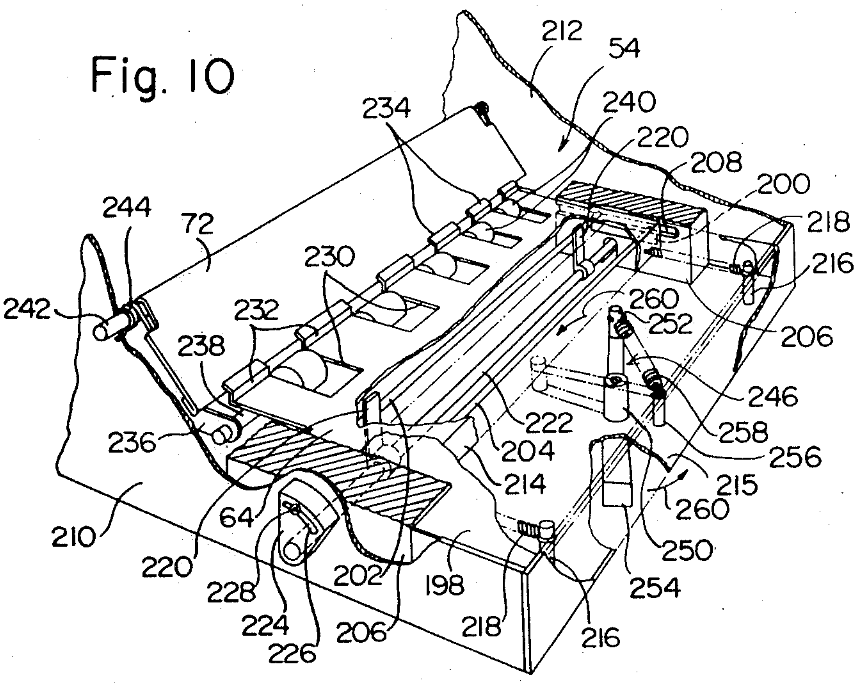
FIG. 10 is a perspective view, partly broken away, of a feed means for feeding a copying paper in sheet form in the electrostatic copying apparatus shown in FIG. 1.
Figure 11:
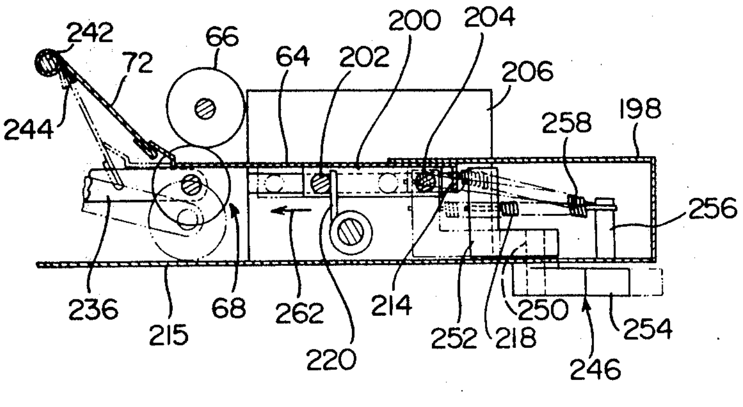
FIG. 11 is a simplified cross-sectional view of the copying paper sheet feeding means shown in FIG. 10.

With reference mainly to FIGS. 10 and 11, the paper sheet receiving plate 64 has a pair of suspending side pieces 200 integral therewith and extending from the intermediate portions of both side edges thereof perpendicularly downward. A pair of rods 202 and 204 are secured at spaced intervals in the left and right directions (i.e., in the direction of inserting the paper sheet) in FIG. 11 on these suspending side pieces 200. Both ends of each of the rods 202 and 204 project beyond the side pieces 200 of the receiving plate 64, and are fitted slidably in elongated slots 208 formed in a pair of mounting blocks 206. The mounting blocks 206 are secured to a pair of interior side plates 210 and 212 provided within housing 2 parallel to each other and spaced a predetermined distance from each other, and each elongated slot 208 formed in each of the mounting blocks 206 extends substantially horizontally in the left and right directions in FIG. 11. It will be appreciated therefore that the paper sheet receiving plate 64 is mounted slidably in the direction of inserting the copying paper sheet.

A suspending end piece 214 perpendicularly downwardly is formed at the outer end portion of the receiving plate 64 (i.e., the end portion on the side of the insertion opening 62) integrally therewith. A pull spring 218 which urges the receiving plate 64 in the left and right direction (i.e., the direction of the insertion opening 62) in FIG. 11 is connected to each of the two side portions of the suspending end piece 214 and to each of a pair of engaging pins 216 fixed at predetermined positions on a bottom plate 215 of housing 2. A pair of stopper members 220 with which the rod 202 is to come into abutment are secured to the rod 222, by the urging force of the pull springs 218 exerted on the receiving plate 64, the rod 202 is pressed against the pair of stop members 220, whereby the receiving plate 64 is held at a first position defined by the stop members 220 (the position shown by solid lines in FIGS. 10 and 11). The pair of stop members 220 are spaced a predetermined distance from each other on the support shaft 222. The support shaft 222 is rotatably secured to a pair of interior side plates 210 and 212, and by screwing a stop screw 228 into the interior side plate 210 through an arcuate slot 226 formed in a fan-shaped block 224 secured to one end of the support shaft 222, the support shaft 222 can be fixed adjustably at a predetermined angular position. It wil be clear that the positions of the stop members 220 are changed by changing the angular position of the support shaft 222, and therefore, by adjusting the angular position of the support shaft 222, the aforesaid first position of the receiving plate 64 can be minutely adjusted.

At the inward end portion of the receiving plate 64 are formed a plurality of openings 230 for an auxiliary member 68 for aiding in the supplying of a copying paper sheet. The area between adjoining openings 230 includes an erect portion 232 at its end extending to a predetermined height at right angles (substantially upwardly in the perpendicular direction in the embodiment shown in the drawings) to the direction of inserting the sheet-like copying paper and defining a sheet end positioning surface with which the forward end of the copying paper sheet inserted from insertion opening 62 through guide plate 198 makes contact; and a copying sheet end guide portion 234 extending from the upper end of the erect portion 232 upwardly and inwardly in an inclined manner.

At a position above the forward end of the receiving plate 64 a predetermined distance is rotatably mounted a paper sheet feed roller 66 illustrated in a simple form in FIGS. 2 and 11. The feed roller 66 is rotated upon selective connection to a drive source by the actuation of a clutch mechanism, and thus delivers a copying paper sheet to the receiving plate 64, as will be described in more detail hereinbelow. A copying paper sheet feeding auxiliary member 68 is mounted beneath the forward end portion of the receiving plate 64. The auxiliary member 68 is made up of a shaft 238 rotatably mounted on a support member 236, and a plurality of roller members 240 fixed to the shaft 238 at predetermined intervals. The support member 236 is movable for selective positioning at the position shown by solid lines in FIGS. 10 and 11 and the position shown by two-dot chain lines in FIG. 11. The auxiliary member 68 is in the inoperative position shown by two-dot chain lines in FIG. 11 (at which position, all the roller members 240 are located below the receiving plate 64) when inserting a copying paper sheet. But when delivering the copying paper sheet from the receiving plate 64, the auxiliary member 68 is brought to the operative position shown by solid lines in FIGS. 10 and 11. As a result, the upper portions of the roller members 240 project upwardly through the openings 230 to lift the copying paper sheet on the receiving plate 64 and urge it against the feed roller 66 and simultaneously to position the forward end of the copying paper sheet above the upper ends of the erect portions 232 of the receiving plate 64.

Inwardly of the receiving plate 64 is mounted a guide plate 72 for guiding the copying paper sheet delivered by the cooperative action of the feed roller 66 and the auxiliary member 68. One end of the guide plate 72 is pivotably mounted on rod 242 provided between the inside plates 210 and 212, and the guide plate 72 is urged counterclockwise in FIGS. 10 and 11 by means of a spring 244 fixed between the rod 242 and the guide plate 72 so that its free end is pressed against the guide portion 234 of the receiving plate 64.

The copying paper sheet feed means 54 further includes means 246 for moving the receiving plate for a copying paper sheet forward, which constitutes one important feature of the electrostatic copying apparatus of this invention. In the embodiment shown in FIGS. 10 and 11, the plate advancing means 246 has an erect shaft member 250 rotatably mounted on the bottom plate 215 of the housing 2. An actuator 252 is connected to that portion of the shaft member 250 which is situated above the bottom plate 215, and a manually operable lever 254 is connected to that portion of the shaft member 250 which is below the bottom plate 215 (i.e., outside of the housing 2). To the bottom plate 215 is fixed a stop pin 256 at a position spaced a predetermined distance from the shaft member 250 in a direction from the left bottom toward the right top in FIG. 10, and a pull spring 258 is secured to the stop pin 256 and the actuator 252 to connect them to each other. When the actuator 252 is located at the inoperative position shown a solid line in FIGS. 10 and 11, the pull spring 258 is in its most contracted state and elastically holds the actuator 252 at this inoperative position. When the manually operable lever 254 is operated to turn the lever 254 and the actuator 252 a predetermined amount in the direction shown by arrow 260 in FIG. 10 against the urging force of the pull spring 258, the pull spring 258 passes a point at which it is in the most stretched state, and urges the actuator 252 in the direction shown by arrow 260 to bring it to, and hold it resiliently at, the operative position shown by two-dot chain lines in FIGS. 10 and 11 at which the pull spring 258 again assumes the most contracted condition. In other words, the pull spring 258 acts to resiliently maintain the actuator 252 either at the inoperative position shown by solid lines in FIGS. 10 and 11 or at the operative position shown by two-dot chain lines in FIGS. 10 and 11. It is readily appreciated from FIG. 11 that when in the inoperative position shown by the solid lines, the actuator 252 is away from the suspending end pieces 214 of the receiving plate 64 and exerts no action on the receiving plate 64, and therefore that the receiving plate 64 is kept at a first position defined by stop members 220 (the portion shown by solid lines in FIGS. 10 and 11) by the urging force of the pull spring 218. When the actuator 252 is brought to the operative position shown by the two-dot chain lines by operating the lever 254, the actuator 252 abuts the suspending end pieces 214 of the receiving plate 64 to advance the receiving plate 64 a predetermined amount in the direction of feeding the copy paper sheet (i.e., the direction shown by arrow 262 in FIG. 11) against the action of the pull spring 218, thus bringing it to a second position shown by two-dot chain lines in FIG. 11 and holding it at the second position. When the receiving plate 64 is advancing to the second position, the guide portion 234 of the receiving plate 64 pushes the free end of the guide plate 72 to turn the guide plate 72 clockwise in FIG. 11 against the force of the spring 244 and bring it to the position shown by two-dot chain lines in FIG. 11.

The operation and advantage of the copying paper sheet feed means 54 equipped with the means 246 for advancing the receiving plate 64 are briefly described below. When an ordinary copying paper sheet (i.e., other than a master paper for making an offset master) is to be fed, the actuator 252 of the advancing means 246 is located at the inoperative position shown by the solid lines in FIGS. 10 and 11, and therefore the receiving plate 64 is positioned at the first position shown by the solid lines in FIGS. 10 and 11. In this state, a copying paper sheet is inserted through the insertion opening 62 formed in the main right end wall portion of the housing 2 over guide plate 198, and the forward end of the copying paper sheet is caused to abut the end positioning surface defining by the erect portions 232 at the forward end of the receiving plate 64. When the copying process is then started, the auxiliary member 68 for a copying paper sheet is caused to ascend from inoperative position shown by the two-dot chain lines in FIG. 11 to the operative position shown by the solid lines in FIGS. 10 and 11 during the preparation movement of the original-supporting means 4. As a result, the forward end portion of the inserted copying paper sheet is lifted, pressed against the feed roller 66, and brought to a position above the upper ends of the erect portions 232 of the receiving plate 64 so that the copying paper sheet is ready for delivery. When the original-supporting means 4 then starts its scanning movement, the feed roller 66 is rotated synchronously therewith to deliver the copying paper sheet. When the copying paper sheet which has been inserted from the insertion opening 62 and the forward end of which has abutted the end positioning surface of the receiving plate 64 located at the first position is delivered synchronously with the scanning of the image of the original in the manner described above, a toner image corresponding to the image of the original is formed on the copying paper sheet while the forward end of the image of the original substantially registers with the forward end of the copying paper shet. The above operation itself is known to those skilled in the art. For example, in the illustrated embodiments, this can be achieved by making the speed of delivering and transferring the copying paper sheet equal to the speed of scanning movement of the original-supporting means 4, and also making the length of the transfer passage from the end positioning surface of the receiving plate 64 to the transfer zone including the corona charger 16 for transfer correspond with the peripheral length of the rotary drum 8 ranging from the exposing position of the surface of the rotary drum on which the image of the original is to be projected to the transfer zone viewed in the rotating direction of the rotary drum 8.

In an electrostatic copying apparatus having means for feeding a copying paper sheet, it is the frequency practice to feed a master paper for offset printing by utilizing the copying paper sheet feed means, and thus to make an offset master. Since in setting an offset master in an offset printing press it is necessary to hold a certain width of its forward end portion in the machine, it is important to form a toner image corresponding to the image of the original on the master paper while leaving the required width of the forward end portion. When a master paper in sheet form for making an offset master is to be fed into the electrostatic copying apparatus of this invention by means of the paper sheet feed means 54 described hereinabove, it is first necessary to operate the manually operable lever 254 of the plate advancing means 246 to bring the actuator 252 to the operative position shown by the two-dot chain lines in FIGS. 10 and 11. This causes the receiving plate 64 to advance a predetermined distance from the first position shown by the solid lines in FIGS. 10 and 11, and to be positioned at the second position shown by the two-dot chain lines shown in FIG. 11. Then, the master paper is inserted by hand through the opening 62 formed in the main portion 138 of the right end wall through the guide plate 198, and its forward end is caused to abut the end positioning surface of the plate 64 defined by the erect portions 232 at the forward end of the receiving plate 64. As a result, the master paper is positioned at a point further forward than an ordinary copying paper sheet by an amount equal to the distance of advance of the receiving plate 64 (i.e., the distance between the first and the second positions of the receiving plate 64), and in this state, the offset master is supplied synchronously with the scanning of the image of the original. Hence, a toner image corresponding to the image of the original is formed on the master paper while leaving a forward end space corresponding to the advancing distance of the receiving plate 64. Of course, the distance over which the receiving plate 64 is advanced by the plate advancing means 246 is set at a value corresponding to the aforesaid holding width of the offset master.

Thus, according to the electrostatic copying apparatus of this invention having the paper sheet feed means 54, simply by operating the lever 254 of the plate advancing means 246 by hand to advance the receiving plate 64 from the first position to the second position, the master paper can be easily and accurately maintained at the desired position, and a toner image corresponding to the image of an original can be formed at the desired position of the master paper (namely, leaving the predetermined holding width at its forward end).

Control means for paper feed starting and paper selection lever means

Figure 12:
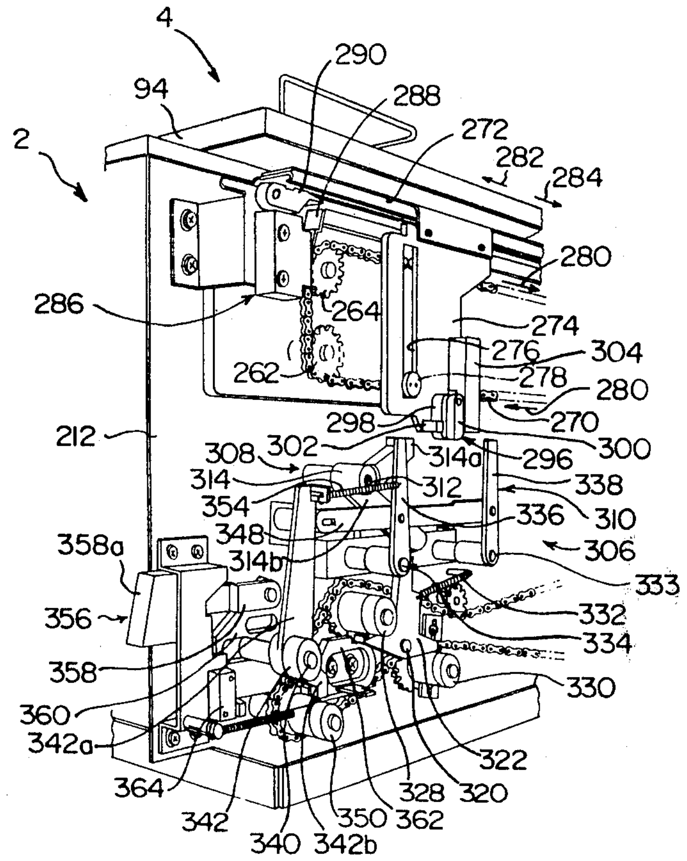
FIG. 12 is a perspective view, partly broken away, of a control means for controlling the starting of paper feed and a lever means for selecting a copying paper.

As described hereinabove, it is important that the feeding of a copying paper from the paper roll feed means 52 or the copying paper sheet feed means 54 of the copying paper transfer system 50 should be started synchronously with the starting of the scanning of the image of an original. In the illustrated electrostatic copying apparatus in which the copying paper transfer system 50 includes both the paper roll feed means 52 and the paper sheet feed means 54, it is important to feed a copying paper from either one of these paper feeding means which is selected as desired. With reference to FIGS. 12, 13-A to 13-F, and 14-A to 14-D together with FIGS. 1 and 2, a detailed description is given below of control means for starting the feeding of a copying paper synchronously with the starting of the scanning of the image of an original, and a selection lever means for selecting either one of the paper roll feed means 52 or the paper sheet feed means 54 as required.

Referring mainly to FIG. 12, in the illustrated electrostatic copying apparatus, four sprockets 262, 264, 266 and 268 (in FIG. 12, only the sprocket 262 and 264 are shown; for the other two sprockets, see FIGS. 13-C and 13-E) are rotatably supported on the outside surface of the interior side plate 212 which forms a pair with the interior side plate 210 within the housing 2 (see FIG. 10), and an endless chain 270 extend around these sprockets 262, 264, 266 and 268. To a support frame 94 for original-support means 4 which is slidably mounted on the top surface of the housing 2 as a result of being provided on a pair of guide rails 272 (only one of which is shown in FIG. 12) is fixed a follower plate 274 depending downwardly in the perpendicular direction from one off frame 94. In the follower plate 274 is provided an elongated slot 276 which extends in the perpendicular direction over a distance corresponding to the distance between the upper travelling portion and the lower travelling portion of the endless chain 270 extending around the four sprockets 262, 264, 266 and 268. Engaged in the slot 276 is a cam roller 278 which is fixed to the endless chain 270 and moves therewith. The endless chain 270 is driven in the direction of arrow 280 by means of an electric motor 48 (see FIG. 2) through a drive power system to be described hereinbelow. The movement of the endless chain 270 is transmitted to the follower plate 274 by the cam roller 278, and causes the original-support means 4 having the follower plate 274 to be reciprocated in the directions shown by arrows 282 and 284. In other words, when the cam roller 278 fixed to the endless chain 270 moves on the lower travelling portion of the endless chain 270 in the direction of arrow 280, the original-support means 4 is moved in the direction of the arrow 282. When the cam roller 278 moves on the upper travelling portion of the endless chain 270 in the direction of arrow 280, the original-support means 4 is moved in the direction of arrow 284. When the cam roller 278 moves on the perpendicular travelling portion between the sprockets 262 and 264 and between the sprockets 266 and 268 (see FIGS. 13-C and 13-E), its movement is relative to the follower plate 274 in the perpendicular direction within the slot 276 of the follower plate 274. Hence, the original-support means 4 is not moved.

A switch 286 for controlling the power supply to an original-illuminating lamp 30 (FIG. 2) of the optical system 26 is provided on the interior side plate 212 provided within housing 2. The switch 286 is of a known structure and includes an actuator 288 normally held in the open position illustrated in FIG. 12 by the action of a spring (not shown), and a holding member 290 which is urged clockwise in FIG. 12 by the action of a spring (not shown) and when the actuator is brought to the closed position, holds the actuator 288 in the closed position. As will be described in detail hereinbelow, when the original-support means 4 is moved to the extreme left as shown in FIG. 13-C (corresponding to the position of starting of scanning movement shown in FIG. 2 by solid lines), the actuator 288 is pressed by the top of the left side edge of the follower plate 274 to keep the switch 286 in the closed position. As a result, as shown in FIG. 13-C, the forward end of the actuator 288 comes into a recess 292 of the holding member 290, and the actuator 288 is held in the closed position by the action of the holding member 290. When the original-support means 4 is moved to the extreme right as shown in FIG. 13-E (corresponding to the position of terminating the scanning movement shown by two-dot chain lines 4B in FIG. 2), a switch actuating member 294 (see FIGS. 13-C and 13-E) fixed to the endless chain 270 abuts the holding member 290 to turn it counterclockwise FIG. 12 in against the urging force of the spring. As a result, the actuator 288 is elastically returned to the open position shown in FIG. 12.

To the follower plate 274 fixed to the original-support means 4 is further secured an actuator 296 constituting part of the means for controlling the starting of paper supply. In the illustrated embodiment, this actuator 296 is made up of a first actuator member 298 and a second actuator member 300. On the follower plate 274 are formed a first stop member 302 disposed in contact with the left side surface in FIG. 12 of the first actuator member 298 for preventing the turning of the first actuator member 298 clockwise from the state shown in FIG. 12, and a second stop member 304 disposed in contact with the right side surface in FIG. 12 of the second actuator member 300 for preventing the counterclockwise turning of the second actuator member 300 from the state shown in FIG. 12. Hence, the first actuator member 298 can freely turn counterclockwise in FIG. 12 from the state shown in FIG. 12 in which it is maintained by its own weight or by the relatively weak action of spring (i.e., the state in which the first actuator member 298 goes downward in the perpendicular direction and its left side surface contacts the first stop member 302), but cannot turn in the clockwise direction from that state. Likewise, the second actuator member 300 can freely turn clockwise in FIG. 12, but cannot turn counterclockwise, from the state shown in FIG. 12 in which it is maintained by its own weight or by the relatively weak action of spring.

At the lower portion of the interior side plate 212 provided within housing 2 is provided a lever mechanism shown generally at 306 which constitutes the control means for the starting of paper supply in cooperation with the actuator 296. The lever mechanism 306 in the illustrated embodiment includes a follower lever mechanism 308 cooperative with the first actuator member 298 of the actuator 296 and a secondary follower lever mechanism 310 cooperative with the second actuator member 300 of the actuator 296.

Referring mainly to FIGS. 12 and 13-A, the follower lever mechanism 308 cooperative with the first actuator member 298 of the actuator 296 will be described. The follower lever mechanism 308 includes a lever 314 mounted pivotally on a pin 312, an intermediate lever 318 (FIGS. 13-A and 13-D) mounted pivotally on a pin 316, and a clutch-engageable lever 322 mounted pivotally on a pin 320. The lever 314 has a first arm 314*a* and a second arm 314*b* having a slot 324 formed therein. The first actuating actuator member 298 is adapted for abutment with the first arm 314*a*. The intermediate lever 318 is pivotally and slidably connected to the second arm 314*b* of the lever 314 by inserting a pair of pins 326 (FIG. 13-D) pivoted on the intermediate lever 318 into the slot 324, and thus acts interlockingly together with the lever 314. The clutch-engageable lever 322 has its upper end portion engaged with a recess formed in the intermediate lever, and is therefore interlocked with the intermediate lever 318 and with the lever 314. The clutch-engageable lever 322 has a first engaging end 322*a* which comes into engagement with a clutch mechansim 328 for selectively disconnecting at least one roller (in the illustrated embodiment, roller 172) of the feed roller unit 58 of the paper roll feed means 52 from a drive source to render the roller inoperative (i.e., the roller 172 is not connected to the drive power source), and a second engaging end 322*b* which comes into engagement with a clutch mechanism 330 for selectively disconnecting the feed roller 66 of the copying paper sheet feed means 54 from a drive source and renders the roller inoperative. Each of the clutch mechanisms 328 and 330 can be a known clutch which will be maintained inoperative when the engaging ends 322*a* and 322*b* come into engagement therewith, but will become operative (i.e., the follers 172 and 66 are connected to the drive power source) when the engaging ends 322*a* and 322*b* are disengaged. Each of the clutch mechanisms 328 and 330 in the illustrated embodiment is a one-rotation type lap spring clutch (for example, a one-rotation type lap spring clutch commercially available as SA type, MSC type or CB type from Shinko Kenki Kabushiki Kaisha) having on its peripheral surface a collar having one engaging surface. These clutches are maintained inoperative when the engaging ends 322*a* and 322*b* of the clutch-engageable lever 322 come into engagement with the engaging surfaces of the collars. But when the engaging ends 322*a* and 322*b* are disengaged temporarily from the engaging surfaces of the collars, these clutches rotate through one turn until the engaging surfaces of the collars again come into engagement with the engaging ends 322*a* and 322*b* of the collars, and are operative only during this rotation. To the clutch-engageable lever 322 is also connected one end of a pull spring 332 with the other end connected to the interior side plate 212. The pull spring 332 exerts a clockwise urging force in FIG. 12 on the clutch-engageable lever 322, and resiliently holds follower lever mechanism 308 in the engaging position illustrated in FIG. 12 and FIG. 13-A. In other words, engaging ends **322*a* and 322*b* of the clutch-engageable lever 322 come into engagement with clutch grooves 328 and 330** and hold them resiliently in the inoperative state.

The cooperative action between the follower lever mechanism 308 and the first actuating member 298 of the actuator 296 will be described briefly. When the original-support means 4 moves from the extreme left position shown in FIG. 13-C (which position corresponds to the scanning movement starting position shown by the solid lines in FIG. 2) to the right in FIG. 13-C (such movement is a scanning movement), the first actuating member 298 abuts the forward end of the first arm **314*a* of the lever 314 (at which time the scanning of the image of the original, that is, the exposure scanning of the transparent plate 96 of the original-support means 4 from its forward end to rearward end, is started; the scanning movement up to this time is a so-called idle movement). As a result, the follower lever mechanism 308 is brought to the non-engaging position illustrated in FIG. 13-D at which the lever 314 is turned clockwise, the intermediate lever 318 is turned counterclockwise, and the clutch-engageable lever 322 is turned counterclockwise. In the non-engaging position, the first engaging end 322*a* of the clutch-engageable lever 322 is separated from the clutch mechanism 328, and the second engaging end 322*b* of the clutch-engageable lever 322 is separated from the clutch mechanism 330. When the first actuating member 298 separates from the first arm 314*a* of the lever 314 as a result of the continued scanning movement of the original-support mechanism 4, the follower lever mechanism 308 is returned to the engaging position (i.e., the state shown in FIG. 12 and FIG. 13-A) by the action of the pull spring 332. When the original-support means 4 moves from the position shown in FIGS. 12 and 13-A (this position corresponds to the stopping position shown by a two-dot chain lines 4A in FIG. 2) to the position shown in FIG. 13-C (i.e., the scanning movement starting position) toward the left in FIG. 13-A (such movement is a preparatory movement), the first actuator member abuts the forward end of the first arm 314*a*. In this case, the first actuator member 298 is turned counterclockwise in FIG. 12, and the follower lever mechanism 308** is not turned.

Now, referring mainly to FIGS. 12 and 13-A, a subsidiary follower lever mechanism 310 which cooperates with the second actuator member 300 of the actuator 296 will be described. The subsidiary follower lever mechanism 310 includes a pair of levers 336 and 338 mounted pivotally by means of pins 333 and 334, and a clutch-engageable lever 342 mounted pivotally by means of a pin 340. When the original-support means 4 is at the position (i.e., the stopping position) shown in FIGS. 12 and 13-A, the levers 336 and 338 positioned on both sides of the second actuating member 300 of the actuator 296 are connected to each other by a linking lever 348 secured to each of them by means of pins. When the second actuator member 300 abuts one of the levers 336 and 338 to turn it, these levers are interlockingly with each other. The clutch-engageable lever 342 has a first arm **342*a* engageable with the extended end of the linking lever 348 (i.e., the left end in FIGS. 12 and 13-A), and a second arm 342*b* having an engaging end engageable with the clutch mechanism 350. The clutch mechanism 350 serves to connect selectively to a drive power source an actuator (the structure of this actuator will be described in more detail hereinbelow) for moving the paper supply auxiliary member 68 of the copying sheet feed means 54 from the inoperative position shown by two-dot chain lines shown in FIG. 11 to the operative position shown by the solid lines. The clutch mechanism 350 can be a known clutch which is adapted to be maintained in the inoperative state (i.e., the state in which it does not connect the auxiliary member actuator to the drive power source) when the second arm 342*b* of the clutch-engageable lever 342 is in engagement with it, but which is in the operative state (i.e., the state in which it connects the auxiliary member actuator to the drive source) when the second arm 342*b* of the clutch-engageable lever 342 is separated therefrom. The clutch mechanism 350 shown in the drawings is a half-rotation type lap spring clutch equipped with a collar having two engaging surfaces formed on its periphery at a distance of 180 degrees (for example, half-rotation type lap spring clutches sold by Shinko Electrical Co., Ltd. such as SA type, MSC type of CB type). It is maintained in the non-operative state when the second arm 342*b* of the clutch-engageable lever 342 is in engagement with one of the two engaging surfaces of the collar; but when the second arm 342*b* is temporarily separated from one of the two engaging surfaces of the collar, the clutch mechanism 350 rotates through a half turn until the other engaging surface of the collar comes into engagement with the second arm 342*b* of the clutch-engageable lever 342, and becomes operative during this half-turn rotation. To the linking lever 348 of the subsidiary follower lever mechanism 310 is connected one end of pull spring 352 (see FIG. 13-A) the other end of which is connected to the interior side plate 212. This pull spring 352 exerts a rightward urging force in FIG. 13-A on the linking lever 348, and therefore, exerts a clockwise urging force in FIGS. 12 and 13-A on the pair of levers 336 and 338. A pull spring 342 is also stretched between the lever 336 and the first arm 342*a* of the clutch-engageable lever 342. The pull spring 354 exerts a counterclockwise urging force in FIGS. 12 and 13-A on the lever 336 and a clockwise urging force in FIGS. 12 and 13-A on the clutch-engageable lever 342, and maintains the first arm 342*a* of the clutch-engageable lever 342 and the extended end of the linking lever 348 in contact with each other. Hence, the actions of the pull springs 352 and 354 resiliently maintain the subsidiary follower lever mechanism 310 in the engaging position illustrated in FIGS. 12 and 13-A at which the second arm 342*b* of the clutch-engageable lever 342 comes into engagement with the clutch mechanism 350 to maintain it in the inoperative state. The cooperative action of the subsidiary follower lever mechanism 310 and the second actuating member 300 of the actuator 296 is described briefly below. When the original-support means 4 moves to the left in FIG. 12 (such a movement is a preparatory movement) from the position shown in FIGS. 12 and 13-A (i.e., the stopping position) toward the extreme left position shown in FIG. 13-C (i.e., the position at which the movement is started), the second actuating member 300 abuts the forward end of the lever 336 as shown in FIG. 13-B to turn the levers 336 and 338 and the clutch-engageable lever 342 pivotally in the counterclockwise direction, and the subsidiary lever mechanism 310 is brought to the non-engaging position shown in FIG. 13-B. In the non-engaging position, the second arm 342***b* of the clutch-engageable lever 342 is separated from the clutch mechanism 350. When the second actuating member 300 separate from the lever 336 as a result of the continued preparatory movement of the original-support means 4, the actions of the pull springs 352 and 354 return the subsidiary follower lever mechanism 310 to the engaging position (i.e., the state shown in FIGS. 12 and 13-A). When the original-support means 4 moves to the left in FIG. 12 from the extreme right position shown in FIG. 13-E (this position corresponds to the scanning movement terminating position shown by two-dot chain lines 4B in FIG. 2) toward the position shown in FIG. 12 (i.e., the stopping position), the second actuating member 300 abuts the forward end of the lever 338 as shown in FIG. 13-F thereby to turn the levers 336 and 338 and the clutch-engageable lever 342 pivotally in the counterclockwise direction, and the subsidiary follower lever mechanism 310 is brought to the non-engaging position shown in FIG. 13-B. When the second actuating member 300 separates from the lever 338 as a result of the continued returning movement of the original-support means 4, the actions of the pull springs 352 and 354 return the subsidiary follower lever mechanism 310 to the engaging position (i.e., the state shown in FIGS. 12 and 13-A). Also, when the original-support means 4 makes a scanning movement from the extreme left position shown in FIG. 13-C (i.e., the position at which scanning movement starts) toward the right in FIG. 12, the second actuating member 300 abuts the levers 336 and 338, the second actuating member is turned clockwise in FIG. 12, but the subsidiary follower lever mechanism 310 remains stationary.

Now, referring to FIGS. 12, 13-A and 14-A, the copying paper selection lever mechanism 356 will be described which serves to supply a copying paper from either the paper roll feed means 52 or the copying paper sheet feed means 54. The selection lever mechanism 356 is made up of a manually operable selection lever 358, a switch-engaging lever 360 connected to the selection lever 358, and a clutch-engageable lever 362 connected to the switch-engaging lever 360 (namely, connected to the selection lever 358 through the switch-engaging lever 360). The selection lever mechanism 356 is mounted on the interior side plate 212 within the housing 2 so that by gripping the grip portion 358*a* of the selection lever 358 and operating it manually, it is selectively positioned at either the paper roll feeding position shown by two-dot chain lines in FIG. 14-A and solid lines in FIGS. 12 or 13-A, and the paper sheet feeding position shown by broken lines in FIG. 14-A. The grip portion 358*a* of the selection lever 358 projects outwardly from an opening formed in the side edge portion of the right end wall (positioned at the left end in FIGS. 12 and 13-A) of the housing 2. Thus, by gripping the grip portion 358*a* from outside the housing 2, the selection lever 358 (therefore, the selection lever mechanism 356) can be operated. Adjacent the switch-engaging lever 360 is fixed an electric switch 364 disposed in a circuit for supplying power to a cutter means actuator (to be described hereinbelow in more detail) composed of a solenoid which is to be selectively energized to actuate the paper roll cutter means 60 (see FIG. 2). When the switch-engageable lever 360 of the selection lever mechanism 356 is set at the paper roll feeding position shown by the solid lines in FIGS. 12 and 13-A and the two-dot chain lines in FIG. 14-A, it comes into engagement with an actuator for the switch 364 and maintains the switch 364 in the closed state; and when it is set at the paper sheet feeding position shown by the broken lines in FIG. 14-A, it is separated from the actuator for the switch 364 to maintain the switch 364 in the open state. Accordingly, when the selection lever mechanism 356 is set at the paper roll feeding position, the paper roll cutter means 60 can be operated by energizing the aforesaid solenoid for actuating the paper roll cutter means 60. But when the selection lever mechanism 356 is set at the paper sheet feeding position, the solenoid cannot be energized, and therefore, the solenoid becomes inoperative. When the clutch-engageable lever 362 of the selection lever mechanism 356 is set at the paper roll feeding position shown by the solid lines in FIGS. 12 and 13-A and the two-dot chain lines in FIG. 14-A, its first engaging end 362*a* comes into engagement with the clutch mechanism 350, and maintains it in the inoperative state. Hence, when the selection lever mechanism 356 is set at the paper roll feeding position, the second actuating member 300 of the actuator 296 pivotally turns the subsidiary follower lever mechanism 310, and even if the clutch-engageable lever 342 of the subsidiary follower lever mechanism 310 is separated from the clutch mechanism 350, the clutch-engageable lever 362 of the selection lever mechanism 356 is in engagement with the clutch mechanism 350. Hence, the clutch mechanism remains inoperative.

On the other hand, when the selection lever mechanism 356 is set at the paper sheet feeding position shown by the broken lines in FIG. 14-A, the first engaging end 362*a* of the clutch-engageable lever 362 is separated from the clutch mechanism 350, and the second engaging end 362*b* of the clutch-engageable lever 362 comes into engagement with the clutch mechanism 328 to maintain it in the inoperative state. The clutch mechanism 328 serves to selectively connect the roller 172 of the feed roller unit 58 of the paper roll feed means 52. Accordingly, when the selection lever mechanism 356 is set at the paper sheet feeding position, the first actuating member 298 of the actuator 296 turns the follower lever mechanism 308 to separate the clutch-engageable lever 322 from the clutch mechanism 328. However, since the clutch-engageable lever 362 of the selection lever mechanism 356 is still in engagement with the clutch mechanism 328, the clutch mechanism 328 remains inoperative.

With reference mainly to FIG. 14-A, the manner of mounting the paper feeding auxiliary member 68 (see FIGS. 10 and 11) of the paper sheet feed means 54 and the actuating device 366 for moving the auxiliary member 68 from the inoperative position shown by two-dot chain lines shown in FIG. 11 to the operative position shown by solid lines in FIG. 11 will be described below.

Referring to FIGS. 14-A and 14-B, to the interior side plate 212 (see FIGS. 10 and 12) within housing 2 is secured a power transmitting member 368 which is adapted to slide in the left and right directions in FIGS. 14-A and 14-B between the anchoring position shown by solid lines in FIGS. 14-A and 14-B and the operating position shown by two-dot chain lines in FIG. 14-B. The power transmitting member 368 is normally resiliently held at the anchoring position by a suitable spring (not shown). On the other hand, the support member 236 for supporting the auxiliary member 68 for paper sheet feeding is pivotally mounted on support pin 370 and is urged clockwise in FIGS. 14-A and 14-B by a suitable spring (not shown). The support member 236 has integrally formed therein a contact arm 236a the end of which is adapted to contact the power transmitting member 368. Hence, when the power transmitting member 368 is held in the aforesaid anchoring position, the contact arm 236a makes contact with the transmitting member 368. As a result, the support member 236 is kept in the state shown by solid lines in FIGS. 14-A and 14-B in which the auxiliary member 68 is positioned at the inoperative position below the receiving plate 64 of the paper sheet feed means 54.

The auxiliary member-actuating device 366 which is to be connected selectively to a drive power source by means of the aforesaid clutch mechanism 350 is made up of an eccentric semi-circular cam in the embodiment shown in the drawings. When the clutch mechanism 350 composed of a half-rotation type lap spring clutch becomes operative and rotates through a half turn, the eccentric semi-circular cam is rotated through a half turn in the counterclockwise direction from a first position shown by solid lines in FIGS. 14-A and 14-B, and brought to a second position shown by two-dot chain lines shown in FIG. 14-B. When the clutch mechanism 350 in this state becomes operative and rotates through a half turn, the eccentric semi-circular cam further rotates counterclockwise through a half turn and returns from the second position to the first position. When the eccentric semi-circular cam constituting the auxiliary member-actuating device 366 is rotated through a half turn from the first position and thus brought to the second position, it abuts the transmitting member 368 to move the transmitting member 368 from the aforesaid anchoring position to the operative position against the force of the spring. As a result, the support member 236 is turned counterclockwise from the position shown by the solid lines in FIGS. 14-A and 14-B to the position shown by the two-dot chain lines shown in FIG. 14-B against the force of the spring. Consequently, the auxiliary member 68 is moved to the operative position (i.e., the position shown by solid lines in FIGS. 10 and 11 and two-dot chain lines in FIG. 14-B) at which the auxiliary member 68 projects upward through the opening 230 (see FIG. 10) formed in the forward end portion of the receiving plate 64, and lifts a sheet of copying paper placed on the receiving plate 64 to press it against the copying sheet feed roller 66. When the eccentric semi-circular cam is further rotated through half a turn from the second position and is returned to the first position, it separates from the power transmitting member 368. As a result, the transmitting member 368 returns to the aforesaid anchoring position from the operative position by the force of the spring. The support member 236 is turned clockwise in FIGS. 14-A and 14-B by the force of the spring and returns to the position shown by solid lines in FIGS. 14-A and 14-B, and therefore, the auxiliary member 68 returns to the inoperative position (i.e., the position shown by two-dot chain llines in FIG. 11 and solid lines shown in FIGS. 14-A and 14-B).

Referring to FIGS. 12, 13-A to 13-G, and 14-A to 14-D, the actions of the control mechanism for starting of paper feed and the selection lever mechanism are described briefly in relation to the original-support means 4.

When the copying process is to be started, the selection lever mechanism 356 is set at either the paper roll feeding position or the paper sheet feeding position. First, the case of positioning the selection lever mechanism 356 at the paper roll feeding position will be described with reference to FIGS. 13-A to 13-F. In the illustrated electrostatic copying apparatus, the original-support means 4, before the start of the copying process, is located at the position shown in FIG. 13-A (i.e., the stopping position shown by the two-dot chain lines 4A in FIG. 2 and the solid lines in FIG. 1). When the copying process has started, the original-support means 4 first makes a preparatory movement from the stopping position to the left in FIG. 13-A toward the position illustrated in FIG. 13-C (i.e., the scanning movement starting position shown by solid lines in FIG. 2). During this preparatory movement, the second actuating member 300 of the actuator 296 abuts the lever 336 as shown in FIG. 13-B to turn the subsidiary lever mechanism 310 temporarily to the non-engaging position to separate it from the clutch mechanism 350. However, since the clutch-engageable lever 362 of the selection lever mechanism 356 at the paper roll feeding position comes into engagement with the clutch mechanism 350 and maintains it in the inoperative state, the actuator 366 is not rotated, and the copying sheet feeding auxiliary member 68 is held at the inoperative position.

When the original-support means 4 makes a preparatory movement to the position of starting the scanning movement shown in FIG. 13-C, the follower plate 274 secured to the original-support means 4 as shown in FIG. 13-C presses the actuator 288 to close the switch 286 (whereby the switch 286 is maintained closed by the action of the support member 290). As a result, the original-illuminating lamp 30 (FIG. 30) of the optical system 26 is lighted.

Then, the original-support means 4 begins to make a scanning movement to the right in FIG. 13-C from the starting position shown in FIG. 13-C toward the position shown in FIG. 13-E (i.e., the position shown by the two-dot chain lines 4B in FIG. 2 at which the scanning movement ends). When the original-support means 4 has made a scanning movement through a predetermined distance and reached the position shown in FIG. 13-D at which the scanning of the image of the original is actually started, the first actuating member 298 of the actuator 296 abuts the lever 314 to turn the follower lever mechanism 308 temporarily to the non-engaging position and separate it from the clutch mechanisms 328 and 330. As a result, the clutch mechanism consisting of a one-rotation type lap spring clutch becomes operative and rotates through one turn, and during this time, the roller 172 of the paper roll feed roller unit 58 is connected to a drive power source to drive the roller unit 58, and thus, the supply of paper from the roll of copying paper is started synchronously with the starting of the scanning of the image of the original. At the same time, the clutch mechanism 330 composed of a one-rotation type lap spring clutch becomes operative and rotates through one turn, and during this time, the copying sheet feed roller 66 is connected to a drive power source and is thus rotated. However, since the auxiliary member 68 is held in the inoperative position, any sheet of copying paper which may have been fed to the receiving plate 64 will not be supplied.

When the original-support means 4 has made a scanning movement to the position of the termination of scanning movement shown in FIG. 13-E, the switch actuating member 294 fixed to endless chain 270 as shown in FIG. 13-E abuts the support member 290 for switch 286 to turn it counterclockwise. As a result, the actuator 288 for the switch 286 is returned to the open position to render the switch 286 open, thereby turning off the illuminating lamp 30 (FIG. 2) of the optical system 26.

After this operation, the original-support means 4 moves from the scanning movement terminating position shown in FIG. 13-E to the stopping position shown in FIG. 13-A. During this returning movement, the second actuating member 300 of the actuator 296 illustrated in FIG. 13-F abuts the lever 338 to turn the subsidiary follower lever mechanism 310 temporarily to the non-engaging position and separate it from the clutch mechanism 350. However, since the clutch-engageable lever of the selection lever mechanism 356 at the paper roll feeding position is in engagement with the clutch mechanism 350 and keeps it in the inoperative state, the actuator for the auxiliary member 68 will never be rotated.

Now, the case of the selection lever mechanism 356 being set at the paper sheet feeding position will be described below with reference to FIGS. 14-A to 14-D together with FIGS. 13-A to 13-F.

When the copying process has been started, the original-support means 4 makes a preparatory movement to the right in FIG. 14-A from the position shown in FIG. 14-A (corresponding to the stopping position shown in FIG. 13-A) toward the scanning movement starting position shown in FIG. 13-C. During this preparatory movement, the second actuating member 300 of the actuator 296 illustrated in FIG. 14-B abuts the lever 336 to turn the subsidiary follower lever mechanism 310 temporarily to the non-engaging position and separate it from the clutch mechanism 350. As a result, the clutch mechanism 350 composed of a half-rotation type lap spring clutch becomes operative and rotates through a half-turn, and during this time, the actuator 366 for the auxiliary member 68 is connected to a drive power source and is rotated through a half turn from the first position shown by solid lines in FIG. 14-B to the second position shown by two-dot chain lines in FIG. 14-B. Consequently, the auxiliary means 68 for supplying a sheet of copying paper is moved from the inoperative position shown by a solid line in FIG. 14-B to the operative position shown by two-dot chain lines in FIG. 14-B, and the sheet of copying paper fed onto the receiving plate 64 of the feed mechanism 54 is ready for feeding.

When the original-support means 4 has made a preparatory movement to the scanning movement starting position shown in FIG. 13-C, the switch 286 is closed to light the illuminating lamp 30 (FIG. 2) of the optical system, as stated hereinabove. Then, the original-support means 4 starts its scanning movement to the right in FIG. 13-C (to the left in FIG. 14-C) from the starting position shown in FIG. 13-C toward the terminating position shown in FIG. 13-E. When the original-support means 4 has made a scanning movement through a predetermined distance and moved to the position shown in FIGS. 13-D and 14-C at which the scanning of the image of the original is actually started, the first actuating member 298 of the actuator 296 abuts the lever 314, to turn the follower lever mechanism 308 temporarily to the non-engaging position and to separate it from the clutch mechanisms 328 and 330. As a result, the clutch mechanism 330 composed of a one-rotation type lap spring clutch becomes operative and rotates through one turn, and during this time, the paper sheet feed roller 66 is connected to a drive power source and rotated, and therefore, the supply of a sheet of copying paper is started synchronously with the starting of the scanning of the image of the original. On the other hand, since the clutch mechanism 328 is in engagement with the clutch-engageable lever 362 of the copying paper selection lever mechanism 256 at the sheet feeding position, it is maintained in the inoperative state, and therefore, the paper roll feed roller unit 58 is not driven.

When the original-support means 4 makes a scanning movement to the position of termination of scanning movement shown in FIG. 13-E, the switch 286 is changed to the open state to turn off the illuminating lamp 30 (FIG. 2) of the optical system 26.

Then, the original-support means 4 returns to the left in FIG. 13-E (to the right in FIG. 14-D) from the scanning movement terminating position shown in FIG. 13-E, and returns to the stopping position shown in FIG. 13-A. During this returning movement, the second actuating member 300 of the actuator 296 abuts the lever 338 as shown in FIG. 14-D (FIG. 14-D corresponds to FIG. 13-F) to turn the subsidiary follower lever mechanism 310 temporarily to the non-engaging position and to separate it from the clutch mechanism 350. As a result, the clutch mechanism 350 composed of a half-rotation type lap spring clutch becomes operative and rotates through a half turn, and during this time, the actuator 366 for the auxiliary member 68 is connected to a drive power source and rotated through a half turn from the second position shown by the two-dot chain lines in FIG. 14-D to the first position shown by the solid lines in FIG. 14-D. As a result, the auxiliary member 68 for the feeding of a copying paper sheet is returned to the inoperative position shown by the solid lines in FIG. 14-D from the operative position shown by a two-dot chain lines in FIG. 14-D.

As stated at the outset of the specification of the present application, in a conventional electrostatic copying apparatus, relatively sophisticated, expensive and relativey difficult-to-adjust electrical control means is required in order to start the supply of copying paper synchronously with the scanning of the image of the original. When the copying paper transfer system includes both a paper roll feed mechanism and a paper sheet feed mechanism, a relatively sophisticated and expensive electrical means for paper selection is required in order to supply the copying paper from either of the feed means desired.

In contrast, in the electrostatic copying machine in accordance with this invention, the mechanical control mechanism for starting paper feed composed of actuator 296 and lever mechanism 306 (in the illustrated embodiment, this lever mechanism 306 includes follower lever mechanism 308 and subsidiary follower lever mechanism 310) ensures that the supply of copying paper is started completely synchronously with the starting of the scanning of the image of an original. The mechanical control mechanism for the supply of copying paper in the electrostatic copying apparatus of this invention is much lower in cost than the conventional electrical control means. Moreover, this control mechanism can be very simply and easily adjusted by merely adjusting the mounting position or angular position of the actuating members 298 amd 300 of the actuator 296 or the levers 314, 336 and 338 of the lever mechanism 306. Furthermore, the desired copying paper can be selected surely and simply by the mechanical selection lever mechanism 356 which is much lower in cost than the conventional electrical selection mechanism.

In the foregoing, the paper feed start controling mechanism and the copying paper selection lever mechanism have been described in regard to an electrostatic copying apparatus of the original-moving type in which the original-support means makes a preparatory movement, a scanning movement and a returning movement. Needless to say, it will be obvious that the basic concept of these mechanisms is equally applicable to electrostatic copying apparatuses of various original-moving types including the type in which the original-support means starts a scanning movement directly from the stopping position, and to electrostatic copying apparaus of the optical system-moving type in which some or all of the constituent elements of the optical system move to scan the image of an original to be copied. For example, when the paper feeding start control mechanism is to be applied to an electrostatic copying apparatus of the optical system moving type, the actuator 296 can be mounted such that it moves together with the constituent elements of the optical system.

Device for controlling the driving of a paper roll cutter means

When the copying paper transfer system 50 of an electrostatic copying apparatus includes a paper roll feed mechanism 52, it is important that when a paper roll is unwound from the cutting position C (see FIG. 7) of the paper roll cutter means 60 synchronously with the starting of the scanning of the image of an original to the desired length, for example a length corresponding to the length of an original or a predetermined standard length, the cutter means 60 should be operated to cut the paper roll to the desired length. Now, referring mainly to FIGS. 15 to 17, a drive control device for operating the paper roll cutter means 60 at the desired time to cut the paper roll to the desired length will be described in detail.

Figure 15:
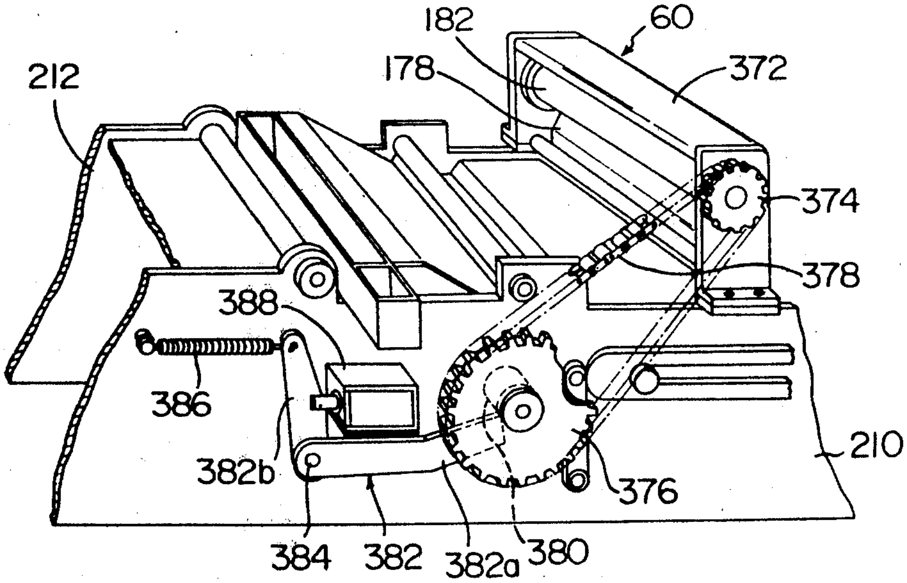
FIG. 15 is a perspective view, partly broken away, of a cutter means for cutting a roll of copying paper in the electrostatic copying apparatus shown in FIG. 1, and its operating mechanism.

First, the mode of driving the paper roll cutter means 60 shown in the illustrated embodiment will be described with reference to FIG. 15. As stated already with reference to FIGS. 6 to 8, the paper roll cutter means 60 has stationary member 178 and rotary member 182, and by the rotation of the rotary member 182, a copying paper passing between them is cut. The stationary member 178 and the rotary member 182 are mounted on a frame 372 secured to the interior side plates 210 and 212. The stationary member 178 is fixed to the frame 372, and the rotary member 182 is rotatably supported on the frame 372. One end of the rotary member 182 projects beyond the side surface of the frame 372, and has an input sprocket 374 fixed thereto. On the interior side plate 210 is rotatably mounted a sprocket 376 having two times as many teeth as the input sprocket 374. The input sprocket 374 and the sprocket 376 are drivingly connected by means of an endless chain 378. The sprocket 376 is selectively connected to a drive power source by means of a clutch mechanism 380 which can be a known clutch the same as the half-rotation type lap spring clutch constituting the clutch mechanism 350 described hereinabove, and is thus rotated. On the interior side plate 210 is further mounted rotatably by means of a pin 384 a clutch-engageable lever 382 capable of being engaged with the clutch mechanism 380 and maintaining it in the inoperative state. The clutch-engageable lever 382 has a first arm **382*a* and a second arm 382*b* connected to each other integrally. To the free end of the second arm 382*b* is connected one end of a pull spring 386 having the other end fixed to the interior side plate 210. The pull spring 386 exerts a counterclockwise force in FIG. 15 on the clutch-engageable lever 382, and resiliently acts on the clutch-engageable lever 382 in such a manner that the first arm 382*a* comes into engagement with the clutch mechanism 380. To the second arm 382*b* of the clutch-engageable lever 382 is connected an actuator for a solenoid 388 mounted at an arbitrary position on the interior side plate 210. The solenoid 388 constituting the actuator for the cutter means, when energized in the manner to be described hereinbelow, turns the clutch-engageable lever 382 clockwise in FIG. 15 against the force fof the pull spring 386 to separate the forward end of the first arm 382*a* from the clutch mechanism 380. Hence, when the solenoid 388 is temporarily energized, the forward end of the first arm 382*a* of the clutch-engageable lever 382 is detached from the clutch mechanism 380. As a result, the clutch mechanism 380 becomes operative and rotates through a half turn, and during this time, the sprocket 376 is connected to a drive power source and rotated through a half turn. When the sprocket 376 is rotated through a half turn, the input sprocket 374 is rotated through one turn, and therefore, the rotary member 182 of the paper roll cutter means 60 is rotated through one turn. Consequently, the cooperative action of the rotary member 182 and the stationary member 178** effects the cutting of copying paper.

Now, with reference mainly to FIGS. 16 and 17, a drive control device will be described in detail with controls the energization of the solenoid constituting the cutter means actuator, and therefore, the operation of the paper roll cutter means 60.

In the illustrated electrostatic copying apparatus of this invention, at least a part 390 (in the illustrated embodiment, a lower portion in FIG. 16) of an inside surface of an original-holding member 98 provided on the original-support means 4 (that surface of the holding member 98 which faces the transparent plate 96 and the original when the member 98 covers the transparent plate 96 and the original placed thereon as shown in FIG. 1) has dark color characteristics. In other words, the part 390 of the original-holding member 98 is colored in a dark color such as black so that when the light reflected from the part 390 is projected onto photosensitive member 121 on rotary drum 8, the light-sensitive member 121 looks like a dark area. It is important that the part 390 having dark color characteristics should contain an area of a predetermined width corresponding at least to one of the edge portions of the transparent plate 96. In the illustrated embodiment, the region with a width X corresponding to the edge portion of the transparent plate (the edge portion having a width Y located in the upper part in FIG. 17) and the lower region than this region in FIG. 16 are colored in a dark color. The lower region than the region of width X corresponds to the surface of the support frame 94 outwardly of the edge of the transparent plate 96, and is a region not illuminated by the illuminating lamp 30 (FIG. 2) of the optical system. Thus, it need not always be a dark color, but may be any desired color. That portion which is above the region of width X and corresponds to the main portion of the transparent plate 96 other than the edge portion preferably has bright color characteristics (namely, it is colored in a bright color such as white so that when the light reflected from it is projected onto the light-sensitive member 121 on the rotary drum 8, the light-sensitive member 121 looks like a bright area) as is the case with the inside surface of the original-holding member in conventional electrostatic copying apparatuses.

In the illustrated electrostatic copying apparatus, the aforesaid side edge of transparent plate 96 corresponds to part 392 (see FIG. 5) of the edge of the rotary drum on which the light-sensitive member 121 is not present. When the light from the original-illuminating lamp 30 of the optical system 26 scans the transparent plate 96 or an original placed thereon during the relative movement of the original-support means 4 and the optical system 26 (in the illustrated embodiment, the relative movement between them is effected by the movement of the original-support means 4), the light reflected at the aforesaid edge of the transparent plate 96 is projected toward the portion 392 of the rotary drum 8.

In the path of the light reflected at the aforesaid edge of transparent plate 96, a light detector 394 (see FIG. 2) is provided which receives the reflected light and detects a change in reflectance at the aforesaid edge portion of the transparent plate 96. The light detector 394 may be of a known element such as a phototransistor or photocell. It may be provided at any desired position in the path of the reflected light ranging from the aforesaid edge of transparent plate 96 to the portion 392 of rotary drum 8. Preferably, it is disposed at the remotest possible position from the in-mirror lens 34 of optical system 26, and therefore in the vicinity of the rotary drum 8 or in the vicinity of the transparent plate 96. This is because the reflected light converges as it approaches the in-mirror lens 34 and diverges as it moves away from the in-mirror lens 34, and the provision of light detector 394 at a position remote from the in-mirror lens 34 permits a large width of light to be received by the light detector 394. In the illustrated embodiment, the light detector 394 is provided near the rotary drum, as is seen from FIG. 2.

The drive control device consisting of the light detector 394 and the portion 390 having dark color characteristics which is on the inside surface of the original-holding member 98 operates as follows and has the following advantages.

In copying an original, the original is first placed on the transparent plate 96 of the original-support means 4. When placing the original on the transparent plate 96, it is important to register the forward end of the original with the forward end of the transparent plate 96 (i.e., the left end of the transparent plate 96 in FIGS. 16 and 17)(or extend it beyond the end of the transparent plate 96), and to register the edge of the original with the aforesaid side edge of the transparent plate 96 (i.e., the edge having width Y at the upper part of FIG. 17). Then, the original-holding member 98 is caused to cover the transparent plate 96 and the original placed thereon, as shown in FIG. 1. Generally, almost all documents to be copied have at their edge a substantial blank margin having a bright color such as white. Accordingly, when the original and the original-holding member 98 are in the aforesaid state, the bright color of the marginal portion of the original is exposed to the optical system 26 in the range from the forward end of the transparent plate 96 to the rear end of the original at the aforesaid side edge of the transparent plate 96. Rearward of the original, the dark color of the region with width X at the portion 390 of the original-holding member 98 is exposed to the optical system 26. Accordingly, the reflectance changes markedly at the rear end of the original. When the original-support means 4 and the optical system 26 are moved relative to each other to perform scanning (in the illustrated embodiment, the original-support means 4 is caused to make a scanning movement), the reflected light of bright color is projected onto the light detector 394 in the range from the forward end of the transparent plate 96 to the rear end of the original, and rearward of the original, the reflected light of dark color is projected onto the light detector 394. Thus, at the time of scanning the rear end of the original, the light detector 394 detects marked changes in reflectance at the rear end.

As will be described in more detail hereinbelow with reference to an electrical circuit, the light detector 394 generates a signal when it detects a change in reflectance at the aforesaid edge of the transparent plate 96. According to the signal generated, the solenoid 388 (FIG. 15) which constitutes the cutter means actuator is energized to actuate the paper roll cutter means 60. As a result, copying paper which is unwound at the same speed as the scanning speed from the cutting position C (see FIG. 7) of the paper roll cutter means 60 synchronously with the scanning of the image of the original plated on the transparent plate 96 of the original-support means 4 is cut to substantially the same length as the length of the original.

Thus, in the electrostatic copying apparatus of this invention including the drive control device described hereinabove, a roll of copying paper can be automatically cut to a length corresponding to the length of the original simply by placing the original in position on the transparent plate 96 of the original-support means 4, and covering the transparent plate 96 and the original placed thereon with the original-holding member 98 without the need for any other special operation.

Very rarely the original to be copied may have a marginal portion having a dark color. Furthermore, with certain originals, it may be desirable to place them at the center of the transparent plate 96 without registering the edge with the side edge of the transparent plate 96. Sometimes, it is desired to cut the copying paper to a predetermined length such as a standardized size irrespective of the length of an original to be copied.

to provide fore such a situation, the illustrated electrostatic copying apparatus has a cutting length indicating member 396 extending along the aforesaid side edge of the transparent plate 96 at least from the forward end to the rear end of the transparent plate and the length from the forward end of the transparent plate 96 is adjustable. Referring to FIG. 17, the length indicating member 396 for a copying paper has a stationary portion 398 and a movable portion 400 provided within the support frame 94 of the original-support means 4 in proximity to the inside surface of the transparent plate 96 (the surface opposite to the surface on which an original is to be placed). The stationary portion 398 is fixed to the transparent plate 96 by, for example, bonding it to the inside surface of the transparent plate 96, and a part of it extends from the forward end of the transparent plate a distance L along the aforesaid side edge of the transparent plate 96 and projects from under the frame 94 a distance Y. The remainder of the stationary portion 398 extends beyond the forward end and side edge of the transparent plate 96, but such a part may be omitted. The movable portion 400 has a part which extends with along the aforesaid side edge of the transparent plate 96 as is the case with the stationary portion 398, and projects from the frame 94 a distance Y and is mounted slidably in the scanning direction (i.e., the direction shown by arrow 402), with respect to the stationary portion 398 and the transparent plate 96. The inside surfaces (to be exposed to the optical system) of the stationary portion 398 and the movable portion 400 have bright color characteristics with such a bright color as white at least on their portions extending along the aforesaid side edge of the transparent plate 96. To the forward and rear ends of the movable portion 400 are connected the ends of a driving wire 404. The driving wire 404 has one end connected to the rear end of the movable portion 400, and passes over a guide roller 406 mounted rotatably within the support frame 94 of the original-support means 4, is then wound through one turn on the small-diameter portion 410 of the manually operable member 408, further passes over guide rollers 412 and 414 rotatably mounted within the support frame 94, and has the other end connected to the forward end of the movable portion 400. The driving wire 404 has a portion composed of a pull spring 416, and is maintained in the desired taut state by the action of the pull spring 416. The manually operable member 408 mounted rotatably on he support frame 94 also includes a large-diameter portion 418 (see FIG. 16 also) formed integrally with the small-diameter portion and partly projecting through the opening formed in the support frame 94. Hence, by operating the large-diameter portion 418 of the manually operable member 408 from outside the frame 94, the manually operable member 408 can be turned. When the manually operable member 408 is turned, the driving wire 404 wound on the small-diameter portion is moved to slide the movable portion 400 in the direction shown by arrow 402. By operating the manually operable member 408, the movable portion 400 can be adjustably positioned to a desired position between the extreme left position at which its rear end registers with the rear end of the stationary portion 398 or is located ahead of it and the extreme right position at which its rear end registers with the rear end of the transparent plate 96 or is located rearwardly of it. If desired, that portion of the top surface of the support frame 94 which adjoins the aforesaid side edge of the transparent plate 96 may be marked with a symbol showing the length from the forward end of the transparent plate 96. Furthermore, as will be described in detail hereinbelow, the outside surface (top surface) of the movable portion 400 may be marked with a symbol indicating the length of the indicating member 396 from the forward end of the transparent plate 96 (i.e., the length $L_1$ from the forward end of the transparent plate 96 to the rear end of the movable portion 400). It is also possible to mark the large-diameter portion of the manually operable member 408 with a symbol showing the relation between the distance from the forward end of the transparent plate 96 to the rear end of the movable portion 400 and the angular position of the manually operable member 408.

When the drive control device also includes the length indicating member 396, the operation of the paper roll cutter means 60 is controlled in the following manner to perform the cutting of copying paper. when the marginal portion of an original to be copied is a bright color such as white and the copying paper is desired to be cut to a length corresponding to the length of the original, the rear end of the movable portion 400 of the length indicating member 396 is positioned at a suitable point that is not farther away than the rear end of the copying paper (for example, the extreme left position at which the rear end of the movable portion 400 registers with the rear end of the stationary member 398 or is located ahead of it) to cause the original and the original-holding member 98 to be in the same condition as illustrated in the case of not using the cutting length indicating member 396. Since at least that portion of the inside surface of the length indicating member 396 which extends along the aforesaid side edge of the transparent plate 96 is a bright color the same as the edge of the original, the reflectance of light changes markedly at the rear end of the original at the aforesaid side edge of the transparent plate 96. Hence, when scanning is performed by relatively moving the original-support means 4 and the optical system 26, the light detector 394 detects a marked change in reflectance at the rear end of the original at the time of scanning the rear end of the original to actuate the paper roll cutter means 60, whereby the copying paper is cut to a length corresponding to the length of the original.

When an original to be copied has a marginal portion of a dark color, or when the edge of the original is placed at the center of the transparent plate 96 without registering it with the side edge of the transparent plate 96, or when it is desired to cut the copying paper to a predetermined length such as a standardized size without depending upon the length of the original to be copied, the manually operable member 408 is operated before or after placing the original on the transparent plate 96 to position the movable portion 400 such that the length $L_1$ from the forward end of the transparent plate 96 to the rear end of the movable portion 400 (see FIG. 17) corresponds to the length of the original to be copied or to the desired cut length such as a standardized size. Then, the original-holding member 98 is caused to cover the transparent plate 96 and the original placed thereon. As a result, at the side edge of the transparent plate 96, the bright colors of the inside surfaces of the movable portion 400 and stationary portion 398 of the length indicating member 396 are exposed to the optical system 26 in the region from the forward end of the transparent plate 96 to the rear end of the movable portion 400, and the dark color of the region of width X of part 390 of the original-holding member 98 having dark color characteristics is exposed to the optical system 26 in the region rearward of the moving portion 400. Thus, at the rear end of the movable member 400, the reflectance changes markedly. When an original to be copied has a greater length than the desired cut length $L_1$ of the copying paper, and the rear end of the edge of the original has a bright color, it is necessary to position the original such that the edge portion of the original is not positioned at the edge of the transparent plate 96. Hence, when scanning is performed by relatively moving the original-support means 4 and the optical system 26, the light detector 394 detects a marked change in reflectance at the rear end of the movable portion 400 during the scanning of the rear end of the movable portion 400 to actuate the paper roll cutter means 60. Thus, the copying paper is cut to the desired paper cutting length $L_1$.

When the length indicating member 396 is provided, the bright color of the movable portion is always exposed to the optical system 26 at the side edge of the transparent plate 96 in the range of length L from the forward end of the transparent plate 96 to the stationary portion 398 even if the movable portion 400 is brought to its extreme left position (at which the rear end of the movable portion 400 registers with the rear end of the stationary portion or is located ahead of it). It is impossible therefore to cut the copying paper to a length shorter than the length L. On the other hand, the copying paper fed from the paper roll feed means 52 is generally transferred by means of rollers 76, 78, etc. disposed at suitable intervals as illustrated in FIG. 2. When the copying paper is shorter than the distance between the rollers in such a case, the copying paper cannot be transferred. Hence, it is necessary to cut the copying paper to a length greater than the minimum cut length defined by the distance between the rollers. Preferably, therefore, it is necessary to adjust the length L to the same length as or a somewhat greater length than the minimum cut length defined by the distance between the rollers, thereby to prevent the cutting of the copying paper to a length shorter than a transferable length and the consequent trouble in the transfer of the copying paper.

In the illustrated electrostatic copying machine, at least a part of the inside surface of the original-holding member 98 has dark color characteristics, and the inside surface of the length indicating member 396 has bright color characteristics. If desired, it is possible to cause at least in part, preferably the whole, of the inside surface of the original-holding member 98 to have bright color characteristics and the inside surface of the length indicating member 396 to have dark characteristics. In this embodiment, the dark color of the inside surface of the length indicating member 396 is exposed to the optical system 26 at the side edge of the transparent plate in the region from the forward end of the transparent plate 96 to the rear end of the cutting length indicating member 396, and the bright color of the original-holding member 98 is exposed to the optical system 26 in the region rearward of the length indicating member 396. Hence, the reflectance changes markedly at the rear end of the length indicating member 396. Thus, when scanning is carried out by relatively moving the original-support means 4 and the optical system 26, the light detector 394 detects a marked change in reflectance at the rear end of the length indicating member 396 at the time of scanning the rear end of the length indicating member 396 to actuate the paper roll cutter means 60. Consequently, the copying paper is cut to the desired cut length $L_1$ from the forward end of the transparent plate 96 to the rear end of the length indicating member 396. In this procedure, it is necessary to define the cut length of the copying paper by the length indicating member 396 unless the edge portion of an original to be copied is a dark color. The copying paper cannot be automatically cut to a length corresponding to the length of the original by merely placing the original in position on the transparent plate 96 and covering the transparent plate 96 and the original placed thereon with the orignal-holding member 98.

In the illustrated electrostatic copying apparatus, only one light detector is provided. Alternatively, it is possible to provide two or more light detectors, and to actuate the paper roll cutter means 60 at a time when all of these light detectors receive the reflected light that has changed from a bright to a dark color (or from a dark to a bright color). According to this construction, even when a dark color (or bright color) portion is present locally at the edge portion of an original to be copied, the paper roll cutter means 60 will be actuated according to the change of the reflectance at the rear end of the original (only at the time when the light detector located rearmost in the scanning direction detects the change of the reflectance at the rear end of the original) so long as the length of the dark color (or bright color) portion in the scanning direction is less than the distance between the light detector located foremost in the scanning direction and the light detector located rearmost in the scanning direction.

Figure 17:
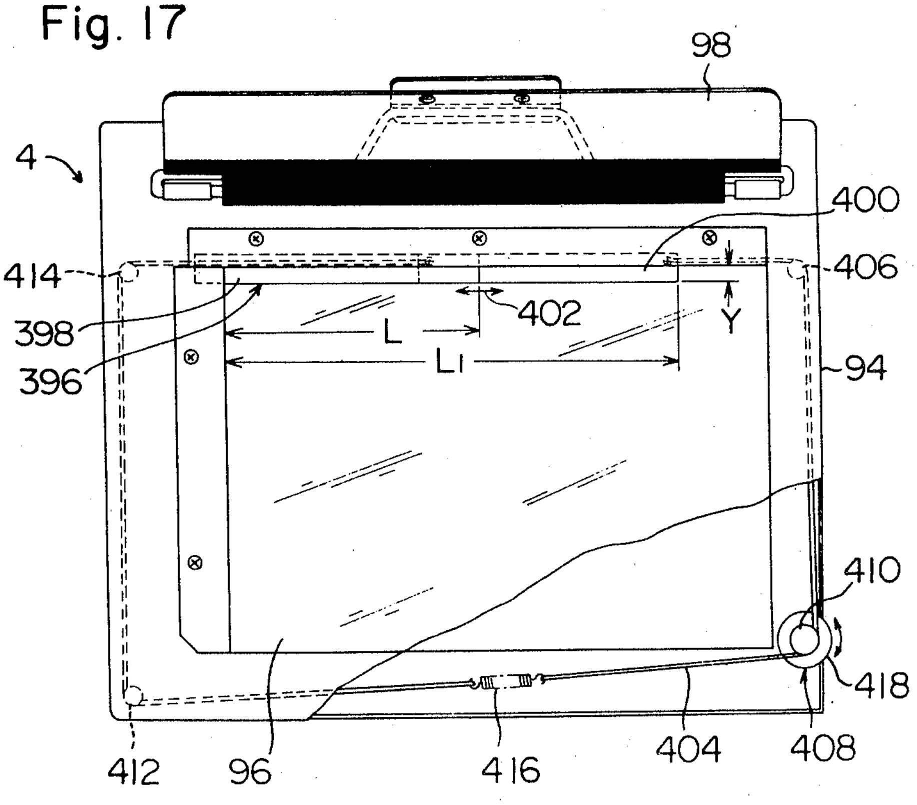
Figure 18:
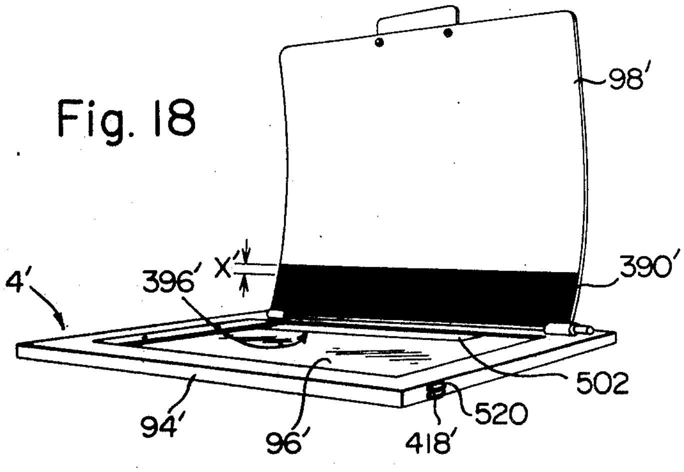
FIGS. 18 and 19 are a perspective view and a top plan view, respectively, of the original-supporting means, which are provided to illustrate an example of the improvement of the drive control device for the copying paper roll cutter means.
Figure 19:
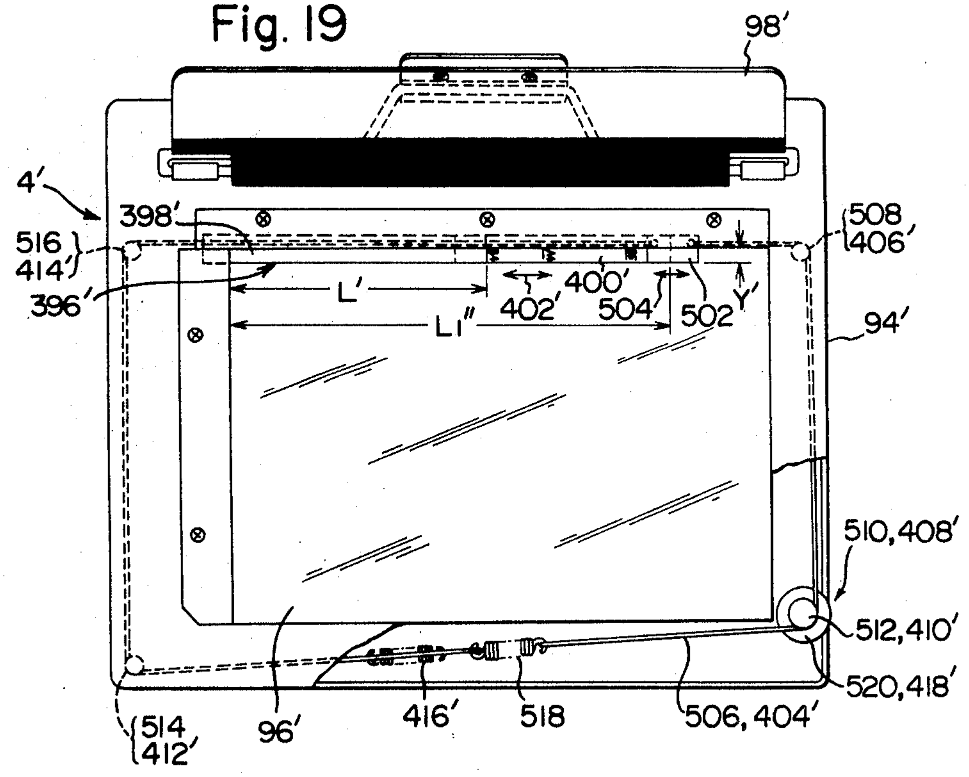
Figure 20:
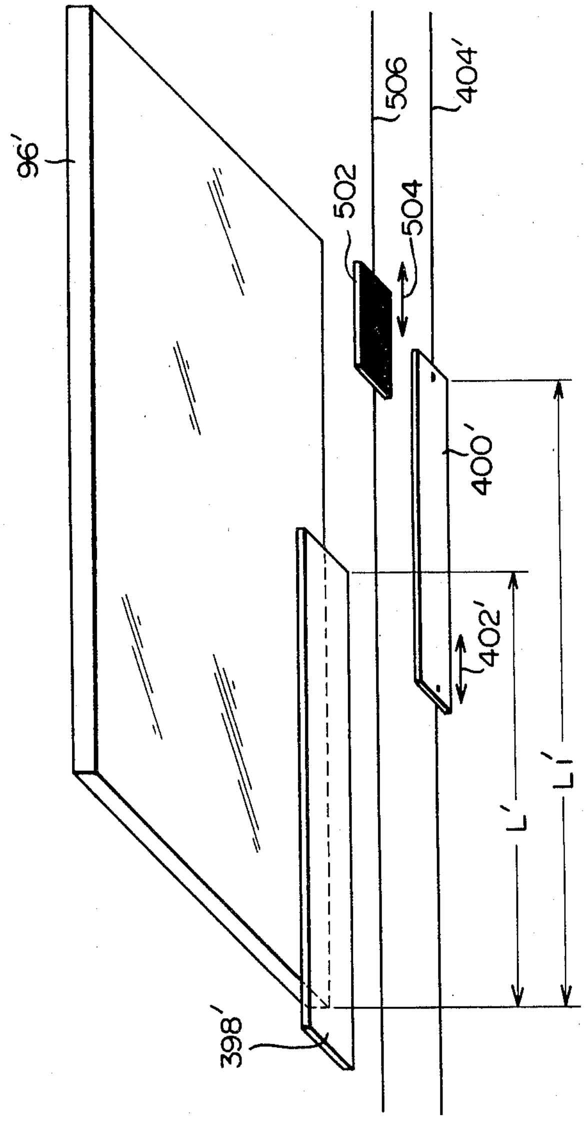
FIG. 20 is a partial perspective view showing an indicator member for indicating the cut length of copying paper and an auxiliary member which are used in the drive control device shown in FIGS. 18 and 19.

FIGS. 18 to 20 show an additional improvement made in the drive control device for the paper roll cutter means described hereinabove with reference to FIGS. 16 and 17.

Figure 16:
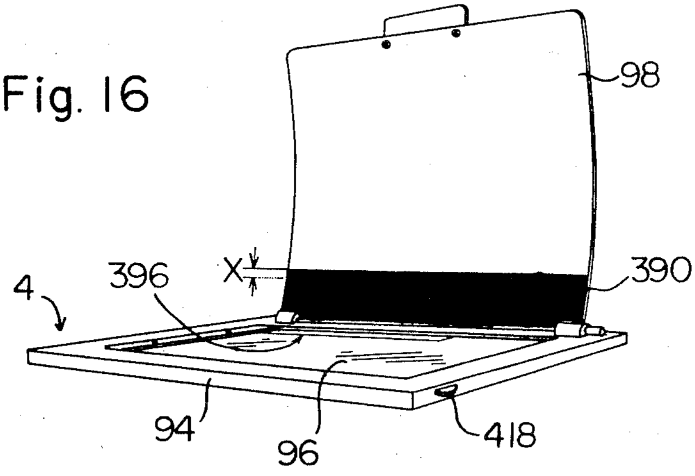
FIGS. 16 and 17 are a perspective view and a top plan view, respectively, of the original-supporting means, which are provided to illustrate a drive control device for the copying paper roll cutter means in the electrostatic copying apparatus shown in FIG. 1.

In the drive control device shown in FIGS. 16 and 17, when the original has a substantial blank margin of a bright color such as white and it is desired to cut a roll of copying paper to a length shorter than the length of the original (namely, when the cut length of the paper roll is set at a value less than the length of the original by means of the length indicating member 396), it is necessary to move the edge portion of the original with respect to the side edge of the transparent plate 96 so that the original is not located on the side edge of the transparent plate 96. If the edge of the original is registered with the side edge of the transparent plate 96, and the length $L_1$ of the indicating member 396 from the forward end of the transparent plate 96 is set at the desired cutting length less than the length of the original by adjusting the indicating member 396, the inside surface of the indicating member 396 having bright color characteristics is exposed to the optical system 26 at the side edge of the transparent plate 96 in the region from the forward end of the transparent plate 96 to the rear end of the indicating member 396, and the bright color of the substantial margin of the original is exposed to the optical system 26 in the region from the rear end of the indicating member 396 to the rear end of the original, and the bright color characteristics continue to the region rearward of the rear of the original in which the indicating member 396 having dark characteristics of the original-holding member 98 is exposed to the optical system. Hence, the light detector 394 detects a change in reflectance for the first time at the rear end of the original at the time of scanning the image of the original, and therefore, the paper roll is cut not to the predetermined length $L_1$ (the length less than the length of the original) set by the indicating member 396, but to a length corresponding to the length of the original. In the illustrated embodiment shown in FIGS. 18 to 20, an improvement is provided so that the paper roll can also be cut to the desired length irrespective of the position at which the original is placed (even when the original is placed on the transparent plate with its edge in register with the side edge of the transparent plate) when the original has a substantial blank margin of a bright color such as white and it is desired to cut the paper roll to a length shorter than the length of the original.

Referring to FIGS. 18 to 20, at least a part 390' of the inside surface of original-holding member 98' provided in the original-support means 4' has dark color characteristics as in the embodiment shown in FIGS. 16 and 17. Adjacent the inside surface of the transparent plate 96' is provided a cutting length indicating member 396' having a stationary portion 398' and a movable portion 400' within support frame 94' of the original-support means 4'. As in the embodiment shown in FIGS. 16 and 17, a driving wire 404' and a manually operable member 498' are provided in regard to the movable portion 400' of the indicating member 396'. In addition, the outside surface (i.e., top surface) of the movable portion 400' is marked with a symbol (for example $B_4$, $A_4$, or $B_5$ shown in FIG. 19) indicating the length $l_1'$ of the indicating member 396′ from the forward end of the transparent plate 96′ (i.e., the length $L_1'$ from the forward end of the transparent plate 96′ to the rear end of the movable portion 400′). The symbol $B_4$, $A_4$ or $B_5$ shown in FIG. 19 shows that it registers with the rear end of the stationary portion 398′, the length $L_1'$ becomes the corresponding length. Accordingly, when the movable portion 400′ is positioned as shown in FIG. 19 and the symbol $B_4$ is brought into agreement with the rear end of the stationary portion 398′, the length $L_1'$ equals the length $B_4$. Instead of, or in addition to, attaching such a mark to the outside surface of the movable portion 400′, it is of course possible to mark that portion of the top surface of the support frame 94′ which is adjacent to the side edge of the transparent plate 96′ with a symbol showing the length from the forward end of the transparent plate 96′, or to mark the large-diameter portion 418′ of manually operable member 408′ with a symbol showing the relation between the angular position of the manually operable member 408′ and the distance $L_1'$ from the forward end of the transparent plate 96′ to the rear end of the movable portion 400′.

In the embodiment illustrated in FIGS. 18 to 20, an auxiliary member 502 capable of being positioned at the rear end of the indicating member 396′ is provided adjacent the transparent plate 96′. The auxiliary member 502 has a portion a distance Y′ from the side edge of the transparent plate 96′ in the same way as the movable member 400′ of the indicating member 396′, and is mounted movably in the scanning direction shown by arrow 504 independently from the movable portion 400′ of the indicating member 396′ with respect to the stationary member 398′ of the indicating member 396′ and the transparent plate 96′. At least that portion of the inside surface of the auxiliary member (i.e., the surface to be exposed to the optical system 26) which extends along the side edge of the transparent plate 96′ is a dark color such as black and has dark color characteristics. To the forward and rear ends of the auxiliary member 502 are connected the ends of a further driving wire 506. As is the case with the driving wire 404′ connected to the movable portion 400′ of the indicating member 396′, the further driving wire 506 has one end connected to the rear end of the auxiliary member 502 and, passes over a guide roller 508 mounted rotatably within the support frame 94′ of the original-support means 4′, then is wound through one turn around the small-diameter portion 512 of the manually operable member 510, further passes over guide rollers 514 and 516 mounted rotatably within the support frame 94′ in the same way as the guide roller 508, and has the other end connected to the forward end of the auxiliary member 502. The further driving wire 506 has a portion made up of a pull spring 518, and is maintained in the desired taut state by the action of the pull spring 518. The manually operable member 510 is mounted rotatably on the support frame 94′ of the original-support means 4′, and also has a large-diameter portion 502 (see FIG. 18 also) formed integrally with the small-diameter portion 512 and projecting partly through an opening formed in the support frame 94′. Hence, by operating the large-diameter portion 520 from outside the support frame 94′, the manually operable member 510 can be turned. When the manually operable member 510 is turned, the further driving wire 506 wound about its small-diameter portion is moved, and therefore, the auxiliary member 502 is moved in the direction shown by arrow 504 and positioned at a suitable point.

In the embodiment shown in FIGS. 18 and 19 in which the auxiliary member 502 is provided in addition to the indicating member 396′, the operation of the paper roll cutter means (FIGS. 2 and 15) is controlled in the following manner for cutting of the copying paper.

When it is desired to cut the copying paper to a length corresponding to the length of an original to be copied, the movable portion 400′ of the cutting length indicating member 396′ is positioned such that its rear end is located at a suitable position not farther away than the rear end of the copying paper (for example, at the extreme left position at which the rear end of the movable portion 400′ registers with the rear end of the stationary portion 398′ or is located ahead of it), and the auxiliary member 502 is positioned so that its rear end does not go beyond the rear end of the movable portion 400′, and therefore, the inside surface of the auxiliary member 502 which has dark characteristics is not exposed to the optical system 26 (FIG. 2). In this condition, the original is placed on the transparent plate 96′ of the orignal-support means 4′. In placing the original on the transparent plate 96′, it is important to register the forward end of the original with the forward end (the left end of the transparent plate 96′ in FIGS. 18 and 19) of the transparent plate 96′ (or to extend it beyond the forward end of the transparent plate 96′), and also to register the edge of the original with the side edge (i.e., the edge having width Y′ at the upper portion in FIG. 19) of the transparent plate 96′. Then, the original-holding member 98′ is caused to cover the transparent plate 96′ and the original placed thereon. Generally, almost all documents to be copied have a substantial blank margin of a bright color such as white. Hence, when the original and the original-holding member 98′ are in the above-mentioned state, the inside surface of the stationary portion 398′ having bright color characteristics is exposed to the optical system at the side edge of the transparent plate 96′ in the region from the forward end of the transparent plate 96′ to the rear end of the cutting length indicating member 396′ (i.e., the rear end of the stationary portion 398′), and the bright color of the marginal edge of the original is exposed to the optical system in the region from the rear end of the cutting length indicating member 396′ to the rear end of the original. Hence, from the forward end of the transparent plate 96′ to the rear end of the orignal, a bright color is exposed continuously. In contrast, in the region rearward of the rear end of the original, the dark color of the original-holding member 98′ having dark color characteristics is exposed to the optical system 26. Thus, the reflectance changes markedly at the rear end of the original. Accordingly, when scanning of the image of an original is carried out by relatively moving the original-support means 4′ and the optical system 26 (in the illustrated embodiment, by the scanning movement of the original-support means 4′), the reflected light of a bright color is projected onto the light detector 394 (FIG. 2) in the region from the forward end of the transparent plate 96′ to the rear end of the original, but beyond the rear end of the original, the reflected light of a dark color is projected onto the light detector 394. Thus, the light detector 394 detects a marked change in reflectance at the rear end of the original at the time of scanning the rear end of the original. Thus, the copying paper is cut to a length corresponding to the length of the original.

When it is desired to cut the copying paper to a predetermined length such as a standardized length irrespective of the length of the original to be copied, or when the edge of the original to be copied is a dark color, or when it is desired to place the edge of the orignal on the center of the transparent plate 96' without registering it with the side edge of the transparent plate 96', the operation is performed as follows: In such a case, too, the manually operable member 408' is operated before or after placing the original on the transparent plate 96' in the same way as in the embodiment illustrated in FIGS. 16 and 17 thereby to position the movable portion 400' such that the distance $L_1'$ from the forward end of the transparent plate 96' to the rear end of the movable portion 400' to the desired cut length of copying paper corresponding to the standardized length of the length of the original to be copied. The auxiliary member 502 is normally positioned at a desired point. Then, the original-holding member 98' is caused to cover the transparent plate 96' and original placed thereon. As a result, the bright colors of the inside surfaces of the stationary portion 398' and movable portion 400' of the cutting length indicating member are exposed to the optical system 26 (FIG. 2) in the region from the forward end of the transparent plate 96' to the rear end of the movable portion 400' (with the length $L_1'$). In contrast, rearwardly of the rear end of the movable portion 400', the dark color of the region with width X' of the part 390' of the original-holding member 98' having dark color characteristics is exposed (when the length of the original is smaller than the length $L_1'$, or when the edge of the original is disposed at a position spaced from the side edge of the transparent plate 96' and the original is not present on the edge portion of the transparent plate 96'); or the dark-color edge of the original is exposed (when the length of the original is larger than the length $L_1'$, the edge of the original is a dark color, and the edge of the original is registered with the side edge of the transparent plate 96'); or the inside surface of the auxiliary member 502 having dark color characteristics is exposed (when the auxiliary member 502 is positioned at the rear end of the movable portion 400' of the cutting length indicating member 396' as illustrated in FIGS. 18 and (19). Hence, the reflectance changes markedly at the rear end of the length indicatig member 396', that is, at the rear end of the movable portion 400'. When scanning is performed by relatively moving the original-support means 4' and the optical system 26, the light detector 394 (FIG. 2) detects a marked change in reflectance at the rear end of the movable portion 400' at the time of scanning the rear end of the movable portion 400' to actuate the paper roll cutter means 60 (FIGS. 2 and 15). Thus, the copying paper is cut to the desired cutting length $L_1'$.

The auxiliary member 502 performs an important functin when, during the cutting of the copying paper to the desired length $L_1'$ determined by the cutting length indicating member 396', the length of the original is larger than the length $L_1'$, the edge of the original is blank and is a bright color such as white, and when it is desired to place the edge of the original on the transparent plate 96' in register with the side edge of the transparent plate 96'.

In the embodiment shown in FIGS. 16 and 17 which does not include auxiliary member 502, when the length of the original is larger than the length $L_1'$, and the edge of the original is a bright color, it is impossible to register the edge of the original with the edge of the transparent plate 96' as in an ordinary copying operation and cut the copy paper to the desired shorter length. When the edge of the original is placed on the transparent plate 96' in register with the side edge of the transparent plate 96', the inside surface of the indicating member 396' having bright color characteristics is exposed to the optical system 26 (FIG. 2) at the side edge of the transparent plate 96' in the region from the forward end of the transparent plate 96' to the rear end of the movable portion 400' of the length indicating member 396' which has the length $L_1'$. In addition, in the region from the rear end of the length indicating member 396' to the rear end of the original, the bright color of the edge of the original which is substantially blank, and the region of width X' of the part 390' having dark characteristics of the original-holding member 98' are exposed to the optical system. Thus, the bright color characteristics continue up to the region rearwardly of the original. Accordingly, at the time of scanning the image of the original, the light detector 394 (FIG. 2) detects a change in reflectance for the first time at the rear end of the original. As a result, the paper roll is cut to a length corresponding to the length of the original, and not to the length $L_1'$ (which is smaller than the length of the original) set by the length indicating member 396'.

In the embodiment illustrated in FIGS. 18 to 20, the manually operable member 510 is operated in the aforesaid situation to position the auxiliary member 502 at the rear end of the movable portion 400' of the indicating member 396' as illustrated in FIGS. 19 and 20, and position at least a part of the auxiliary member 502 subsequent to the rear end of the movable portion 400'. As a result, at the side edge of the transparent plate 96', the bright colors of the inside surfaces of the stationary portion 398' and the movable portion 400' of the indicating member 396' are exposed to the optical system 26 in the region from the forward end of the transparent plate 96' to the rear end of the movable portion 400' of the indicating member 396', and in the region subsequent to the rear end of the movable portion 400', the dark color of the inside surface of the auxiliary member 502 is always exposed to the optical system 26 irrespective to the characteristics of the edge of the original and the manner of placing the original. Hence, the reflectance always changes markedly at the rear end of the indicating member 396'and movable portion 400'. Thus, at the time of scanning the image of the original, the light detector 394 (FIG. 2) detects the marked change of the reflectance at the rear end of the indicating member 396' and movable portion 400' to actuate the paper roll cutter means 60 (FIGS. 2 and 15) and to cut the copying paper to the desired cut length $L_1'$.

In the illustrated embodiment, the auxiliary member 502 is disposed between the stationary portion 398' and the movable portion 400' of the indicating member 396', but if desired, it may be disposed slidably in the direction of arrow 504 above the stationary portion 398'.

Figure 21:
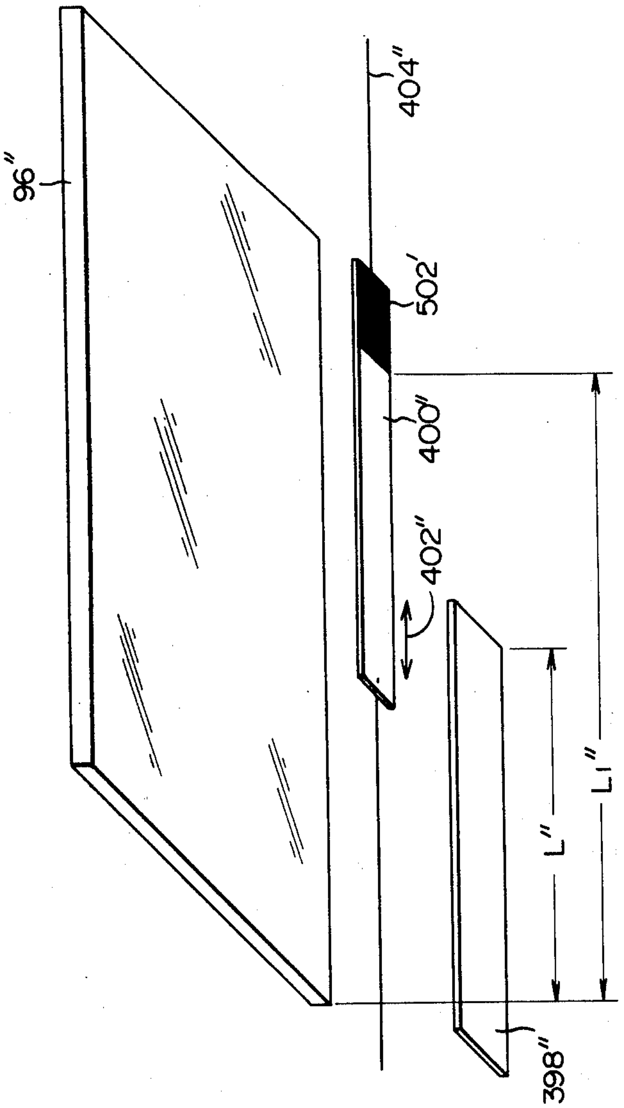
FIG. 21 is a partial perspective view showing a modification of the cut length indicator member and the auxiliary member shown in FIG. 20.

FIG. 21 shows modified examples of the cut length indicating member and the auxiliary member. In the modified examples shown in FIG. 21, it is first noted that the movable portion 400" of the indicating member is disposed so as to be slidable in the direcion shown by arrow 402" above the stationary portion 398". Secondly, the auxiliary member 502' is formed integrally at the rear end of the movable portion 400" of the indicating member, and is adapted to slide in the direction shown by arrow 402" together with movable portion 400" by driving wire 404" by operating a suitable manually operable member (not shown; it may be the same as the manually operable member 408' or 510 shown in FIG. 19).

When it is desired to cut a copying paper to the length corresponding to the length of an original to be copied in the embodiment depicted in FIG. 21, the movable portion 400" and the auxiliary member 502' integral therewith are moved all the way to the left in FIG. 21 so that the rear end of the auxiliary member 502' will not project beyond the rear end of the stationary portion 398". The original is placed on the transparent plate 96" as desired (i.e., with the edge of the original being in register with the side edge of the transparent plate 96"), and then, the transparent plate 96" and the original placed thereon are covered by the original-holding member. It will be readily appreciated that as a result, in the same way as in the embodiment shown in FIGS. 18 to 20, the copying paper roll is cut to the desired length corresponding to the length of the original and is greater than the minimum cut length defined by the length $L_1''$ from the forward end of the transparent plate 96" to the rear end of the stationary portion 398".

When it is desired to cut the copying paper to a predetermined length irrespective of the length of an original to be copied, or when the edge of the original is a dark color, or when it is desired to position the edge of the original on the central part of the transparent plate 96" without registering it with the edge of the transparent plate 96", the movable portion 400" and the auxiliary member 502' integral therewith are positioned after or before placing the original on the transparent plate 96" in such a manner that the length $L_1''$ from the forward end of the transparent plate 96" to the rear end of the movable portion 400" is adjusted to a desired cut length such as a standardized size or a length corresponding to the length of the original. As a result, at the side edge of the transparent plate 96", the bright colors of the inside surfaces of the stationary portion 398" and the movable portion 400" of the indicating member are exposed to the optical system 26 (FIG. 2) in the region from the forward end of the transparent plate 96" to the rear end of the movable portion 400" which has the length $L_1''$, and in the region subsequent to the rear end of the movable portion 400", the dark color of the inside surface of the auxiliary member 502' is always exposed to the optical system 26 irrespective of the characteristics of the edge of the original and the manner of placing the original. It will be readily appreciated therefore that the paper roll is cut to the desired cut length $L_1''$.

In the embodiment shown in FIGS. 18 to 20, or the modified embodiment shown in FIG. 21, at least a part of the inside surface of the original-holding member 98' is colored a dark color such as black. If desired, such coloration may be omitted. But in this case, even when it is desired to cut a copying paper to the length corresponding to the length of the original, it is necessary to set the length $L_1'$ or $L_1''$ by utilizng the length indicating member and the auxiliary member unless the edge of an original to be copied is a dark color. In such a situation, the copying paper cannot be cut to a length corresponding to the length of the original by merely placing the original on the transparent plate 96' or 96" and covering the transparent plate 96' or 96" and the original placed thereon with the original-holding member 98'.

When at least a part of the inside surface of the original-holding member 98' is not colored a dark color, it is also possible to color the inside surfaces of the stationary portion 398' or 398" and the movable portion 400' or 400" of the indicating member a dark color, and the inside surface of the auxiliary member 502 or 502' a bright color. In this modification, at the side edge of the transparent plate 96' or 96", the dark colors of the stationary portion 398' or 389" and the movable portion 400' or 400" are exposed to the optical system 26 (FIG. 2) in the region from the forward end of the transparent plate 96' or 96" to the rear end of the movable portion 400' or 400", and in the region subsequent to the rear end of the movable portion 400' or 400", the bright color of the auxiliary member 502 or 502' is exposed to the optical system 26. Accordingly, the light detector 394 (FIG. 2) detects a marked change in reflectance from a dark to a bright color at the rear end of the movable portion 400' or 400" of the indicating member. Consequently, the copying paper can be cut to the desired cut length $L_1'$ or $L_1''$ set by the length indicating member.

Drive system

Figure 22:
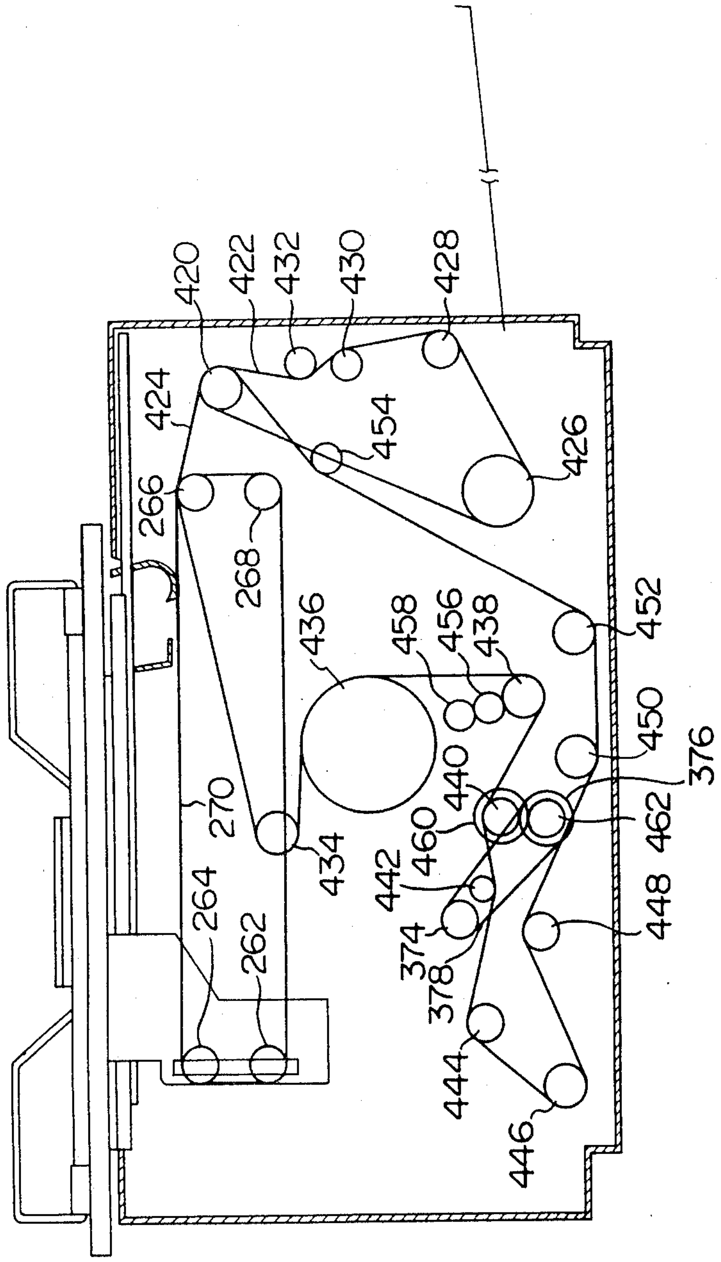
FIG. 22 is a simplified cross-sectional view showing a drive system in the electrostatic copying appartus shown in FIG. 1.

Referring mainly to FIG. 22, the drive system for the illustrated electrostatic copying apparatus will be described briefly.

A main drive two-member sprocket 420 is fixed to the output shaft of an electrically driven motor 48 (see FIG. 2) which constitutes a drive power source. A first endless chain 422 extends around one sprocket member of the two-member sprocket 420, and around the other member extends a second endless chain 422. The first endless chain 422 starts at the one sprocket member of the main drive two-member sprocket 420, extends over a drive sprocket 426, a drive sprocket 428 and tension sprockets 430 and 432, and returns to the one sprocket member of the main drive two-member sprocket 420. The drive sprocket 426 is fixed to the shaft of one roller of a press roller unit 84 (see FIG. 2), and the drive sprocket 428 is fixed to the shaft of one roller of transfer roller pair 93 (see FIG. 2). On the other hand, the second endless chain 424 starts at the other sprocket member of the main drive two-member sprocket 420, extends over one member of a drive two-member sprocket 266 (see FIGS. 13-C and 13-E also), an idle sprocket 434, a drive sprocket 436, a drive sprocket 438, a drive sprocket 440, a tension sprocket 442, a drive sprocket 444, a drive sprocket 446, a drive sprocket 448, idle sprockets 450 and 452 and a tension sprocket 454, and returns to the other sprocket member of the main drive two-member sprocket 420. Over the other sprocket member of the drive two-member sprocket 266 extends a chain 270 for moving the original-support means 4 and which extends over sprockets 264, 262 and 268, and returns to the other sprocket member of the sprocket 266, as described in detail hereinabove with reference to FIGS. 12, 13-C and 13-E. The drive sprocket 436 is drivingly connected to the rotary drum 8 by a suitable means. The drive sprocket 438 is connected to a gear 458 fixed to one roller of a separating roller unit 78 (see FIG. 2) through a gear 456. The drive sprocket 440 is drivingly connected to a gear 462 through a gear 460 mountd so as to rotate together with the sprocket 440. The gear 462 is selectively connected to a driven sprocket 376 by the clutch mechanism 380 described hereinabove with reference to FIG. 15. The driven sprocket 376 is connected to an input sprocket 374 of the paper roll cutting means 60 by means of a chain 378 (see FIG. 15 also). The drive sprocket 444 is selectively connected to one roller of the paper roll feed roller unit (see FIGS. 2 and 6 to 9) by means of the clutch mechanism 328 described hereinabove with reference to FIGS. 12 and 13-A to 13-F. The drive sprocket 446 is selectively connected to the auxiliary member actuator 366 (see FIGS. 14-A to 14-D) by means of the clutch mechanism 350 described hereinabove with reference to FIGS. 12, 13-A to 13-F and 14-A to 14-D. The drive sprocket 448 is selectively connected to the copying paper feed roller 66 (see FIGS. 2, 10 and 11) by means of the clutch mechanism 330 described hereinabove with reference to FIGS. 12, 13-A to 13-F and 14-A to 14-D.

It will be appreciated from the foregoing description that the rotary drum 8, the copying paper transfer system 50 and the original-support means 4 are driven by the electric motor 48 which constitutes the drive power source.

The cylindrical sleeve 18 of the development and cleaning station is drivingly connected to a gear 464 (see FIG. 5) fixed to the rotary drum 8 by means of a plurality of gears (one of which is shown at 466 in FIG. 5). Hence, it is driven by the electric motor 48 through the rotary drum 8.

Electrical circuits

Figure 23:
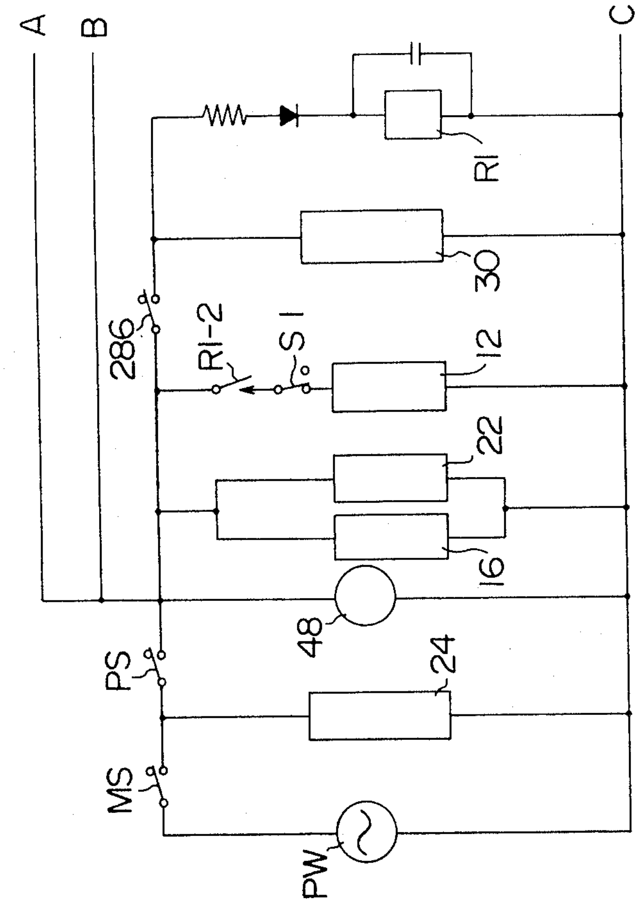
FIGS. 23 and 24 are electric circuit diagrams showing the connections of electrical elements in the electrostatic copying apparatus shown in FIG. 1.

Referring to FIG. 1, in the illustrated electrostatic copying apparatus, a main switch MS, a print switch PS, a copy count dial CD, and an adjusting dial LD for adjusting the intensity of the light from the orignal-illuminating lamp 30 are provided on the control panel 6 at the front surface of the housing 2. The illustrated electrostatic copying apparatus also has electric circuits shown in FIGS. 23 and 24 which include various electrical constituent elements. The portions marked A, B and C in the electrical circuit shown in FIG. 23 are connected to the parts marked A, B and C in the electrical circuit shown in FIG. 24.

Figure 24:
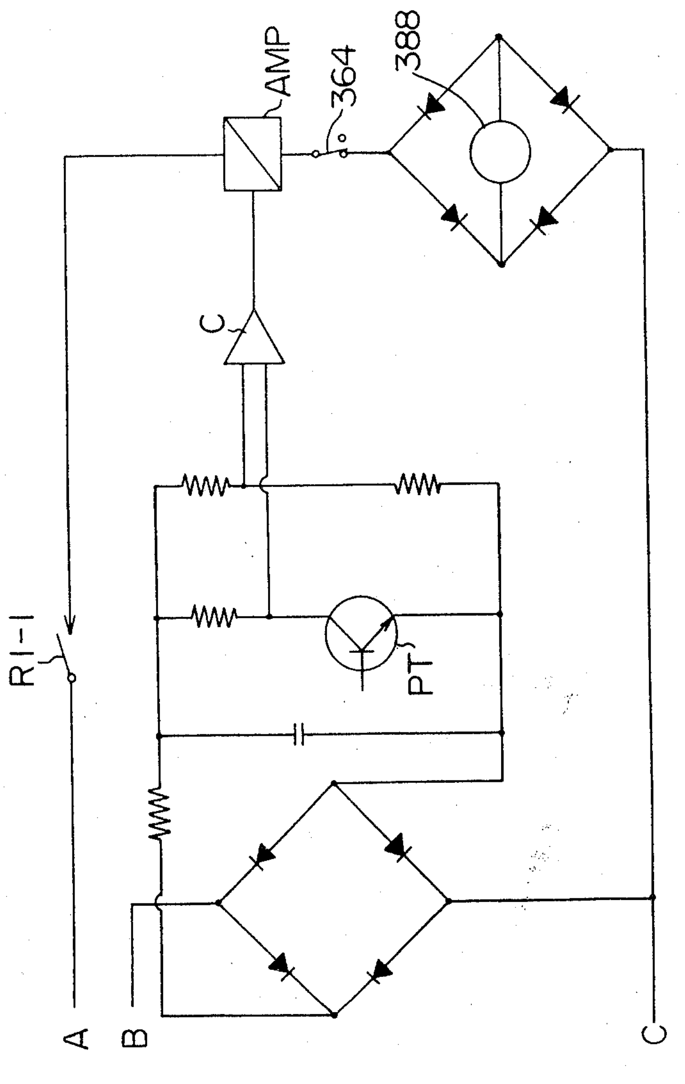

With reference to the electrical circuit diagrams of FIGS. 23 and 24 together with FIGS. 1 and 2, the method of operating the electrostatic copying apparatus and the operation of the electrical circuits are described briefly below.

(1) When one copy is to be obtained by feeding a roll of copying paper from the paper roll feed means 52 (namely, when the count dial CD is set at a position indicating the number 1):

(1-1) The operator closes the main switch MS, whereupon
(i) an electric current is supplied from an AC power source PW to a charge eliminating lamp 24, and the lamp 24 is lighted.

(1-2) The operator sets the copying paper selection lever mechanism 356 (see FIG. 12) at a paper roll feeding position, whereupon
(i) the switch 364 is closed.

(1-3) The operator closes the print button PS, whereupon the print button PS is maintained in the closed state by a known mechanical locking mechanism (not shown) and simultaneously, the following operations are performed.
(i) The electric motor 48 constituting the drive power source starts rotation, and causes the starting of the rotation of the cooling fan 40, the rotation of the rotary drum 8, the movement of the original-support means 4 from the supporting position, and the rotation of the roller units 76, 78, 84 and 93 of the copying paper transfer system 50.
(ii) The corona charge 16 for transfer and the corona charger 22 for charge elimination are energized to start corona charger.
(iii) A current begins to be passed through the phototransistor PT and the comparator C which constitute the light detector 394 (but the comparator C does not produce a signal).

(1-4) When the original-support means 4 makes a preparatory movement and reaches the scanning movement starting position, the switch 286 is closed and maintained in the closed state as described hereinabove with reference to FIG. 12 and FIG. 13-C. Thus,
(i) The original-illuminating lamp 30 is lighted.
(ii) Relay $R_1$ operates at a time somewhat later than the closing of the switch 286, and the relay contacts $R_{1\text{-}1}$ and $R_{1\text{-}2}$ are closed.
(iii) As a result of the closing of the relay contact $R_{1\text{-}1}$, a voltage is applied to an amplifier AMP.
(iv) As a result of the closing of the relay contact $R_{1\text{-}2}$, the corona charger 12 for charging is energized through a normally closed contact of a switch S1 for stopping the operation of the corona charger for charging, thus permitting corona discharging.

(1-5) When during the scanning movement of the original-support means 4 from the starting position toward the terminating position, the reflected light received by the phototransistor PT changes from a bright color to a dark color at the rear end of the original or the rear end of the cutting length indicating member (FIG. 17), the phototransistor PT becomes non-conducting. Thus,
(i) The comparator C for detecting the conduction and non-conduction of the phototransistor PT produces a one-pulse signal having a sufficient time duration necessary for operating the paper roll cutter means 60. (The comparator C produces a signal only when the phototransistor PT changes from the conducting state to the non-conducting state, but does not produce a signal when the phototransistor PT changes from the non-conductive state to the conductive state.)
(ii) By the input of the one-pulse signal generated by the comparator C into amplifier AMP, the amplifier AMP is switched, whereby the solenoid 388 constituting the cutter means actuator is energized during the continuance of the one-pulse signal to actuate the paper roll cutter means 60.

(1-6) When the original-support means 4 continues the scanning movement and reaches the vicinity of the position of terminating the scanning movement, this fact is detected by a known suitable mechanism (not shown) to open the switch $S_1$ for stopping the operation of the corona charger for charging (the open state of the switch $S_1$ is continued until the switch 286 is later opened). As a result,
(i) The corona charger 12 is deenergized to stop discharging.

(1-7) When the original-support means 4 continues a scanning movement and reaches the termination position, the switch 286 is opened as described hereinabove with reference to FIGS. 12 and 13-E. As a result,
(i) The original-illuminating lamp is turned off.

(ii) The relay $R_1$ is cut off at a time somewhat later than the opening of the switch 286 to open the relay contacts $R_{1-1}$ and $R_{1-2}$.

(iii) As a result of the opening of the relay contact $R_{1-1}$, the application of a voltage to the amplifier AMP is stopped.

(1-8) While the original-support means 4 makes a returning movement from the scanning movement terminating position toward the stopping position, the locking of the print switch PS is released by a known suitable mechanism (not shown). When the original-supprt means 4 finally reaches the stopping position, the print switch PS is opened by a known suitable mechanism (not shown). As a result, (i) The electric motor 48 stops rotation, and causes the stopping of the rotation of the cooling fan 40, the rotation of the rotary drum 8, the movement of the original-support means 4, and the rotation of the roller units 76, 78, 84 and 93 of the copying paper transfer system 50. Thus, the original-support means 4 stops at the stopping position.

(ii) The corona discharger 16 and the corona discharger 22 are deenergized to stop discharging.

(iii) Passing of a current to the phototransistor PT and the comparator C is stopped.

(2) When a plurality of copies are to be obtained by feeding a roll of copying paper from the paper roll feed means 52:

(2-1 and 2) The operations are the same as in (1-1) and (1-2).

(2-2a) The operator sets the count dial CD at the desired number of copies at a time between (1-2) and (1-3).

(2-3 to 7) the operations are the same as in (1-3) to (1-7).

(2-7a) While the orignal-support means 4 makes a returning movement from the scanning movement terminating position toward the stopping position, the number of copies indicated by the count dial CD is decreased by one by means of a known suitable mechanism (not shown) instead of releasing the locking of the print switch PS. Since the locking of the print switch PS is not released, the print switch PS is maintained closed even when the original-support means 4 reaches the stopping position. Thus, the copying process is repeated continuously.

(2-8) When the copying process is repeated and the number of copies indicated at the count dial CD becomes 1, and in the step of copying the last one, the original-support means 4 makes a returning movement from the scanning movement terminating position to the stoppng position, the same operation as in (1-8) is performed.

(3) When a copy is to be obtained by feeding a sheet of copying paper from the sheet feed means 54:

(3-1) The operation is the same as in (1-1).

(3-2) Instead of the operation (1-2), the operator sets the selection lever means 356 (see FIG. 12) at the sheet feeding position. Then, (i) The switch 364 is opened, and therefore, even when the comparator C produces a signal afterwards and the signal is put into the amplifier AMP, the solenoid 388 constituting the cutter means actuator is not energized.

(3-3 to 8) Even when the comparator C produces a signal, and this signal is put into the amplifier AMP, the solenoid 388 constituting the cutter means actuator is not energized, and therefore the operations are the same as in (1-3) to (1-8) except that the paper roll cutter means 60 is not actuated.

What we claim is:

1. An electrostatic copying apparatus comprisng a housing, means for supporting an original to be copied, said means being mounted on said housing and having a transparent plate for supporting the original thereon and a holding member for covering the original on the transparent plate, means for forming a copied image disposed within said housing and having an optical system for projecting the image of the original on the transparent plate having only a single light source and mirrors only for reflecting the image of the original, and a system for transferring a copying paper synchronously with the scanning of the image of the original which is effected by the relative movement of the original-support means and the optical system, said transfer system including a supply means for unwinding a roll of copying paper and a cutter means for cutting the roll of copying paper, a portion of the inside surface of the original-holding member havng a predetermined width corresponding at least to the side edge of the transparent plate, said predetermined width having dark color characteristics and the housing having therein a light detector connected to said cutter means for receiving light reflected from the side edge of the transparent plate and detecting a change in reflectance when the image of the original is scanned, and when the light detector detects the change of reflectance, actuating the copying paper cutter means in response to the detected change.

2. The apparatus of claim 1 further comprising, adjacent the transparent plate, a copying paper cutting length indicating member which extends along the side edge of the transparent plate at least from the forward end of the transparent plate to its rear end and extends a predetermined width across said transparent plate perpendicular to said side edge, said indicating member having an inside surface of a bright color and being adapted to permit adjustment of the length from the forward end of the transparent plate to the rear end of the indicating member.

3. The apparatus of claim 2 wherein said length indicating member has a stationary portion extending at least from the forward end of the transparent plate to its rear end and having a length from the forward end of the transparent plate corresponding to the minimum cutting length, and a movable portion is slidable freely along the stationary portion in the direction of the scanning the original and the length of which that projects beyond the rear end of the stationary portion toward the rear end of the transparent plate can be adjusted as desired.

4. The apparatus of claim 3 wherein the length indicating member is provided adjacent the inside surface of the transparent plate.

5. The apparatus of claim 4 further comprising a driving wire having the ends connected respectively to the ends of the movable portion of said indicating member, a manually operable member connected to said driving wire, whereby by operating the manually operable member, the movable portion of said indicating member is moved via the wire and the position of the movable portion with respect to the stationary portion of said indicating member can be adjusted.

6. An electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing having an optical system for projecting the image of the original on the transparent plate, and a system for transferring a copying paper synchronously with the scanning of the image of the original which is effected by the relative movement of the original-support means and the optical system, said transfer system including a supply means for unwinding a roll of copying paper and a cutter means for cutting the roll of copying paper, at least a portion of the inside surface of the original-holding member which corresponds at least to the side edge of the transparent plate having a predetermined width, said predetermined width having a bright color, a copying paper cutting length indicating member adjacent said transparent plate which extends along the side edge of the transparent plate at least from the forward end of the transparent plate to its rear end and extends a predetermined width across said transparent plate perpendicular to said side edge, said indicating member having an inside surface of a dark color and being adapted to permit adjustment of the length from the forward end of the transparent plate to the rear end of the indicating member, said housing having therein a light detector connected to said cutter means for receiving the reflected light from the side edge of the transparent plate during the scanning of the image of the original, and detecting a change in reflectance between the reflected light from the inside surface of the indicating member and the reflected light from the inside surface of the original-holding member for actuating the copying paper cutter means in response to the detection of the change of reflectance of the reflected light.

7. The apparatus of claim 6 wherein said length indicating member has a stationary portion extending at least from the forward end of the transparent plate to its rear end and having a length from the forward end of the transparent plate corresponding to the minimum cutting length, and a movable portion slidable freely along the stationary portion in the direction of scanning the original and the length of which that projects beyond the rear end of the stationary portion toward the rear end of the transparent plate can be adjusted as desired.

8. The apparatus of claim 7 wherein the length indicating member is provided adjacent the inside surface of the transparent plate.

9. The apparatus of claim 8 further comprising a driving wire having the ends connected respectively to the ends of the movable portion of said indicating member, and a manually operable member connected to said driving wire, whereby by operating the manually operable member, the movable portion of said indicating member is moved via the wire and the position of the movable portion with respect to the stationary portion of said indicating member can be adjusted.

10. An electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and having an optical system for projecting the image of the original on the transparent plate, and a system for transferring a copying paper synchronously with the scanning of the image of the original which is effected by the relative movement of the original-support means and the optical system, said transfer system including a supply means for unwinding a roll of copying paper and a cutter means for cutting the roll of copying paper, a copying paper cutting length indicating member adjacent the transparent plate and extending along the side edge of the transparent plate from the forward end toward its rear end and having a predetermined width extending across said transparent plate perpendicular to said edge, said indicating member having means permitting adjustment of the length thereof from the forward end of the transparent plate and an auxiliary member extending along the edge of the transparent plate and having a predetermined width extending across said transparent plate perpendicular to said edge, said auxiliary member being capable of being positioned at the rear end of the length indicating member, the inside surface of said length indicating member having either bright color or dark color characteristics and the inside surface of said auxiliary member having either dark color or bright color characteristics opposite to the characteristics of said length indicating member, and said housing having therein a light detector connected to said cutter means and for receiving the reflected light at the side edge of the transparent plate during the scanning of the image of the original and detecting the change of the reflectance for actuating said copying paper cutter means upon the detection of the change of the reflectance by the light detector.

11. The apparatus of claim 10 wherein said indicating member and said auxiliary member are provided adjacent the inside surface of the transparent plate.

12. The apparatus of claim 10 or 11 wherein the inside surface of said indicating member has bright color characteristics, and the inside surface of the auxiliary member has dark color characteristics.

13. The apparatus of claim 12 wherein that portion of the inside surface of the original-holding member which corresponds at least to the side edge of the transparent plate and has a predetermined width has dark color characteristics.

14. The apparatus of any one of claims 10 to 13 wherein said indicating member consists of a stationary portion extending from the forward end of the transparent plate toward the rear end of the transparent plate and has a length corresponding to the minimum cut length of copying paper, and a movable portion which is mounted movably along the side edge of the transparent plate and the length of which that projects beyond the rear end of the stationary portion to the rear end of the transparent plate can be adjusted.

15. The apparatus of claim 14 further comprising a driving wire having the ends connected respectively to the ends of the movable portion of said indicating member, and a manually operable member connected to the driving wire, whereby by operating the manually operable member, said movable portion can be moved as desired via the driving wire.

16. The apparatus of any one of claims 10 to 15 wherein said auxiliary member and said indicating member are mounted such that they can move along the side edge of the transparent plate independently from each other.

17. The apparatus of claim 16 further comprising a further driving wire having the ends connected respectively to the ends of said auxiliary member, and a further manually operable member connected to the said further driving wire, whereby by operating the further manually operable member, the auxiliary member can be moved as desired via the further driving wire.

18. The apparatus of any one of claims 10 to 13 wherein said length indicating member consists of a stationary portion extending from the forward end of the transparent plate to its rear end and having a length corresponding to the minimum cut length of the copying paper, and a movable portion movable along the side edge of the transparent plate and the length of which that projects beyond the rear end of the stationary portion to the rear end of the transparent plate can be adjusted, and wherein said auxiliary member is integral with the rear end of the movable portion.

19. The apparatus of claim 18 further comprising a driving wire having the ends connected respectively to the forward end of the movable portion of the indicating member and the rear end of the auxiliary member at the rear end of the movable portion, and a manually operable member connected to the driving wire, whereby by operating the manually operable member, the movable portion and the auxiliary member can be optionally moved through the driving wire.

20. An electrostatic copying apparatus comprising a housing, means for supporting an original to be copied, said means being mounted on said housing and having a transparent plate for supporting the original thereon and a holding member for supporting covering the original on the transparent plate, means for forming a copied image disposed within said housing and having an optical system for projecting the image of the original on the transparent plate, and a system for transferring a copying paper synchronously with the scanning of the image of the original which is effected by the relative movement of the original-support means and the optical system, said transfer system including at least one feed roller, a drive power source and a clutch mechanism for connecting the feed roller and power source to start the supplying of the copying paper, an actuator secured to one of said original-support means and said optical system so as to move together with it, and a follower lever mechanism mounted for pivoting between an engaging position at which it comes into engagement with said clutch mechanism to maintain it in the inoperative state and a non-engaging position at which it is separated from the clutch mechanism to permit the clutch mechanism to change to the operative state, a spring urging said follower lever mechanism to the engaging position, said actuator abutting said follower lever mechanism upon the starting of scanning movement of either one of said original-support means and said optical system and the consequent starting of the scanning of the image of the original, thereby to bring the follower lever mechanism to the non-engaging position against the action of the spring, whereby the rotation of the feed roll is started synchronously with the starting of the scanning of the image of the original to feed the copying paper, and when the actuator separates from the follower lever mechanism during the continuance of the scanning movement, the follower lever mechanism is returned to the engaging position by the action of the spring, and the copying paper feed roll is stopped after a predetermined amount of rotation.

21. The apparatus of claim 20 wherein said original-support means is mounted on said housing for reciprocal movement, and said apparatus further has moving means for causing said original-support means to make a scanning movement in a predetermined direction for scanning the original, and wherein said actuator is fixed to said original-support means.

22. The apparatus of claim 21 wherein said moving means comprises means for causing original-support means to make a preparatory movement from a stopping position to a scanning movement starting position in a direction opposite to the direction of scanning movement, then to make a scanning movement from the starting position, and then to make a returning movement to the stopping position in a direction opposite to the direction of scanning movement.

23. The apparatus of claim 22 wherein said copying paper transfer system has a means for feeding a roll of copying paper and a means for feeding a sheet of copying paper, and said apparatus has two copying paper feed rollers, one being provided at each of said paper roll feed means and said sheet feeding means, and said apparatus further comprises a copying paper selection lever mechanism which can be selectively positioned by manual operation either at a position for feeding the paper roll or at a position for feeding the copying sheet, said selection lever mechanism, when brought to the copying sheet feeding position, coming into engagement with said clutch mechanism for the paper roll feed means for maintaining the clutch mechanism in the inoperative state even when the follower lever mechanism is at the non-engaging position.

24. The apparatus of claim 23 wherein said copying paper transfer system includes a copying paper cutter means for cutting the copying paper unwound from said paper roll feed means and a cutter means actuator for selectively actuating said paper cutter means, and means for deactivating said cutter means actuator when the selection lever mechanism is set at the sheet feeding position.

25. An electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and having an optical system for projecting the image of the original on the transparent plate, and a system for transferring a copying paper synchronously with the scanning of the image of the original which is effected by the relative movement of the original-support means and the optical system, said transfer system including a paper roll feed means for unwinding a roll of copying paper and a cutter means for cutting lengths of paper from the roll of copying paper, said paper roll feed means including a support frame for rotatably supporting the core of a roll of copying paper, said frame being mounted for pivotal movement between a paper roll loading position and a paper roll unwinding position, a rotatable feed roller unit for feeding paper unwound from the paper roll, and an initial feed means for rotating the copying paper feed roller unit by a predetermined amount in the paper feeding direction at the time of loading the roll of copying paper, said predetermined amount being equal to the distance from the nip position of the feed roller unit to the cutting position of said cutter means.

26. The apparatus of claim 25 wherein said initial feed means consists of an input member connected to said support frame and capable of being rotated about the axis of rotation of said support frame upon the pivotal turning of said support frame, and a power transmission means including a one-way clutch for transmitting the rotation of the input member in a predetermined direction to said copying paper feed roller unit, whereby when said support frame is pivoted from the position of loading said roll of copying paper to the position of unwinding the paper roll, the input member is rotated in said predetermined direction and said copying paper feed roller unit is rotated by said predetermined amount in the direction of feeding the copying paper.

27. The apparatus of claim 25 wherein said initial feed means consists of an input member mounted pivotably between a first angular position and a second angular position independently from said support frame and having a manually operable lever, and a power transmission means including a one-way clutch for transmitting the rotation of the input member in a predetermined direction to said copying paper feed roller unit, whereby by operating the manually operable lever, the input member is rotated in said predetermined direction from said first angular position to said second angular position, and said copying paper feed roller unit is rotated by said predetermined amount in the direction of feeding the copying paper.

28. The apparatus of any one of claims 25 and 27 wherein at least a part of one end wall of said housing is pivotally mounted about the lower end portion as an axis so as to be opened and closed, and at least a part of one end of said housing is connected to said support frame so that they are interlocked with each other; said support frame, when at least said part of one end wall of the housing is fully opened, projecting outwardly from the housing so as to be maintained at the paper roll loading position, and when at least a part of one end wall of said housing is closed, said support frame is maintained at the paper roll unwinding position within the housing.

29. An electrostatic copying apparatus comprising a housing, means for supporting an original to be copied, said means being mounted on said housing and having a transparent plate for supporting the original thereon and a holding member for covering the original on the transparent plate, means for forming a copied image disposed within said housing and having an optical system for projecting the image of the original on the transparent plate, and a system for transferring a copying paper synchronously with the scanning of the image of the original which is effected by the relative movement of the original-support means and the optical system, said transfer system including means for feeding a sheet of copying paper, said housing having an opening formed therein for insertion of a sheet of copying paper, said sheet feeding means having a sheet receiving plate for receiving the sheet of copying paper inserted through said opening and having at its forward end a sheet end positioning surface and having openings therein, said positioning surface extending to a predetermined height in a direction approximately at right angles to the sheet inserting direction and the forward end of the inserted sheet of copying paper abutting therewith, a copying paper feed roller rotatably mounted above said receiving plate at a predetermined distance, a drive power source and a sheet feed clutch mechanism for connecting said feed roller to said drive power source by the actuation of said clutch mechanism, and a copying paper feed auxiliary member capable of being selectively positioned either at an inoperative position below said receiving plate or at an operative position at which a part of the auxiliary member projects upwardly from the receiving plate through the opening in said receiving plate to press a sheet of copying paper fed onto the receiving plate against the paper feed roller, said receiving plate being slidably mounted for movement in the paper feeding direction and a spring connected to said receiving plate and urging said receiving plate to a first position, a stop means at said first position which a part of the receiving plate contacts, said sheet feeding means further comprising a receiving plate advancing means for moving the receiving plate forward against the force of the spring to a second position spaced from the first position a predetermined distance in the paper feeding direction, and maintaining it at the second position.

30. The apparatus of claim 29 wherein when the scanning of the image of the original is started by the relative movement of said original-support means and said optical system, the clutch mechanism is actuated synchronously with it, and the copying paper feed roller is rotated to start the supplying of the copying paper, and when the receiving plate is at the first position, an image corresponding to the image of the original is formed on the copying paper while the forward end of the image of the original is substantially in register with the forward end of the copying paper.

31. The apparatus of claim 29 or 30 wherein said receiving plate advancing means has an advancing means actuator mounted pivotably between an inoperative position and an operative position and means for resiliently holding said advancing means actuator either at the inoperative position or at the operative position and a manually operable lever connected to said actuator, said receiving plate, when said actuator is at the inoperative position, being maintained at the first position by the force of the spring; and when by operating the manually operable member, the actuator is pivotally turned from said inoperative position to said operative position, said actuator comes into engagement with said receiving plate to advance said receiving plate forward to said second position against the force of the spring and maintain it at the second position.

32. The apparatus of any one of claims 29 to 31 wherein the stop member defining said first position is adjustably mounted for having the position thereof adjusted in the direction of feeding the copying paper.

33. The apparatus of claim 24 wherein said copying paper sheet feed means includes an auxiliary member for feeding of a sheet of copying paper and which is movable between an operative position at which it presses the sheet of copying paper against the copying paper feed roll and an inoperative position at which it permits the sheet-like copying paper to be spaced from the copying paper roll, and a further actuator for the auxiliary member and a further clutch member for connecting said further actuator to said drive power source, said further actuator being rotatable from a first position to a second position to move the auxiliary member from the inoperative position to the operative position when first connected to said drive power source by the operation of said further clutch mechanism and rotatable from the second position to the first position when next connected to said drive power source by said further clutch mechanism; and said follower lever mechanism includes a subsidiary follower lever portion mounted for pivoting between an engaging position at which it comes into engagement with the further clutch mechanism to maintain the further clutch mechanism in the inoperative state and a non-engaging position at which it is separated from the further clutch mechanism to allow the further clutch mechanism to change to the operative state, and a spring urging said follower lever portion to the engaging position, said first mentioned actuator, when the copying paper selection lever mechanism is at the copying paper sheet feeding position, abutting said subsidiary follower lever portion and moving it to the non-engaging position against the action of the spring at the end of said original-support mechanism preparatory movement for allowing said further clutch mechanism to rotate said further actuator from the first position to the second position to move the auxiliary member to the operative position, and while said original-support means is making the returning movement, said first mentioned actuator remaining in abutment with said subsidiary follower lever portion and maintaining it in the non-engaging position against the action of the spring, and for allowing said further clutch member to rotate said further actuator from the second position to the first position to move the auxiliary member to the inoperative position, and when said first mentioned actuator separates from said subsidiary follower lever portion the subsidiary follower lever portion is returned to the engaging position by the action of said spring, and when the copying paper selection lever mechanism is at the paper roll feeding position, said selection lever mechanism engaging said further clutch mechanism for maintaining said further clutch mechanism in the inoperative state and holding said further actuator at the first position even if the subsidiary lever mechanism is moved to the non-engaging position.

* * * * *